United States Patent
Drummond et al.

(10) Patent No.: US 12,169,902 B2
(45) Date of Patent: Dec. 17, 2024

(54) METHODS AND SYSTEMS FOR COMPOSING AND EXECUTING A SCENE

(71) Applicant: Apple Inc., Cupertino, CA (US)

(72) Inventors: Mark E. Drummond, Palo Alto, CA (US); Daniel L Kovacs, Santa Clara, CA (US); Shaun D. Budhram, Los Gatos, CA (US); Edward Ahn, San Francisco, CA (US); Behrooz Mahasseni, San Jose, CA (US); Aashi Manglik, Sunnyvale, CA (US); Payal Jotwani, Santa Clara, CA (US); Mu Qiao, Campbell, CA (US); Bo Morgan, Emerald Hills, CA (US); Noah Gamboa, San Franciso, CA (US); Michael J. Gutensohn, San Francisco, CA (US); Dan Feng, Santa Clara, CA (US); Siva Chandra Mouli Sivapurapu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 182 days.

(21) Appl. No.: 17/853,557

(22) Filed: Jun. 29, 2022

(65) Prior Publication Data
US 2023/0089049 A1 Mar. 23, 2023

Related U.S. Application Data

(60) Provisional application No. 63/246,631, filed on Sep. 21, 2021.

(51) Int. Cl.
*G06T 19/00* (2011.01)
(52) U.S. Cl.
CPC .......... *G06T 19/006* (2013.01); *G06T 19/003* (2013.01); *G06T 2200/24* (2013.01); *G06T 2219/004* (2013.01)

(58) Field of Classification Search
None
See application file for complete search history.

(56) References Cited

U.S. PATENT DOCUMENTS

| 9,727,996 B2 | 8/2017 | Pandey et al. |
| 9,898,873 B2 | 2/2018 | Yu |

(Continued)

FOREIGN PATENT DOCUMENTS

EP          2546806 B1        5/2019

*Primary Examiner* — Martin Mushambo
(74) *Attorney, Agent, or Firm* — Fernando & Partners, LLP

(57) ABSTRACT

In one implementation, a method of displaying content is performed at a device including a display, one or more processors, and non-transitory memory. The method includes scanning a first physical environment to detect a first physical object in the first physical environment and a second physical object in the first physical environment, wherein the first physical object meets at least one first object criterion and the second physical object meets at least one second object criterion. The method includes displaying, in association with the first physical environment, a virtual object moving along a first path from the first physical object to the second physical object. The method includes scanning a second physical environment to detect a third physical object in the second physical environment and a fourth physical object in the second physical environment, wherein the third physical object meets the at least one first object criterion and the fourth physical object meets the at least one second object criterion. The method includes displaying, in association with the second physical environment, the virtual object moving along a second path from the third physical object to the fourth physical object, wherein the second path is different than the first path.

20 Claims, 44 Drawing Sheets

(56) References Cited

U.S. PATENT DOCUMENTS

| | | |
|---|---|---|
| 9,916,002 B2 | 3/2018 | Petrovskaya et al. |
| 10,203,762 B2 | 2/2019 | Bradski et al. |
| 10,459,518 B2 | 10/2019 | Lutnick et al. |
| 10,634,913 B2 | 4/2020 | Nair et al. |
| 10,719,993 B1 | 7/2020 | Ha |
| 10,917,613 B1* | 2/2021 | Chiarella ............... H04N 7/157 |
| 11,367,416 B1* | 6/2022 | Richter .................... G06T 11/60 |
| 11,495,003 B1* | 11/2022 | Agarwal ............... G06F 3/0346 |
| 2006/0262141 A1* | 11/2006 | Satoh .................... G06F 3/0325 |
| | | 345/633 |
| 2007/0242899 A1* | 10/2007 | Satoh ....................... G06T 7/73 |
| | | 382/286 |
| 2010/0125799 A1* | 5/2010 | Roberts ................... G06F 3/011 |
| | | 715/757 |
| 2014/0222907 A1* | 8/2014 | Seligmann ........... H04L 65/103 |
| | | 709/204 |
| 2014/0282220 A1 | 9/2014 | Wantland et al. |
| 2014/0333666 A1* | 11/2014 | Poulos ................... G06T 19/006 |
| | | 345/633 |
| 2015/0185825 A1 | 7/2015 | Mullins |
| 2015/0235447 A1* | 8/2015 | Abovitz ............. G02B 27/4205 |
| | | 345/633 |
| 2016/0026253 A1* | 1/2016 | Bradski ................ H04N 13/128 |
| | | 345/8 |
| 2018/0285538 A1* | 10/2018 | Zhu ........................ G06F 21/31 |
| 2018/0365897 A1* | 12/2018 | Pahud ................... G06T 19/006 |
| 2019/0065027 A1* | 2/2019 | Hauenstein .......... G06F 3/04815 |
| 2019/0094981 A1* | 3/2019 | Bradski ................ H04N 21/414 |
| 2019/0208270 A1* | 7/2019 | Bates ............... H04N 21/43615 |
| 2019/0347846 A1* | 11/2019 | Olson ................... G06F 16/58 |
| 2020/0106965 A1* | 4/2020 | Malia ................... A63F 13/812 |
| 2020/0357374 A1* | 11/2020 | Verweij ............ G10K 11/17885 |
| 2021/0044636 A1 | 2/2021 | Miller |
| 2021/0097768 A1* | 4/2021 | Malia ................... G06F 3/0488 |
| 2021/0287382 A1* | 9/2021 | Lehrich ................ G06F 3/0346 |
| 2021/0295603 A1* | 9/2021 | Lui ....................... G06T 15/005 |
| 2022/0232104 A1* | 7/2022 | Brimhall ............... H04L 67/131 |
| 2022/0308654 A1* | 9/2022 | Chen ....................... A63F 13/52 |

* cited by examiner

500

510 — Scanning a first physical environment to detect a first physical object in the first physical environment and a second physical object in the first physical environment, wherein the first physical object meets at least one first object criterion and the second physical object meets at least one second object criterion

520 — Displaying, in association with the first physical environment, a virtual object moving along a first path from the first physical object to the second physical object

530 — Scanning a second physical environment to detect a third physical object in the second physical environment and a fourth physical object in the second physical environment, wherein the third physical object meets the at least one first object criterion and the fourth physical object meets the at least one second object criterion

540 — Displaying, in association with the second physical environment, the virtual object moving along a second path from the third physical object to the fourth physical object, wherein the second path is different than the first path

Figure 5

METHODS AND SYSTEMS FOR COMPOSING AND EXECUTING A SCENE

CROSS-REFERENCE TO RELATED APPLICATIONS

This application claims priority to U.S. Provisional Patent App. No. 63/246,631, filed on Sep. 21, 2021, which is hereby incorporated by reference in its entirety.

TECHNICAL FIELD

The present disclosure generally relates to a graphical user interface for composing a scene and executing the scene in an extended reality (XR) environment.

BACKGROUND

In various implementations, a scene includes virtual content to be presented in an XR environment based on a physical environment. It may be desirable to present the scene in various different XR environments based on various different physical environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of displaying content in accordance with some implementations.

Figure 1:
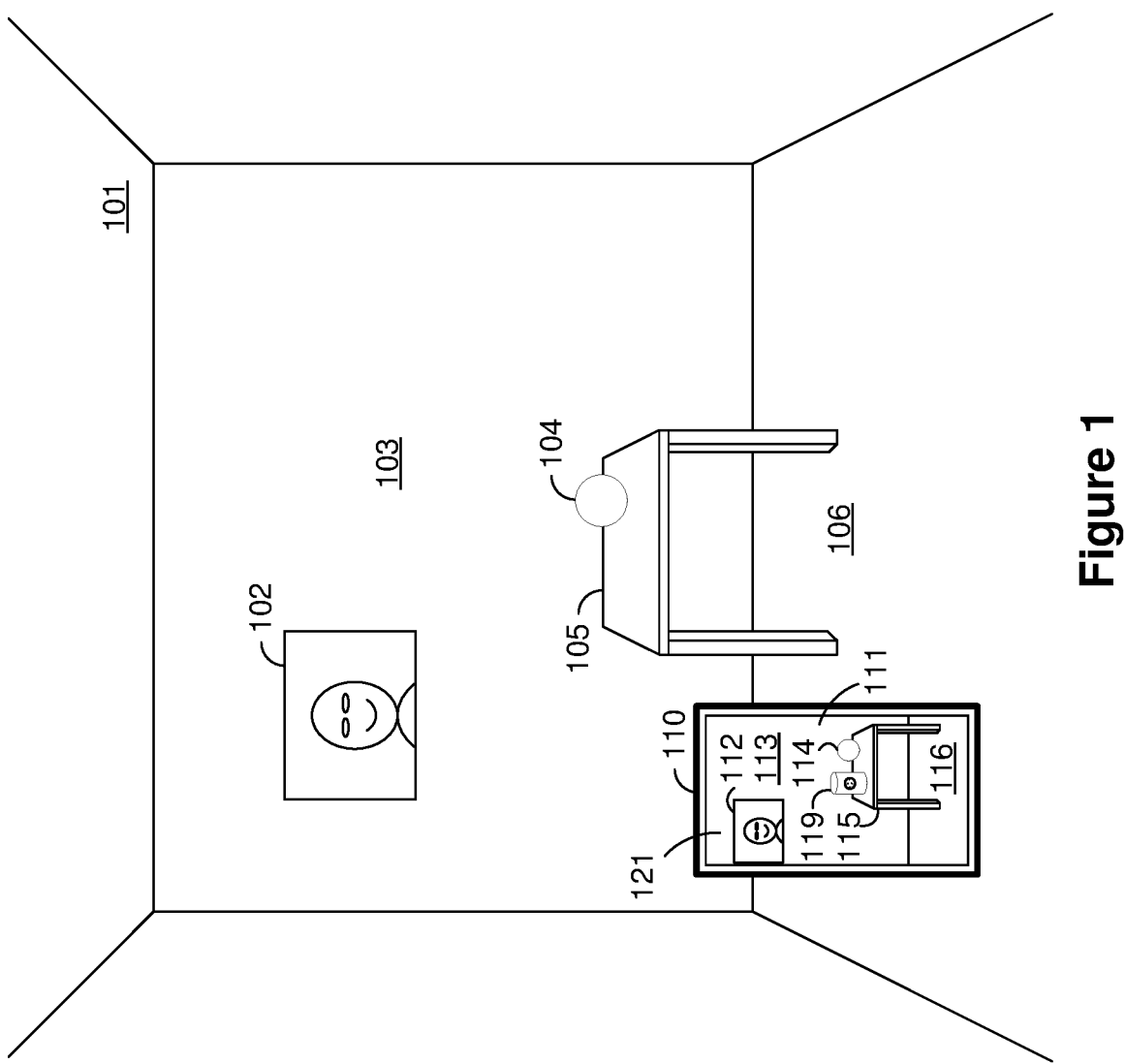
FIG. 1 illustrates a physical environment with an electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying content. In various implementations, a method is performed at a device including a display, one or more processors, and non-transitory memory. The method includes scanning a first physical environment to detect a first physical object in the first physical environment and a second physical object in the first physical environment, wherein the first physical object meets at least one first object criterion and the second physical object meets at least one second object criterion. The method includes displaying, in association with the first physical environment, a virtual object moving along a first path from the first physical object to the second physical object. The method includes scanning a second physical environment to detect a third physical object in the second physical environment and a fourth physical object in the second physical environment, wherein the third physical object meets the at least one first object criterion and the fourth physical object meets the at least one second object criterion. The method includes displaying, in association with the second physical environment, the virtual object moving along a second path from the third physical object to the fourth physical object, wherein the second path is different than the first path.

Various implementations disclosed herein include devices, systems, and methods for associating a label with an object. In various implementations, a method is performed at a device including one or more processors and non-transitory memory. The method includes obtaining a label associated with a plurality of criteria. The method includes detecting a physical object in a physical environment. The method includes determining that the physical object satisfies a function of the plurality of criteria. The method includes, in response to determining that the physical object satisfies the function of the plurality of criteria, generating a characterization vector for the physical object including an object identifier of the physical object and the label.

Various implementations disclosed herein include devices, systems, and methods for executing a scene. In various implementations, a method is performed at a device including a display, one or more processors, and non-transitory memory. The method includes obtaining a scene associated with one or more execution constraints. The method includes scanning a physical environment to determine whether the physical environment meets the one or more execution constraints, wherein the one or more execution constraints include an execution constraint that is met when the physical environment includes a physical object with a particular property. The method includes, in response to determining that the physical environment meets the one or more execution constraints, executing the scene, wherein executing the scene includes displaying content in association with the physical object.

Various implementations disclosed herein include devices, systems, and methods for composing a scene. In various implementations, a method is performed at a device including a display, one or more processors, and non-transitory memory. The method includes displaying a representation of a scene. The method includes receiving user input associating a plurality of physical assets with the scene. The method includes receiving user input associating a plurality of virtual assets with the scene. The method includes receiving user input associating a first property with a first virtual asset of the plurality of the virtual assets, wherein the first property is a spatial relationship between the first virtual asset and a first physical asset of the plurality of physical assets. The method includes displaying, in the representation of the scene, a representation of the first virtual asset in the spatial relationship with a representation of the first physical asset.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a scene including virtual content is presented in various different XR environments based on various different physical environments with different physical characteristics, such as different sets of physical objects present in the physical environment. Described below is a graphical user interface (GUI) for composing a scene for presentation in various different XR environments. Also described below are methods and systems for presenting the scene in various different XR environments.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with an electronic device 110 surveying the physical environment 101. The physical environment 101 includes a picture 102 hanging on a wall 103, a table 105 on a floor 106, and a ball 104 on the table 105.

The electronic device 110 displays, on a display, an image of an XR environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the ball 114 on the representation of the table 115.

In addition to the representations of real objects of the physical environment 101, the image of the XR environment 121 includes a representation of the virtual object 119. The visual appearance of virtual object 119 is defined by software on the electronic device 110. The electronic device 110 presents virtual object 119 as resting on the top surface of the representation of the table 115 by accounting for the position and orientation of device 110 relative to table 105.

Figure 2A:
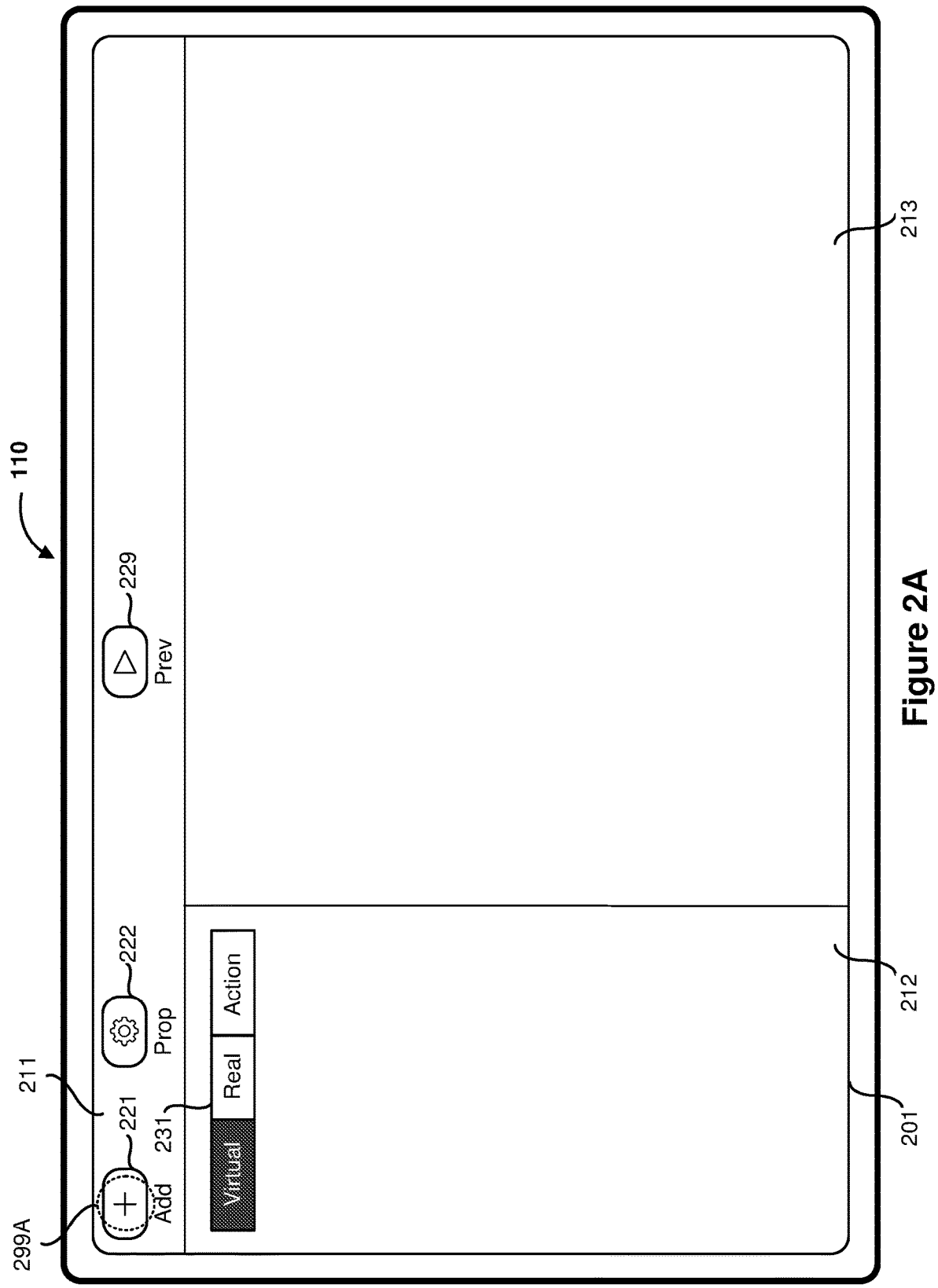
FIGS. 2A-2W illustrate the electronic device of FIG. 1 displaying a graphical user interface (GUI) for composing a scene.

FIG. 2A illustrates the electronic device 110 displaying a graphical user interface (GUI) 201 for composing a scene. In particular, the GUI 201 includes a representation of the scene. In various implementations, an application of the electronic device 110 or a different electronic device executes to present the scene in an XR environment, such as a virtual environment or in association with a representation of a physical environment.

The GUI 201 includes a toolbar region 211, an assets region 212, and a view region 213. The toolbar region 211 includes an asset addition affordance 221 for adding assets to the scene, a properties affordance 222 for manipulating properties of selected assets, and a preview affordance 229 for previewing the scene.

The assets region 212 includes a list of assets associated with the scene. The assets associated with the scene include virtual assets, physical assets, and action assets. In various implementations, the assets region 212 includes an asset type selection affordance 231 for selecting which type of asset is listed in the assets region 212, e.g., a list of virtual assets, a list of physical assets, or a list of action assets.

The view region 213 includes a representation of the scene. In various implementations, the representation of the scene includes representations of the virtual assets associated with the scene. In various implementations, the representation of the scene includes representations of the physical assets associated with the scene. In various implementations, the representation of the scene includes representations of the action assets associated with the scene.

In various implementations, a virtual asset associated with the scene includes a description of virtual content which is displayed in association with a physical environment when the scene is executed. In various implementations, a virtual asset includes a description of one or more virtual objects. In various implementations, a virtual asset includes a description of a virtual objective-effectuator object. In various implementations, a virtual objective-effectuator object receives objectives and determines actions to achieve those objectives, wherein each of the actions is associated with an animation or animation heuristic of the virtual objective-effectuator object such that the virtual objective-effectuator object is displayed performing the action. For example, in various implementations, the objective for a virtual dog objective-effectuator object may be to hold a virtual bone object on a physical floor. To achieve the objective, the virtual dog objective-effectuator object determines a series of actions of jumping off a physical couch onto the physical floor (associated with a jump-down animation), walking along the physical floor to a location of the virtual bone object (associated with a walking animation), and picking up the virtual bone object (associated with a pick-up animation).

In various implementations, a physical asset associated with the scene includes a description of a physical object which may or may not be present in the physical environment. In particular, in various implementations, a physical asset includes a description of at least one object criteria which may be met by a physical object in the physical environment. For example, in various implementations, a physical asset includes a description of a horizontal plane at a particular height and of a particular width. In various implementations, the physical asset corresponds to the top of a physical table in a first physical environment and the top of a physical desk in a second physical environment.

In various implementations, an action asset associated with the scene includes a description of an action which is performed in response to a trigger. In various implementations, the actions include movement of a virtual object, playing audio, changing a lighting condition, etc.

In FIG. 2A, the asset type selection affordance 231 indicates that virtual assets are listed in the assets region 212. In FIG. 2A, the scene is not yet associated with any assets. Accordingly, the assets region 212 and the view region 213 is empty.

FIG. 2A illustrates a user input 299A directed to the asset addition affordance 221. In various implementations, the user input 299A is input by a user tapping a finger or stylus on a touch-sensitive display at the location of the asset addition affordance 221. In various implementations, the user input 299A is input by a user clicking a mouse button while a cursor is displayed at the location of the asset addition affordance 221.

Figure 2B:
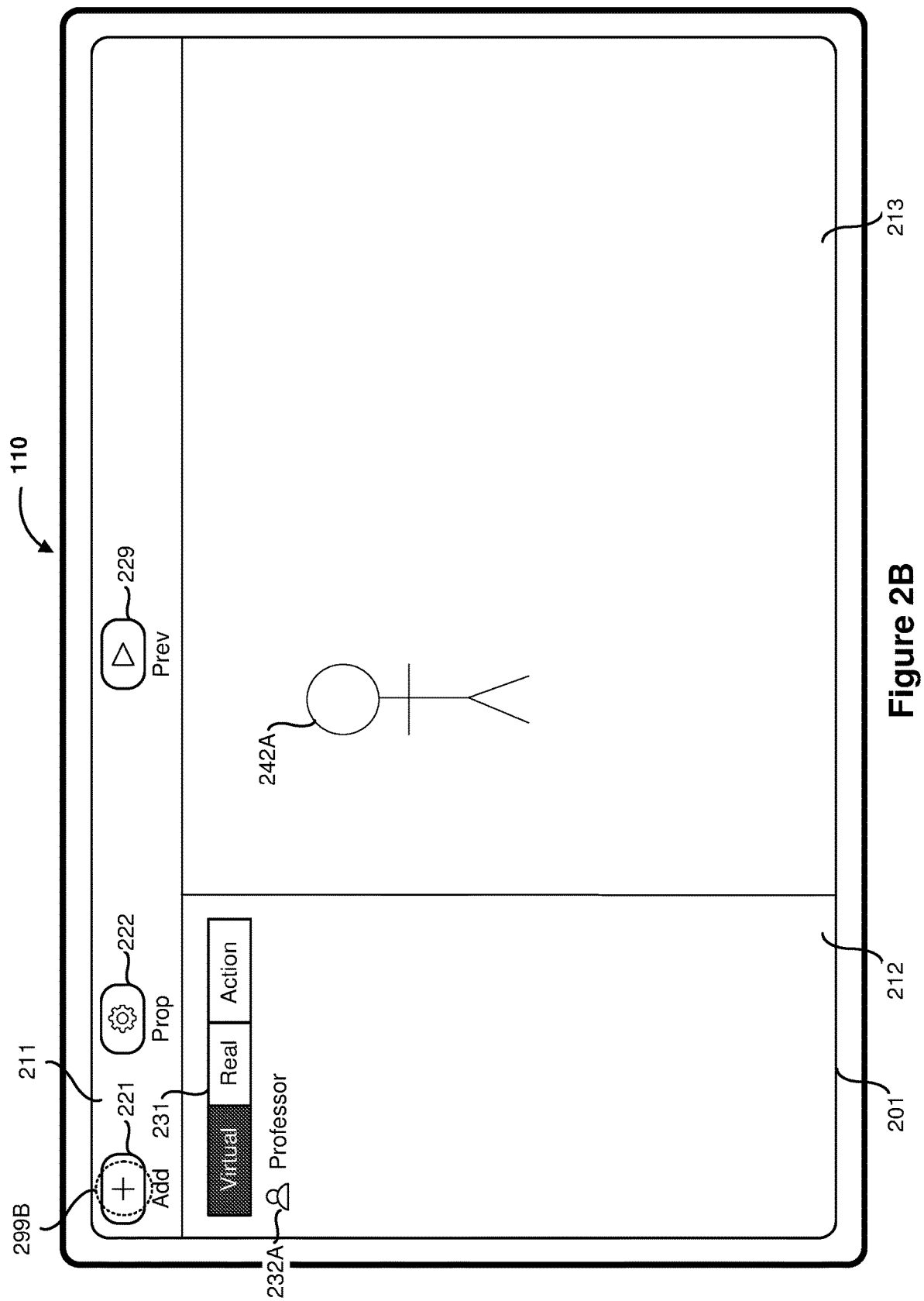

FIG. 2B illustrates the GUI 201 of FIG. 2A in response to detecting the user input 299A directed to the asset addition affordance 221 and additional user input to select a virtual professor objective-effectuator object. In various implementations, the additional user input includes selecting the virtual professor objective-effectuator object from a library of virtual content. In response to detecting the user input 299A directed to the asset addition affordance 221 and the additional user input selecting the virtual professor objective-effectuator object, the scene is associated with the virtual professor objective-effectuator object as a virtual asset. Accordingly, a text representation of the virtual professor objective-effectuator object 232A is displayed in the assets region 212 and a graphical representation of the virtual professor objective-effectuator object 242A is displayed in the view region 213.

The text representation of the virtual professor objective-effectuator object 232A is displayed in association with an icon indicating an object type of the virtual professor objective-effectuator object, e.g., an icon indicating that the virtual professor objective-effectuator object is an objective-effectuator object or active object.

FIG. 2B illustrates a user input 299B directed to the asset addition affordance 221. In various implementations, the user input 299B is input by a user tapping a finger or stylus on a touch-sensitive display at the location of the asset addition affordance 221. In various implementations, the user input 299B is input by a user clicking a mouse button while a cursor is displayed at the location of the asset addition affordance 221.

Figure 2C:
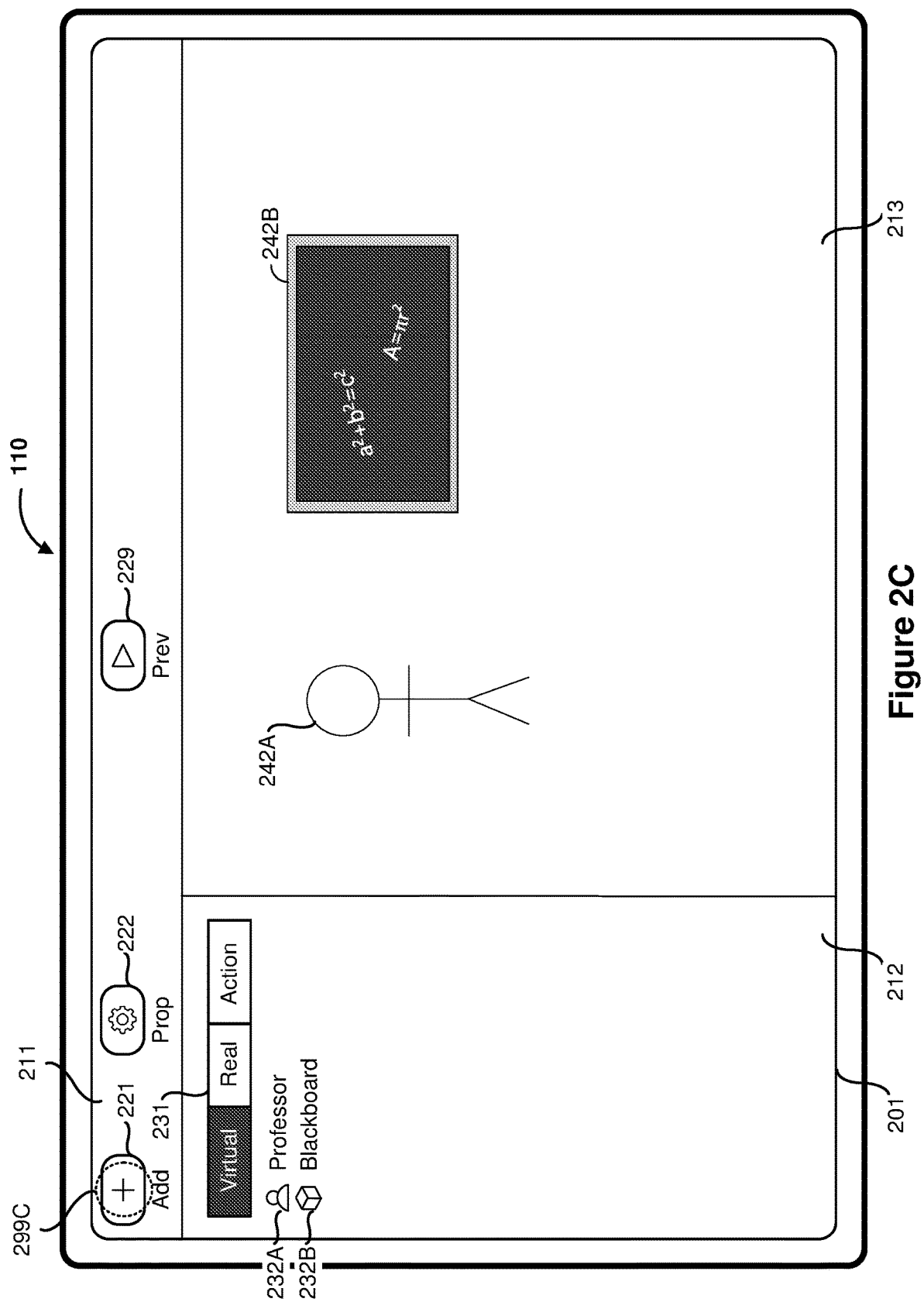

FIG. 2C illustrates the GUI 201 of FIG. 2C in response to detecting the user input 299B directed to the asset addition affordance 221 and additional user input to select a virtual blackboard object. In various implementations, the additional user input includes selecting the virtual blackboard object from a library of virtual content. In response to detecting the user input 299B directed to the asset addition affordance 221 and the additional user input selecting the blackboard object, the scene is associated with the blackboard object as a virtual asset. Accordingly, a text representation of the virtual blackboard object 232B is displayed in the assets region 212 and a graphical representation of the virtual blackboard object 242B is displayed in the view region 213.

The text representation of the virtual blackboard object 232B is displayed in association with an icon indicating an object type of the virtual blackboard object, e.g., an icon indicating that the virtual blackboard object is a passive object.

FIG. 2C illustrates a user input 299C directed to the asset addition affordance 221. In various implementations, the user input 299C is input by a user tapping a finger or stylus on a touch-sensitive display at the location of the asset addition affordance 221. In various implementations, the user input 299C is input by a user clicking a mouse button while a cursor is displayed at the location of the asset addition affordance 221.

Figure 2D:
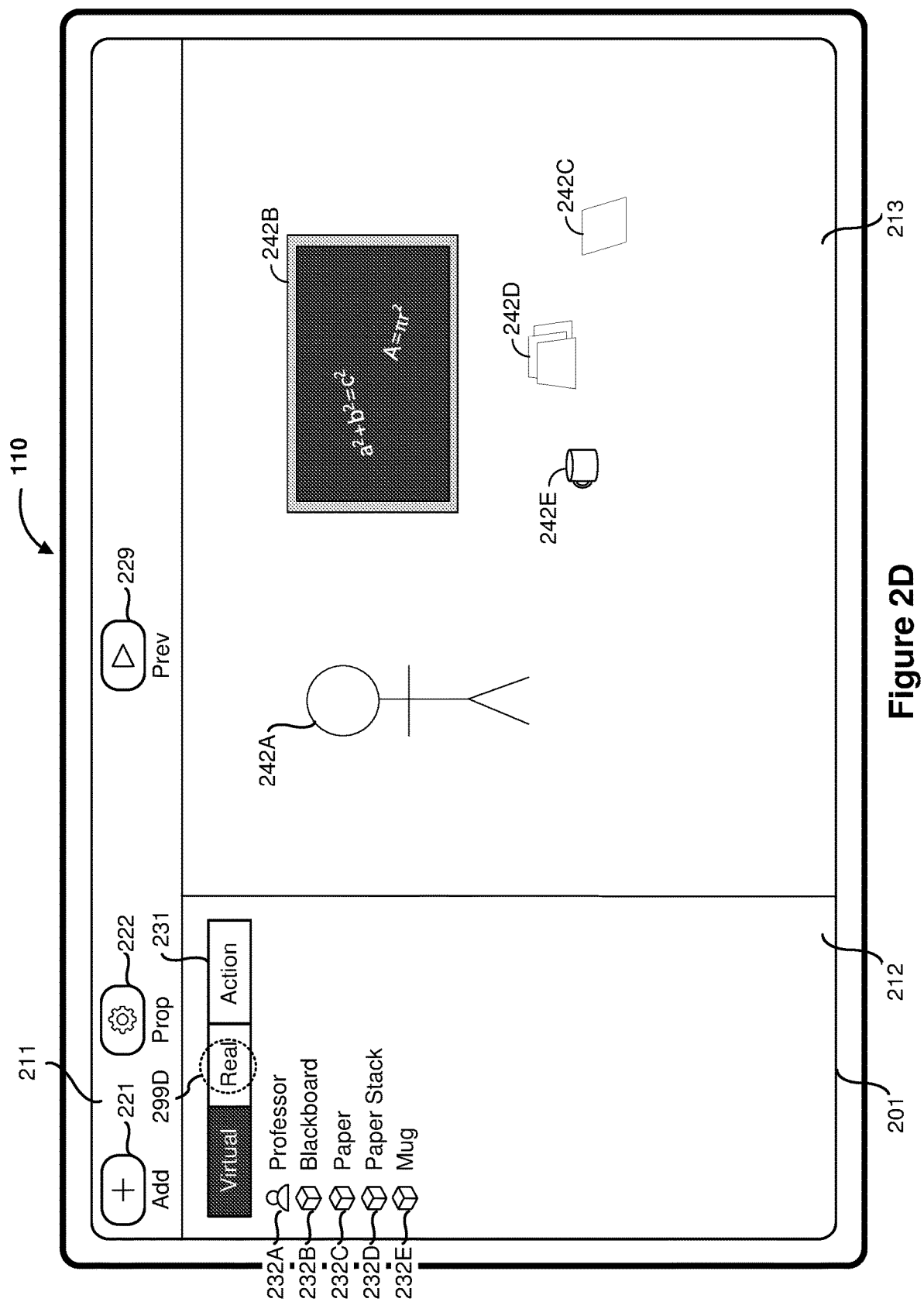

FIG. 2D illustrates the GUI 201 of FIG. 2C in response to detecting the user input 299C directed to the asset addition affordance 221, additional user input to select a virtual paper object, and additional user input to associate a virtual paper stack object and a virtual mug object with the scene. In various implementations, the additional user input to select the virtual paper object includes selecting the blackboard object from a library of virtual content. In various implementations, the additional user input to associate the virtual paper stack object and the virtual mug object with the scene includes selecting the asset addition affordance 221 and selecting the virtual paper stack object and the virtual mug object from a library of virtual content.

In response to detecting the user input 299C and the additional user input, the scene is associated with the virtual paper object, the virtual paper stack object, and the virtual mug object as virtual assets. Accordingly, a text representation of the virtual paper object 232C, a text representation of the virtual paper stack object 232D, and a text representation of the virtual mug object 232E are displayed in the assets region 212. Further, a graphical representation of the virtual paper object 242C, a graphical representation of the virtual paper stack object 242D, and a graphical representation of the virtual mug object 242E are displayed in the view region 213.

FIG. 2D illustrates a user input 299D directed to the asset type selection affordance 231 selecting listing of physical assets. In various implementations, the user input 299D is input by a user tapping a finger or stylus on a touch-sensitive display at the location of the asset type selection affordance 231. In various implementations, the user input 299D is input by a user clicking a mouse button while a cursor is displayed at the location of the asset type selection affordance 231.

Figure 2E:
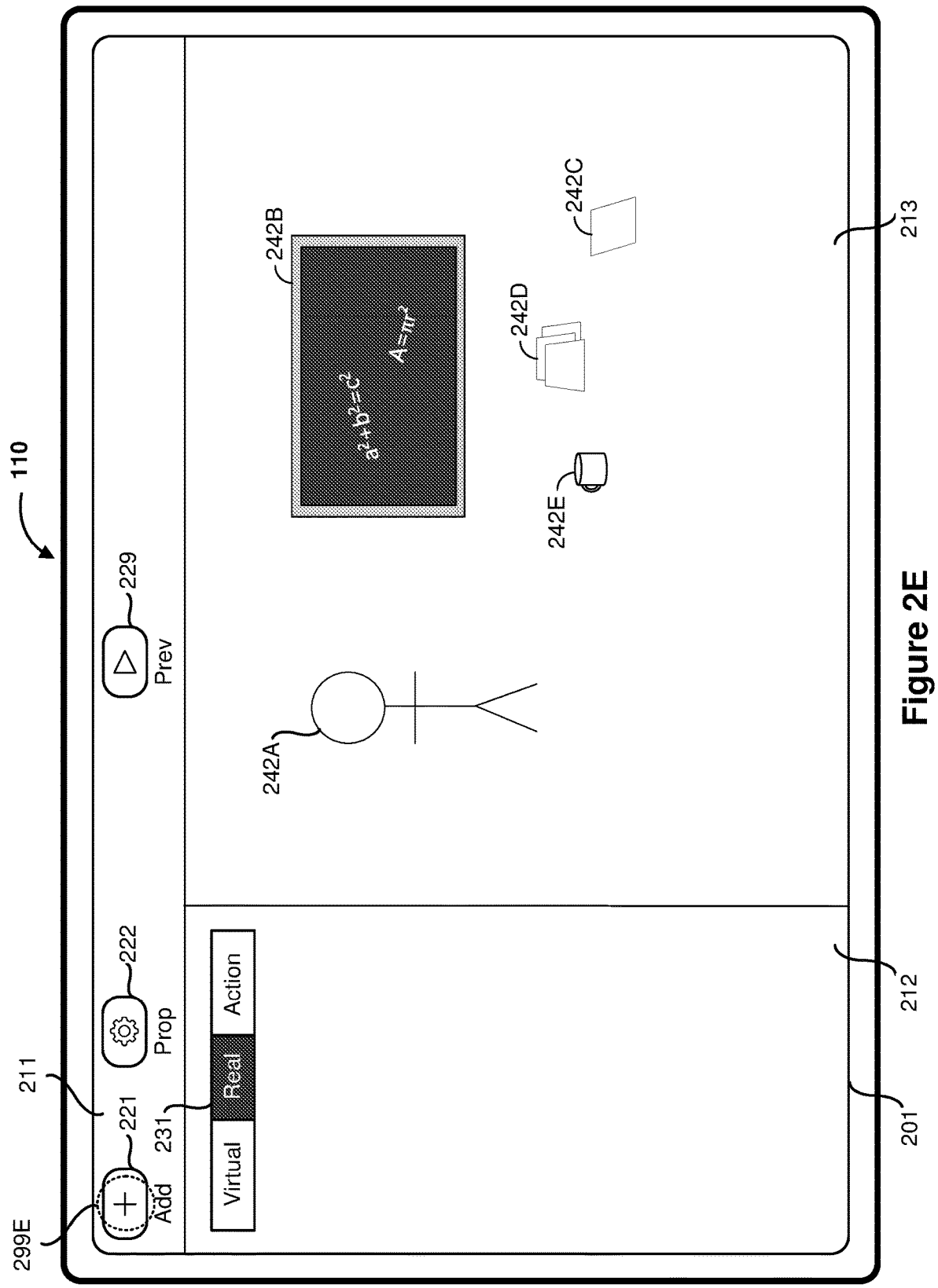

FIG. 2E illustrates the GUI of FIG. 2D in response to detecting the user input 299D directed to the asset type selection affordance 231. As compared to FIG. 2D, the assets region 212 displays a list of physical assets associated with the scene rather than a list of virtual assets associated with the scene. In FIG. 2E, no physical assets have yet been associated with the scene and the assets region 212 is blank.

FIG. 2E illustrates a user input 299E directed to the asset addition affordance 221. In various implementations, the user input 299E is input by a user tapping a finger or stylus on a touch-sensitive display at the location of the asset addition affordance 221. In various implementations, the user input 299E is input by a user clicking a mouse button while a cursor is displayed at the location of the asset addition affordance 221.

Figure 2F:
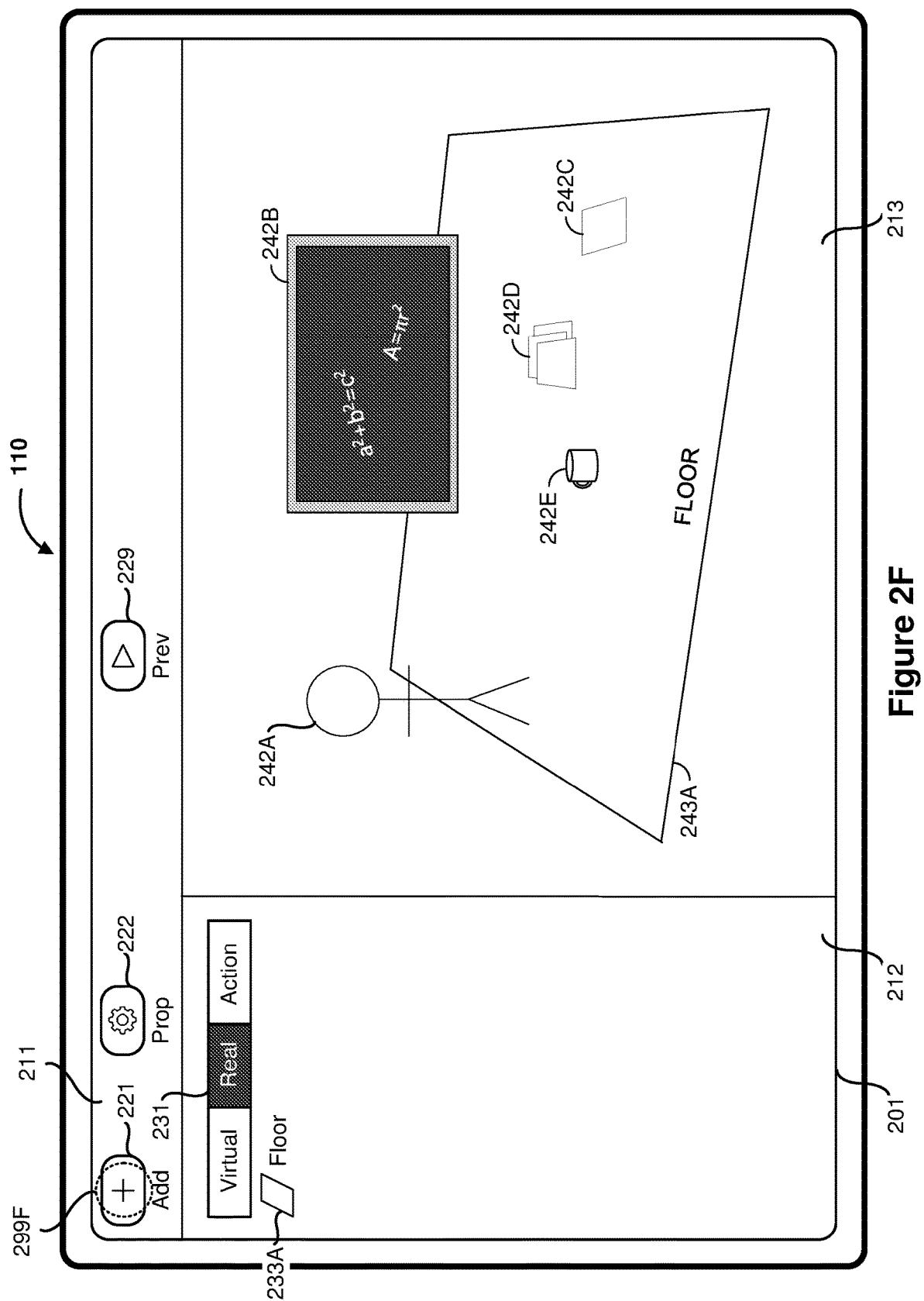

FIG. 2F illustrates the GUI 201 of FIG. 2E in response to detecting the user input 299E directed to the asset addition affordance 221 and additional user input to select a physical floor. In various implementations, the additional user input includes selecting the physical floor from a library of physical characteristics that may be present in various physical environments. In various implementations, the physical characteristics include physical surfaces, such as a physical plane. In various implementations, the physical characteristics include a physical horizontal plane or a physical vertical plane. In various implementations, the physical characteristics include a physical floor, a physical wall, or a physical ceiling. In various implementations, the physical characteristics include physical objects, such as a chair, a trashcan, a baseball, etc. In various implementations, the physical characteristics include environmental characteristics, such as temperature, humidity, ambient lighting conditions, location, or time-of-day.

In response to detecting the user input 299E directed to the asset addition affordance 221 and the additional user input selecting the physical floor, the scene is associated with a physical floor as a physical asset. Accordingly, a text representation of the physical floor 233A is displayed in the assets region 212 and a graphical representation of the physical floor 243A is displayed in the view region 213.

The text representation of the physical floor 233A is displayed in association with an icon indicating an object type of the physical floor, e.g., an icon indicating that the physical floor is a plane.

FIG. 2F illustrates a user input 299F directed to the asset addition affordance 221. In various implementations, the user input 299F is input by a user tapping a finger or stylus on a touch-sensitive display at the location of the asset addition affordance 221. In various implementations, the user input 299F is input by a user clicking a mouse button while a cursor is displayed at the location of the asset addition affordance 221.

Figure 2G:
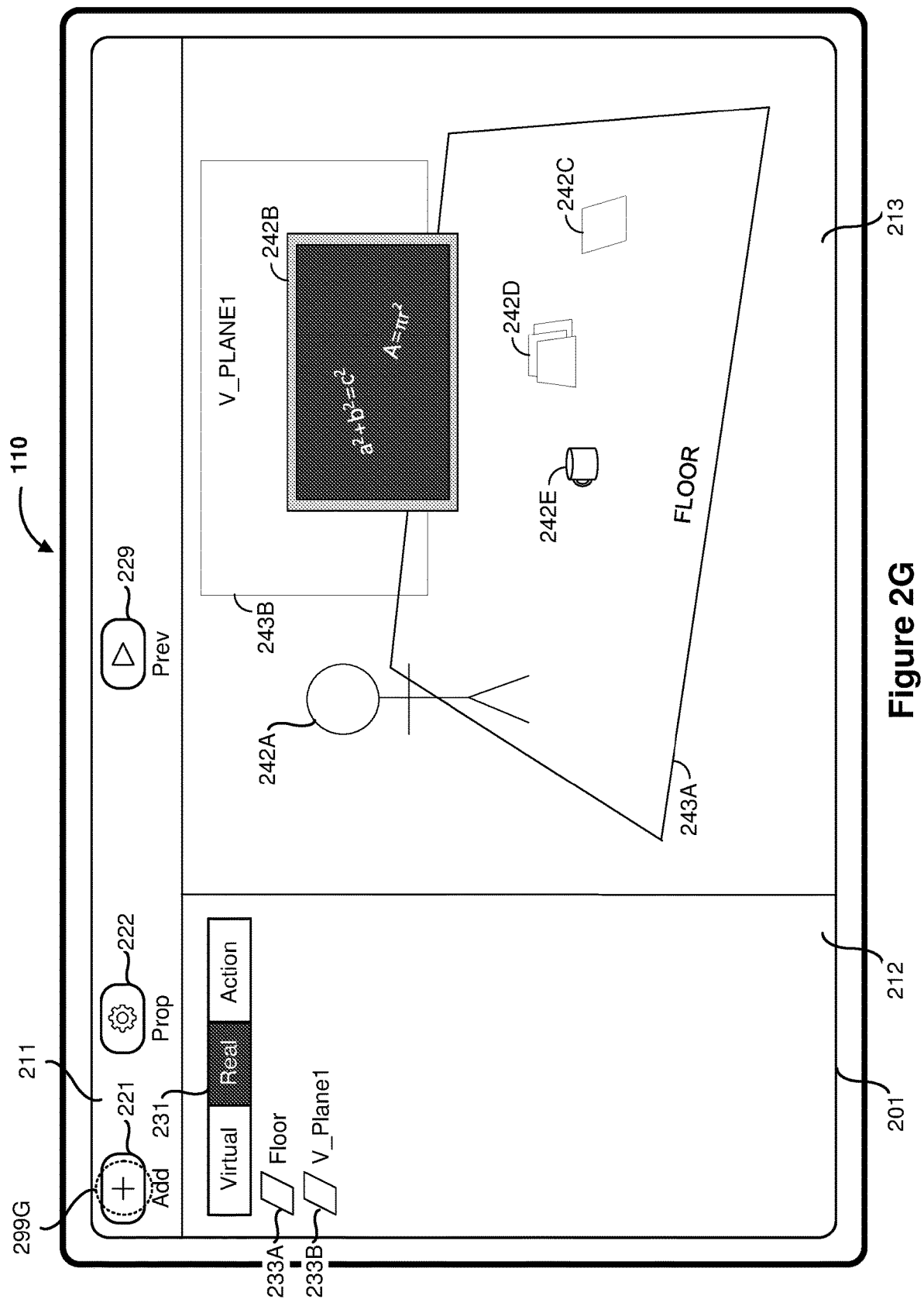

FIG. 2G illustrates the GUI 201 of FIG. 2F in response to detecting the user input 299F directed to the asset addition affordance 221 and additional user input to select a physical vertical plane. In response to detecting the user input 299F directed to the asset addition affordance 221 and the additional user input selecting the physical vertical plane, the scene is associated with a physical vertical plane as a physical asset. Accordingly, a text representation of the physical vertical plane 233B is displayed in the assets region 212 and a graphical representation of the physical vertical plane 243B is displayed in the view region 213.

FIG. 2G illustrates a user input 299G directed to the asset addition affordance 221. In various implementations, the user input 299G is input by a user tapping a finger or stylus on a touch-sensitive display at the location of the asset addition affordance 221. In various implementations, the user input 299G is input by a user clicking a mouse button while a cursor is displayed at the location of the asset addition affordance 221.

Figure 2H:
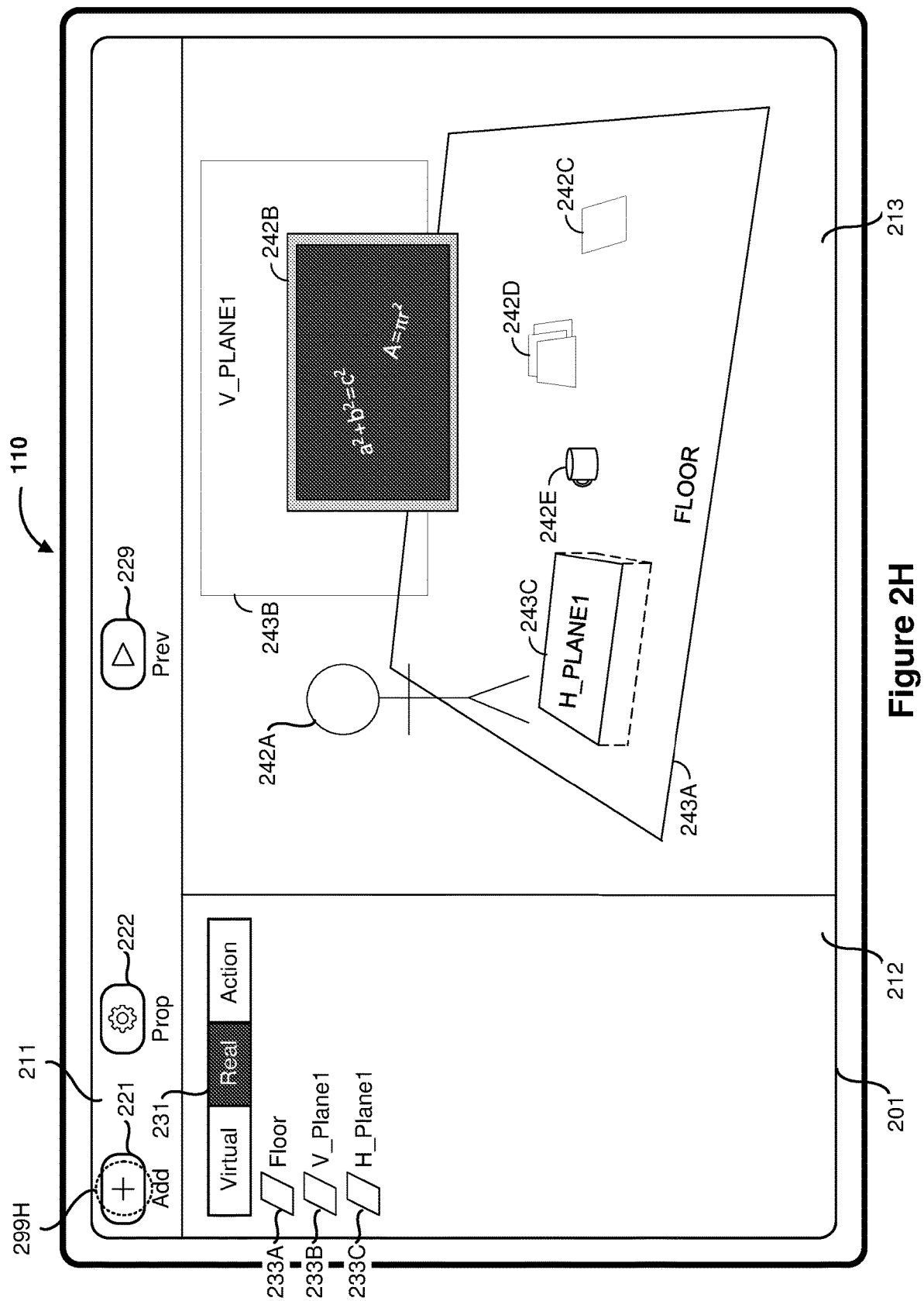

FIG. 2H illustrates the GUI 201 of FIG. 2G in response to detecting the user input 299G directed to the asset addition affordance 221 and additional user input to select a first physical horizontal plane. In response to detecting the user input 299G directed to the asset addition affordance 221 and the additional user input selecting the first physical horizontal plane, the scene is associated with a first physical horizontal plane as a physical asset. Accordingly, a text representation of the first physical horizontal plane 233C is displayed in the assets region 212 and a graphical representation of the first physical horizontal plane 243C is displayed in the view region 213.

FIG. 2H illustrates a user input 299H directed to the asset addition affordance 221. In various implementations, the user input 299H is input by a user tapping a finger or stylus on a touch-sensitive display at the location of the asset addition affordance 221. In various implementations, the user input 299H is input by a user clicking a mouse button while a cursor is displayed at the location of the asset addition affordance 221.

Figure 2I:
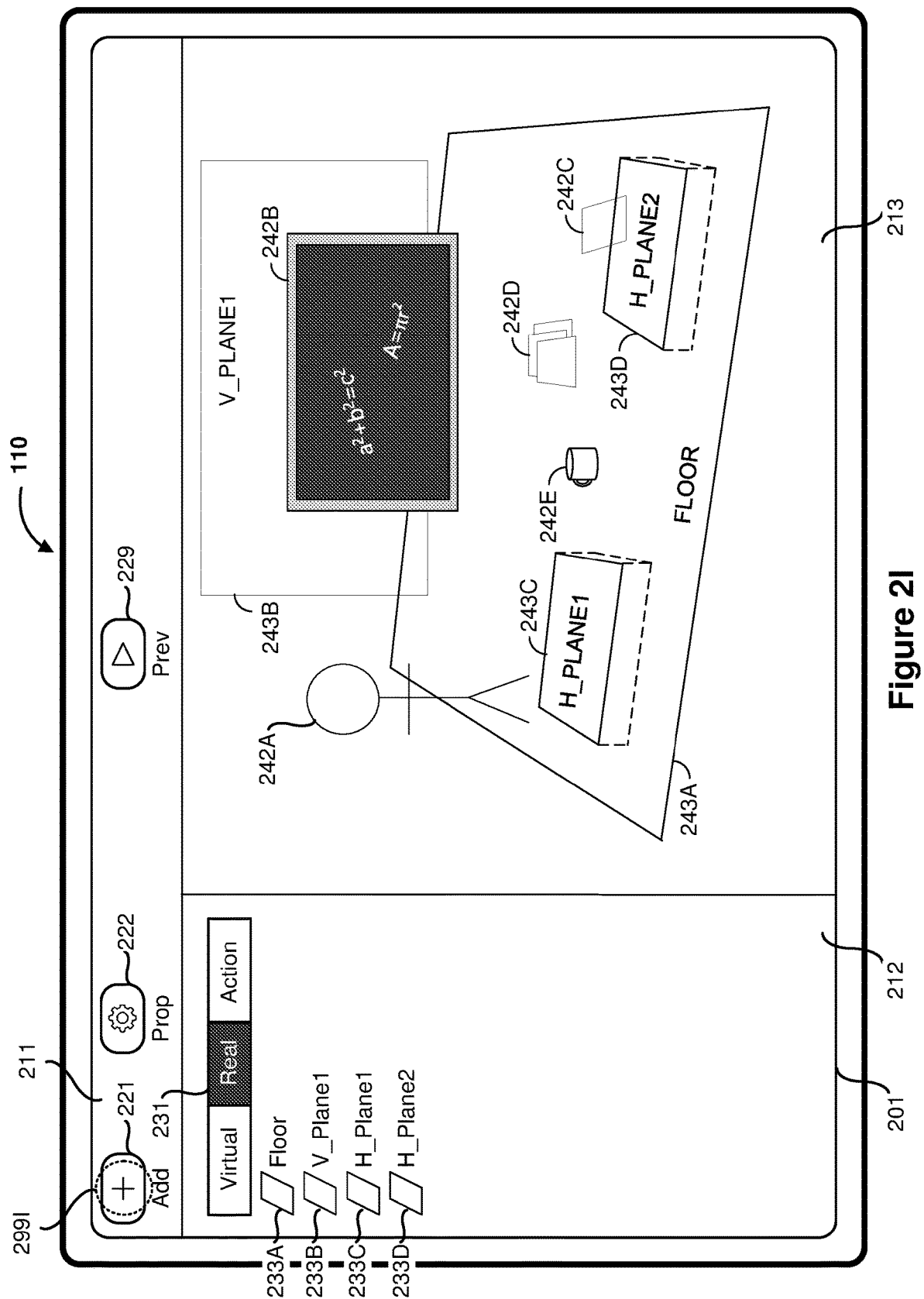

FIG. 2I illustrates the GUI 201 of FIG. 2H in response to detecting the user input 299H directed to the asset addition affordance 221 and additional user input to select a second physical horizontal plane. In response to detecting the user input 299H directed to the asset addition affordance 221 and the additional user input selecting the second physical horizontal plane, the scene is associated with a second physical horizontal plane as a physical asset. Accordingly, a text representation of the second physical horizontal plane 233D is displayed in the assets region 212 and a graphical representation of the second physical horizontal plane 243D is displayed in the view region 213.

FIG. 2I illustrates a user input 299I directed to the asset addition affordance 221. In various implementations, the user input 299I is input by a user tapping a finger or stylus on a touch-sensitive display at the location of the asset addition affordance 221. In various implementations, the user input 299I is input by a user clicking a mouse button while a cursor is displayed at the location of the asset addition affordance 221.

Figure 2J:
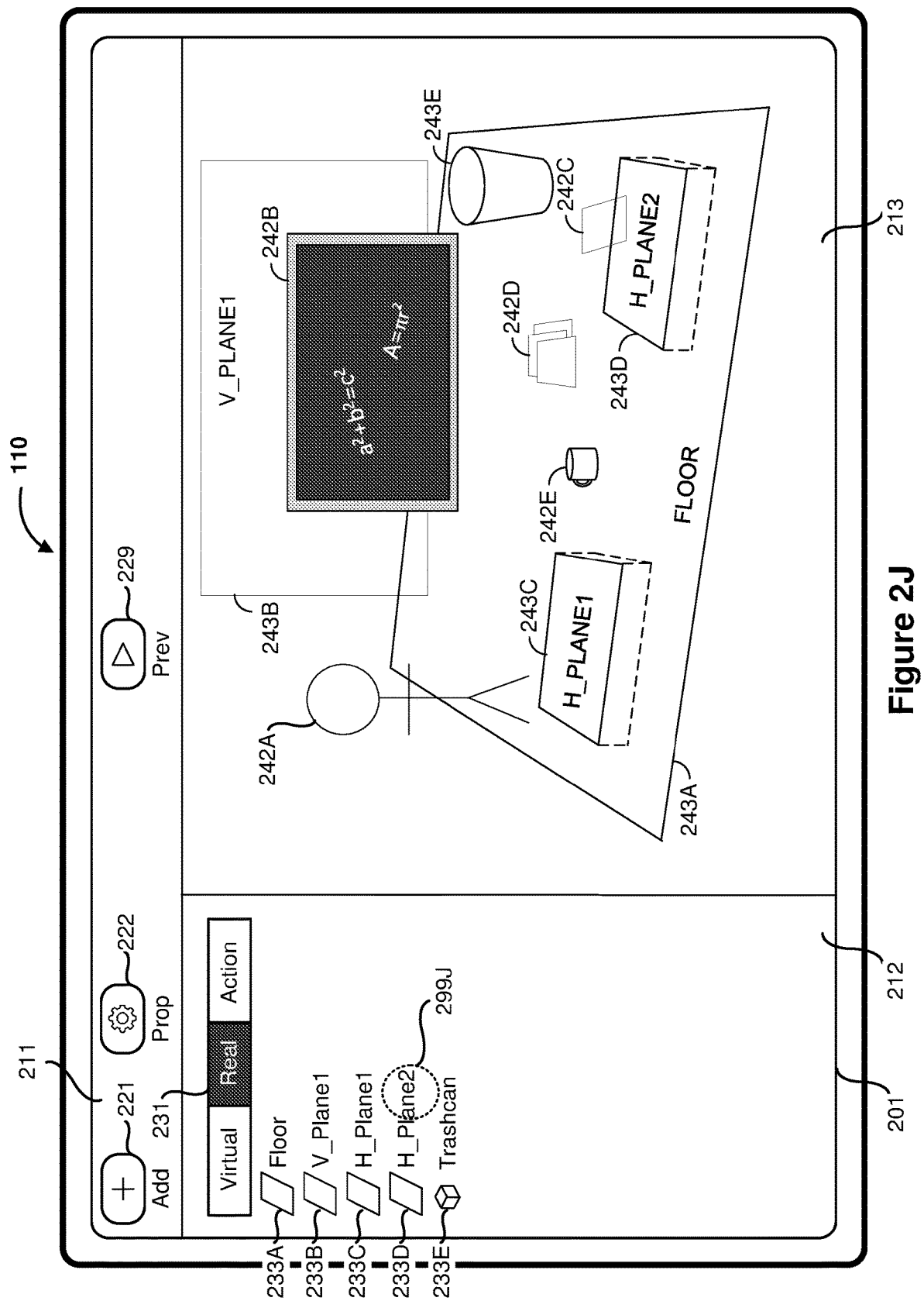

FIG. 2J illustrates the GUI 201 of FIG. 2J in response to detecting the user input 299I directed to the asset addition affordance 221 and additional user input to select a physical trashcan. In response to detecting the user input 299I directed to the asset addition affordance 221 and the additional user input selecting the physical trashcan, the scene is associated with a physical trashcan as a physical asset. Accordingly, a text representation of the physical trashcan 233E is displayed in the assets region 212 and a graphical representation of the physical trashcan 243E is displayed in the view region 213.

The text representation of the physical trashcan 233E is displayed in association with an icon indicating an object type of the physical trashcan, e.g., an icon indicating that the physical trashcan is a three-dimensional object.

FIG. 2J illustrates a user input 299J directed to the text representation of the second physical horizontal plane 233D. In various implementations, the user input 299J is input by a user tapping a finger or stylus on a touch-sensitive display at the location of the asset addition affordance 221. In various implementations, the user input 299J is input by a user clicking a mouse button while a cursor is displayed at the location of the asset addition affordance 221.

Figure 2K:
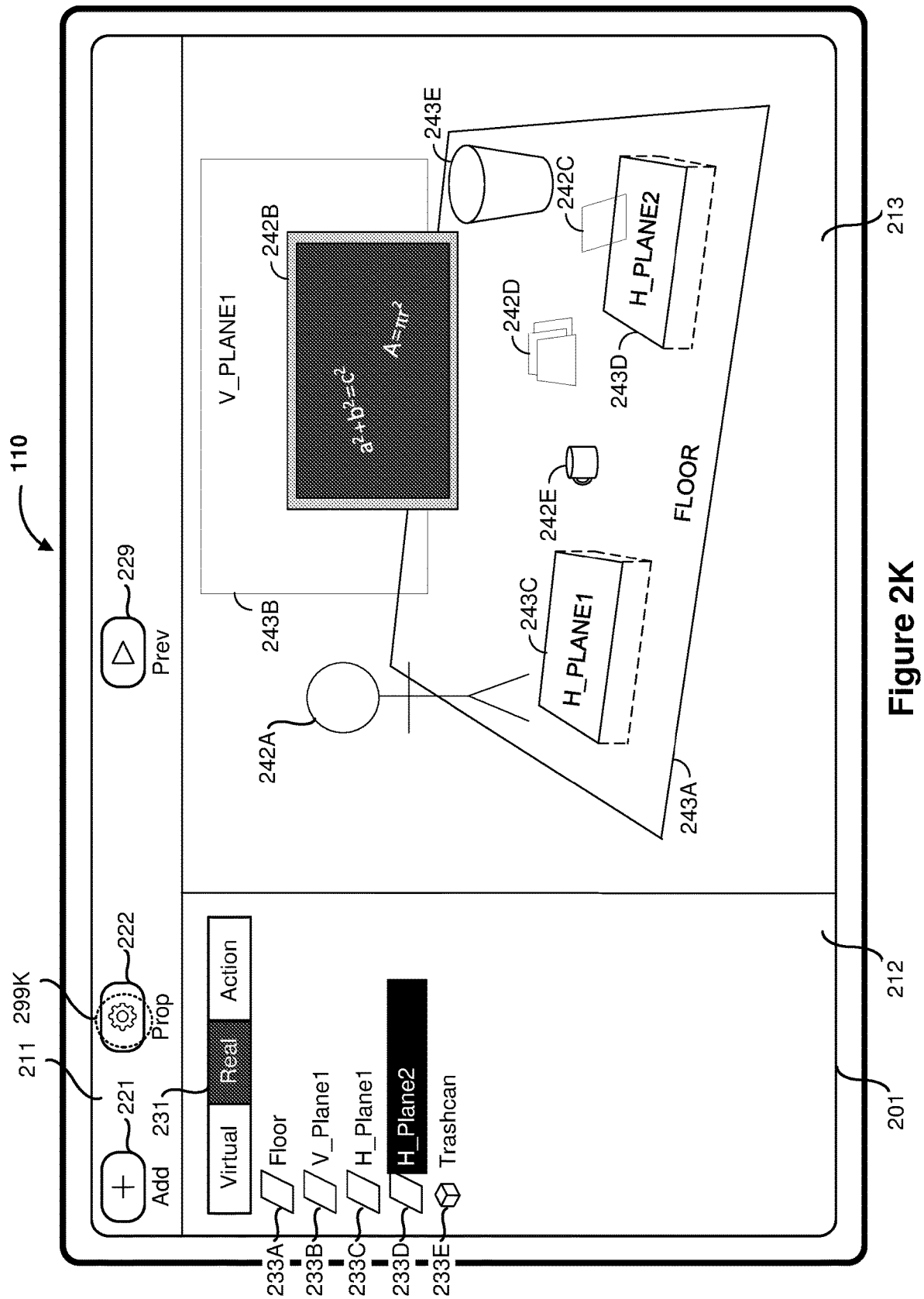

FIG. 2K illustrates the GUI 201 of FIG. 2K in response to detecting the user input 299J directed to the text representation of the second physical horizontal plane 233D. In response to detecting the user input 299J directed to the text representation of the second physical horizontal plane 233D, the text representation of the second physical horizontal plane 233D is displayed differently to indicate that the second physical horizontal plane is selected. In various implementations, the graphical representation of the second physical horizontal plane 243D is also (or alternatively) displayed differently to indicate that the second physical horizontal plane is selected. For example, in various implementations, the second physical horizontal plane is highlighted or displayed with a surrounding glow. In various implementations, user input directed to the graphical representation of the second physical horizontal plane 243D selects the second physical horizontal plane.

FIG. 2K illustrates a user input 299K directed to the properties affordance 222. In various implementations, the user input 299K is input by a user tapping a finger or stylus on a touch-sensitive display at the location of the properties affordance 222. In various implementations, the user input 299K is input by a user clicking a mouse button while a cursor is displayed at the location of the properties affordance 222.

Figure 2L:
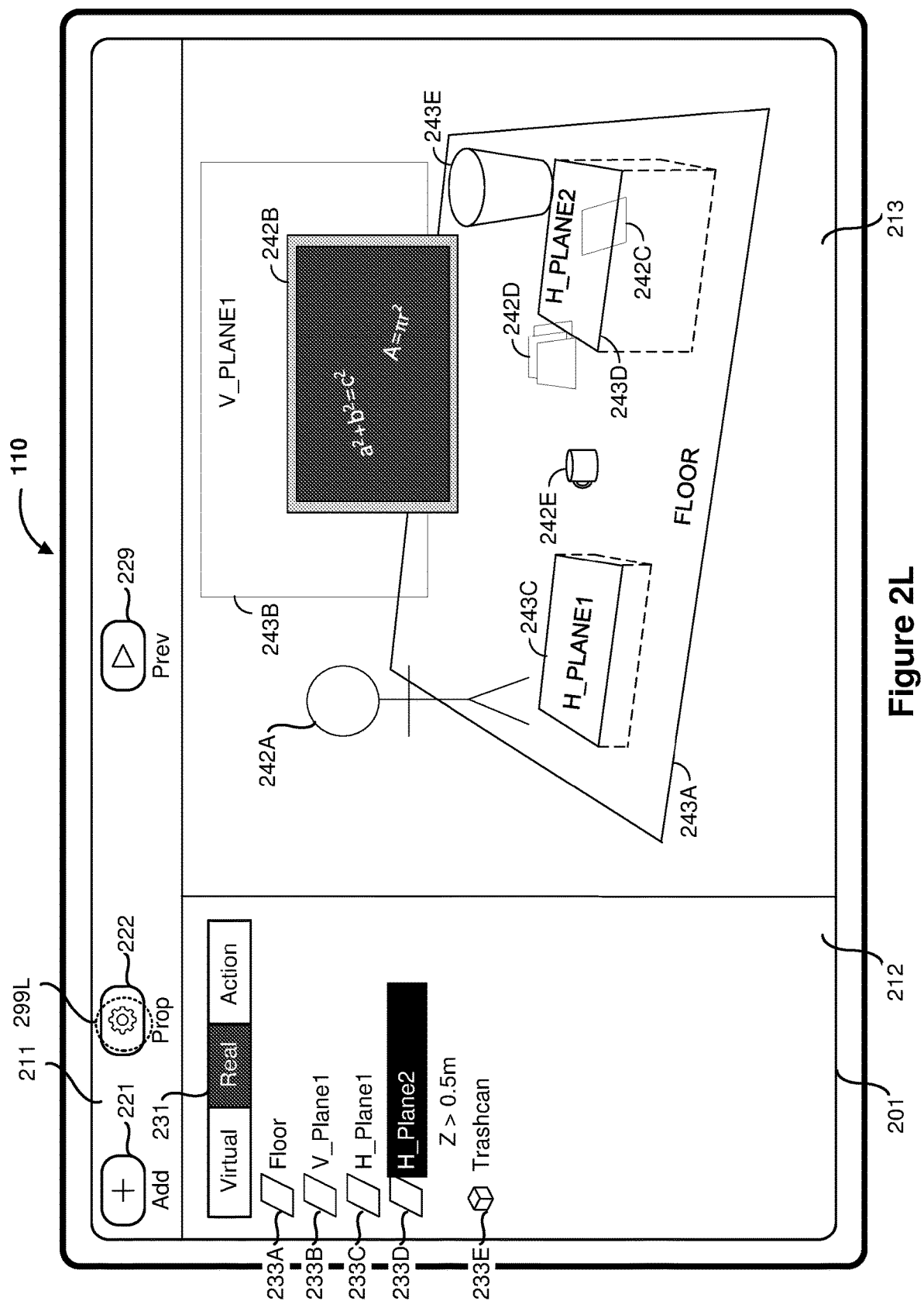

FIG. 2L illustrates the GUI 201 of FIG. 2K in response to detecting the user input 299K directed to the properties affordance 222 and additional user input to select a first property for the second physical horizontal plane. In particular, the additional user input selecting the first property includes user input associating the second physical horizontal plane with a property that its height value is above 0.5 meters. In response to detecting the user input 299K directed to the properties affordance 222 and the additional user input selecting the first property for the second physical horizontal plane, the second physical horizontal plane is associated with the first property. Accordingly, the text representation of the second physical horizontal plane 233D is displayed in the assets region 212 with a text representation of the first property and the graphical representation of the second physical horizontal plane 243D is displayed in the view region 213 having the first property.

FIG. 2L illustrates a user input 299L directed to the properties affordance 222. In various implementations, the user input 299L is input by a user tapping a finger or stylus on a touch-sensitive display at the location of the properties affordance 222. In various implementations, the user input 299L is input by a user clicking a mouse button while a cursor is displayed at the location of the properties affordance 222.

Figure 2M:
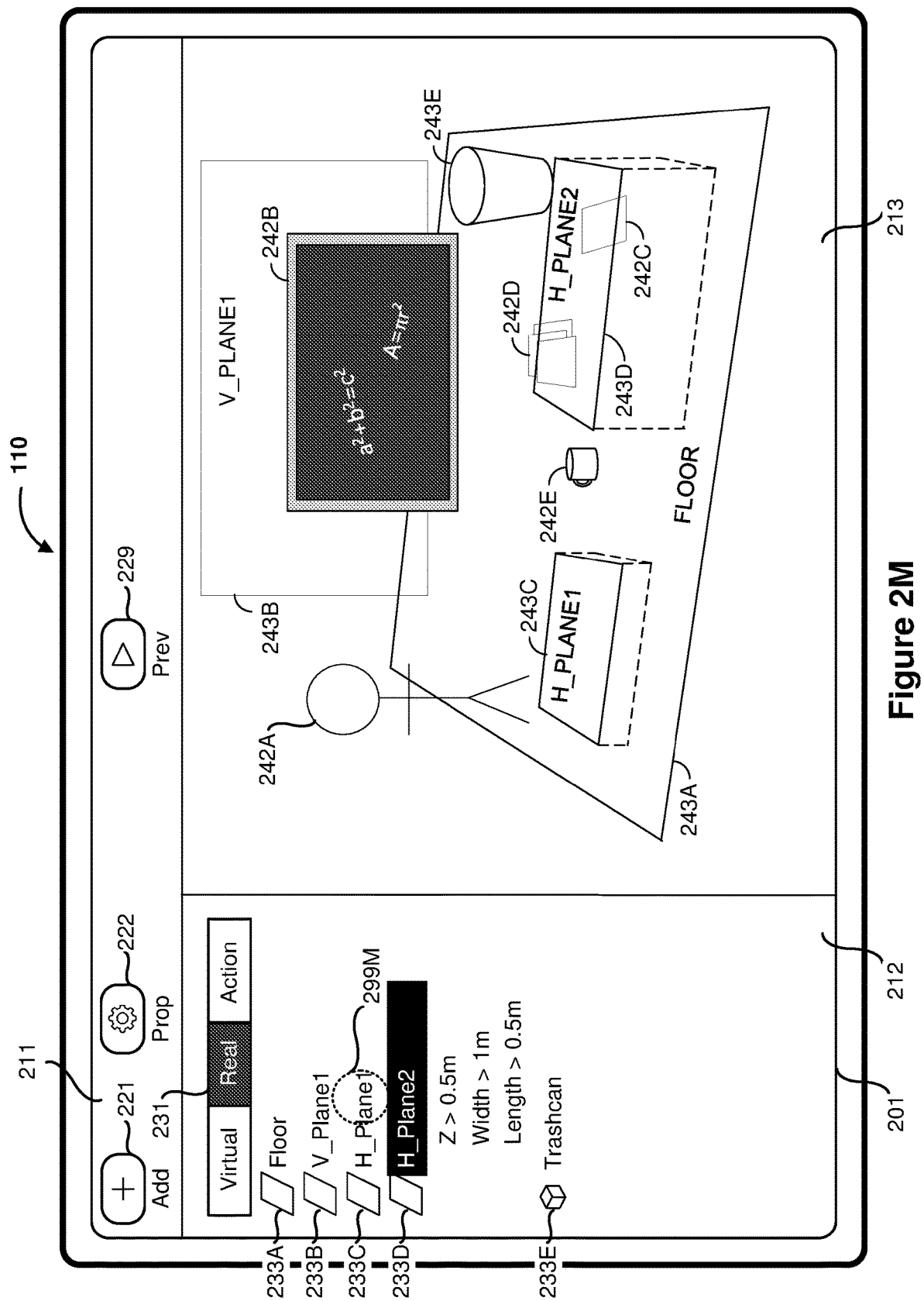

FIG. 2M illustrates the GUI 201 of FIG. 2L in response to detecting the user input 299L directed to the properties affordance 222 and additional user input to select a second property and third property for the second physical horizontal plane. In particular, the additional user input selecting the second property and third property includes user input associating the second physical horizontal plane with a property that its width value is above 1 meter and its length value is above 0.5 meters. In response to detecting the user input 299L directed to the properties affordance 222 and the additional user input selecting the second property and third property for the second physical horizontal plane, the second physical horizontal plane is associated with the second property and third property. Accordingly, the text representation of the second physical horizontal plane 233D is displayed in the assets region 212 with a text representation of the second property and the third property and the graphical representation of the second physical horizontal plane 243D is displayed in the view region 213 having the second property and third property.

FIG. 2M illustrates a user input 299M directed to the text representation of the first physical horizontal plane 233C. In various implementations, the user input 299M is input by a user tapping a finger or stylus on a touch-sensitive display at the location of the text representation of the first physical horizontal plane 233C. In various implementations, the user input 299M is input by a user clicking a mouse button while a cursor is displayed at the location of the text representation of the first physical horizontal plane 233C.

Figure 2N:
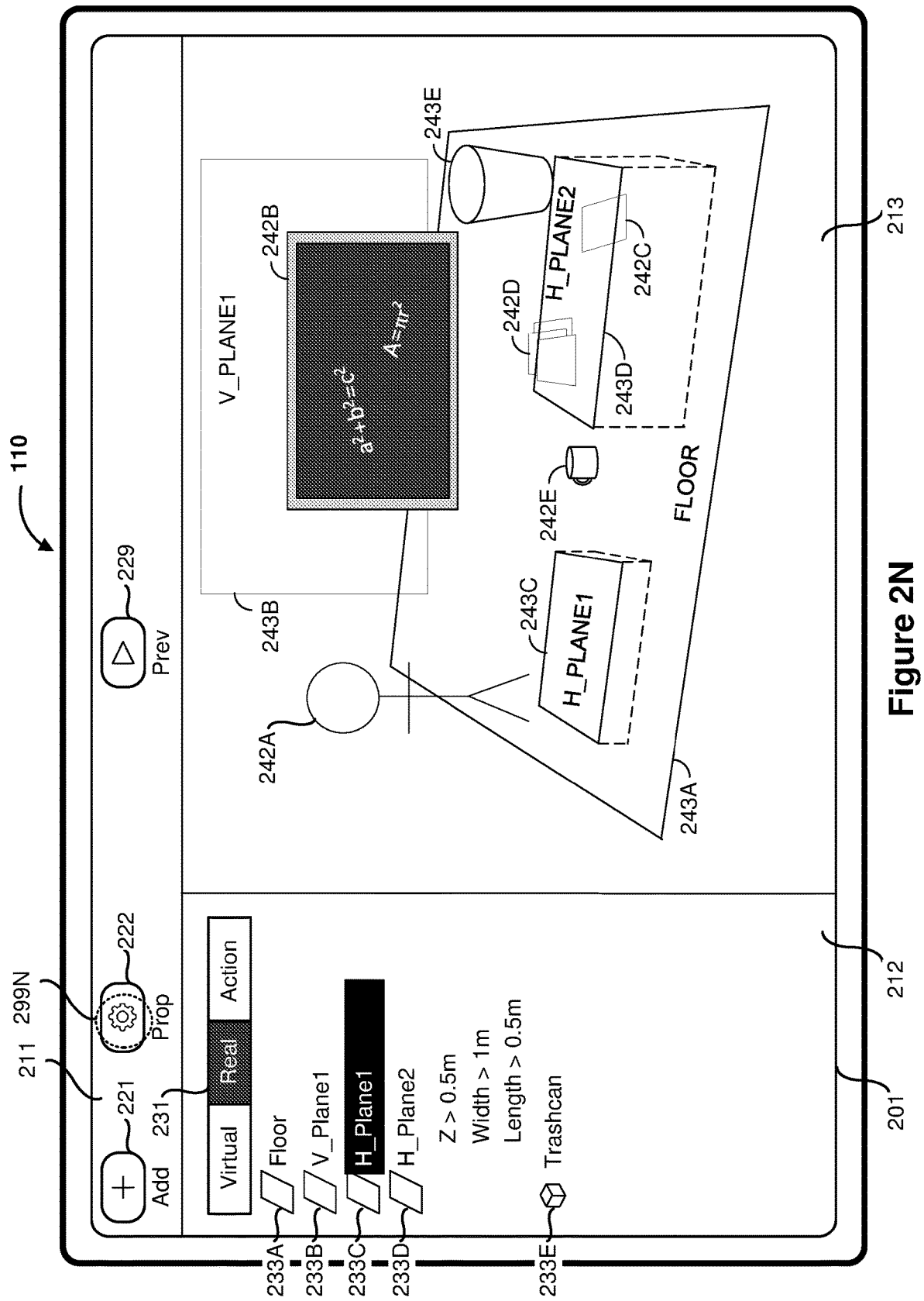

FIG. 2N illustrates the GUI 201 of FIG. 2M in response to detecting the user input 299M directed to the text representation of the first physical horizontal plane 233C. In response to detecting the user input 299M directed to the text representation of the first physical horizontal plane 233C, the text representation of the first physical horizontal plane 233C is displayed differently to indicate that the first physical horizontal plane is selected. In various implementations, the graphical representation of the first physical horizontal plane 243C is also (or alternatively) displayed differently to indicate that the first physical horizontal plane is selected. For example, in various implementations, the first physical horizontal plane is highlighted or displayed with a surrounding glow. In various implementations, user input directed to the graphical representation of the first physical horizontal plane 243C selects the first physical horizontal plane.

FIG. 2N illustrates a user input 299N directed to the properties affordance 222. In various implementations, the user input 299N is input by a user tapping a finger or stylus on a touch-sensitive display at the location of the properties affordance 222. In various implementations, the user input 299N is input by a user clicking a mouse button while a cursor is displayed at the location of the properties affordance 222.

Figure 2O:
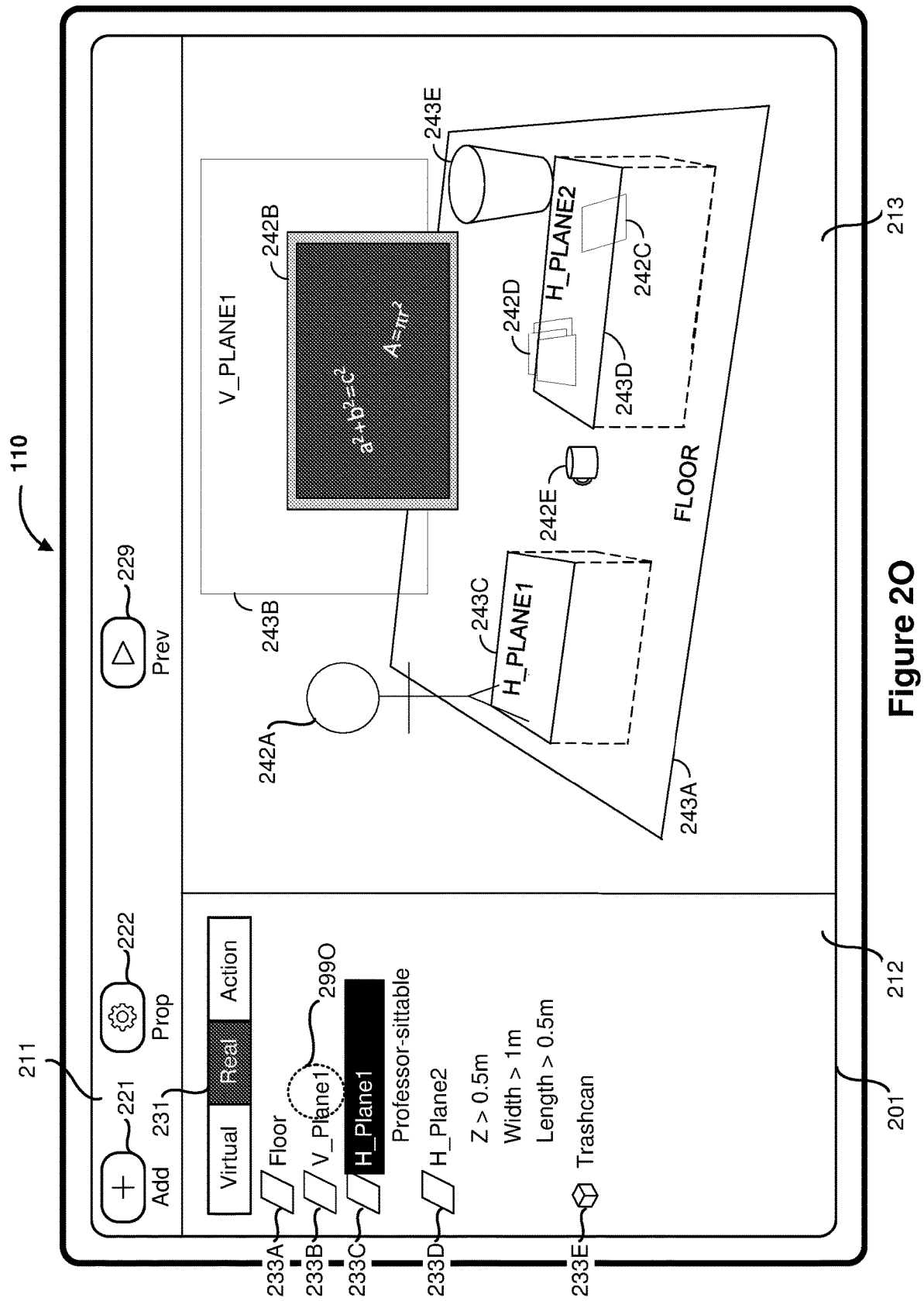

FIG. 2O illustrates the GUI 201 of FIG. 2N in response to detecting the user input 299N directed to the properties affordance 222 and additional user input to select a first property for the first physical horizontal plane. In particular, the additional user input selecting the first property includes user input associating the first physical horizontal plane with a property that it is professor-sittable. The first property indicates that the first physical horizontal plane is capable of being sat upon by the virtual professor objective-effectuator object. Similarly, the first property indicates that the virtual professor objective-effectuator object is capable of (including, in various implementations, being allowed to) sit upon the first physical horizontal plane. In various implementations, the property of being professor-sittable is defined by the user of the GUI 201, defined by the creator of the virtual professor objective-effectuator object, or defined by the creator of the GUI 201. In various implementations, the property of being professor-sittable is defined as a function of various criteria. For example, in various implementations, the criteria include a height value, length value, and width value being within particular ranges. In various implementations, the criteria include being associated with an object having one of a particular set of object types (e.g., "CHAIR", "STOOL", "SOFA", etc.). In various implementations, the criteria include being designated as professor-sittable by a user after detection of the horizontal plane. In various implementations, the function of the various criteria is that all the defined criteria must be met for a horizontal plane to be determined as professor-sittable. In various implementations, the function of the various criteria does not require that all the defined criteria be met. For example, in various implementations, a horizontal plane is determined as professor-sittable if (1) it is associated with an object type of "CHAIR" or (2) its height value, length value, and width value are within particular ranges and a user designates the horizontal plane as professor-sittable after detection of the horizontal plane having the height value, length value, and width value within the particular ranges. Thus, as an example, an electronic device detects the seat of a chair as a horizontal plane, detects the chair and assigns it an object type of "CHAIR", and determines that the horizontal plane is professor-sittable. Further, as another example, an electronic device detects the top of a flat rock as a horizontal plane, detects the rock and assigns it an object type of "ROCK" (and does not assign it an object type of "CHAIR"), determines that the height, length, and width of the horizontal plane are within particular ranges, requests that a user designate the horizontal plane as professor-sittable and, in response to an affirmative response from the user, determines that the horizontal plane is professor-sittable.

In response to detecting the user input 299N directed to the properties affordance 222 and the additional user input selecting the first property for the first physical horizontal plane, the first physical horizontal plane is associated with the first property. Accordingly, the text representation of the first physical horizontal plane 233C is displayed in the assets region 212 with a text representation of the first property. In various implementations, the graphical representation of the first physical horizontal plane 243C is displayed in the view region 213 having the first property, e.g., it is displayed as a chair or stool rather than a generic horizontal plane.

FIG. 2O illustrates a user input 299O directed to the text representation of the physical vertical plane 233B. In various implementations, the user input 299O is input by a user tapping a finger or stylus on a touch-sensitive display at the location of the text representation of the physical vertical plane 233B. In various implementations, the user input 299O is input by a user clicking a mouse button while a cursor is displayed at the location of the text representation of the physical vertical plane 233B.

Figure 2P:
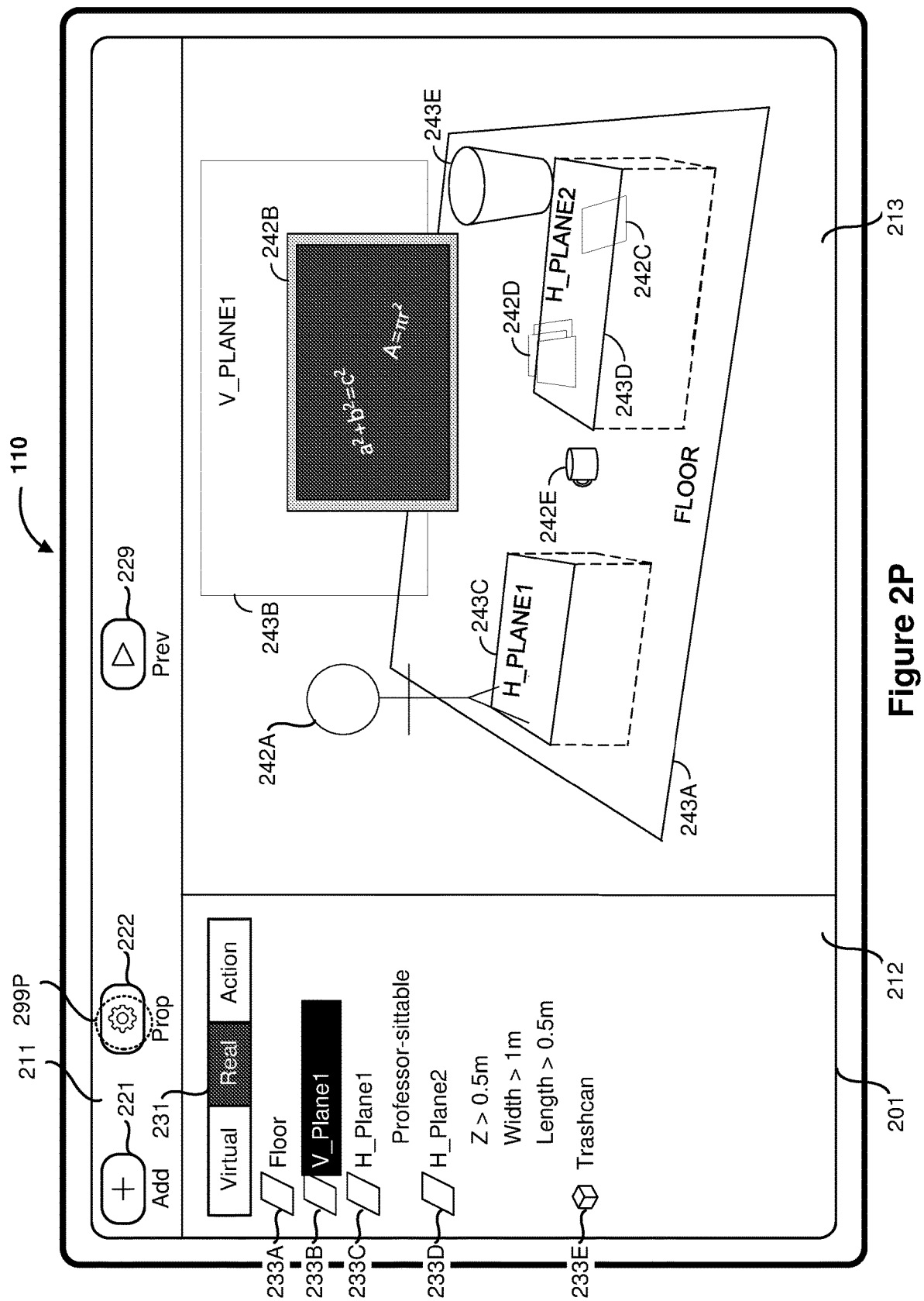

FIG. 2P illustrates the GUI 201 of FIG. 2O in response to detecting the user input 299O directed to the text representation of the physical vertical plane 233B. In response to detecting the user input 299O directed to the text representation of the physical vertical plane 233B, the text representation of the physical vertical plane 233B is displayed differently to indicate that the physical vertical plane is selected. In various implementations, the graphical representation of the physical vertical plane 243B is also (or alternatively) displayed differently to indicate that the physical vertical plane is selected. For example, in various implementations, the physical vertical plane is highlighted or displayed with a surrounding glow. In various implementations, user input directed to the graphical representation of the physical vertical plane 243B selects the physical vertical plane.

FIG. 2P illustrates a user input 299P directed to the properties affordance 222. In various implementations, the user input 299P is input by a user tapping a finger or stylus on a touch-sensitive display at the location of the properties affordance 222. In various implementations, the user input 299P is input by a user clicking a mouse button while a cursor is displayed at the location of the properties affordance 222.

Figure 2Q:
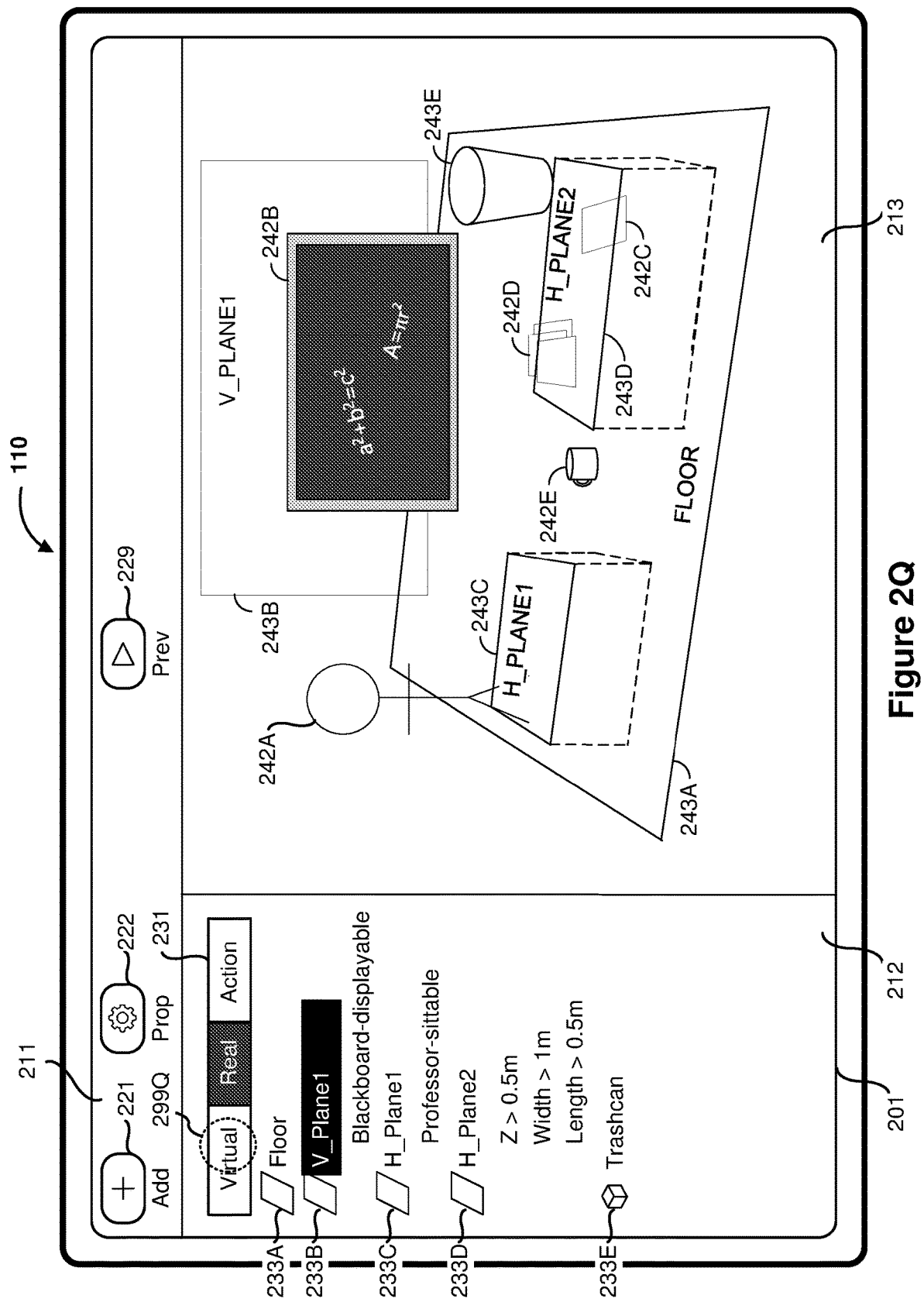

FIG. 2Q illustrates the GUI 201 of FIG. 2P in response to detecting the user input 299P directed to the properties affordance 222 and additional user input to select a first property for the physical vertical plane. In particular, the additional user input selecting the first property includes user input associating the physical vertical plane with a property that it is blackboard-displayable. The first property indicates that physical vertical plane is capable of having displayed thereupon the virtual blackboard object. Similarly, the first property indicates that the virtual blackboard object is capable of (including, in various implementations, being allowed to) being displayed upon the physical vertical plane. In various implementations, the property of being blackboard-displayable is defined by the user of the GUI 201, defined by the creator of the virtual blackboard object, or defined by the creator of the GUI 201. In various implementations, the property of being blackboard-displayable is defined as a function of various criteria. For example, in various implementations, the criteria include a height value and a width value being within particular ranges. In various implementations, the criteria include being associated with an object having one of a particular set of object types (e.g., "WALL"). In various implementations, the criteria include being of a uniform color. In various implementations, the criteria include being designated as blackboard-displayable by a user after detection of the vertical plane. In various implementations, the function of the various criteria is that all the defined criteria must be met for a vertical plane to be determined as blackboard-displayable. In various implementations, the function of the various criteria does not require that all the defined criteria be met. For example, in various implementations, a vertical plane is determined as blackboard-displayable if (1) it is of a uniform color and (2A) it is associated with an object type of "WALL" or (2B) its height value and width value are greater than particular thresholds. Thus, as an example, an electronic device detects a wall as a vertical plane, assigns the vertical plane an object type of "WALL", determines that the vertical plane is of a uniform color (e.g., not covered with pictures, posters, or other patterns), and, therefore, determines that the vertical plane is blackboard-displayable. Further, as another example, an electronic device detects the writing surface of a rollaway whiteboard (or the canvas of a blank painting upon an easel) as a vertical plane, detects the whiteboard and assigns it an object type other than "WALL" (e.g., "PARTITION" or "VERTICAL-OTHER"), determines that the height and width of the vertical plane are within particular ranges, determines that the vertical plane is of a uniform color (e.g., not covered with pictures, posters, or other patterns), and, therefore, determines that the vertical plane is blackboard-displayable.

In response to detecting the user input 299N directed to the properties affordance 222 and the additional user input selecting the first property for the first physical horizontal plane, the first physical horizontal plane is associated with the first property. Accordingly, the text representation of the first physical horizontal plane 233C is displayed in the assets region 212 with a text representation of the first property. In various implementations, the graphical representation of the first physical horizontal plane 243C is displayed in the view region 213 having the first property, e.g., it is displayed as a wall or partition rather than a generic horizontal plane.

FIG. 2Q illustrates a user input 299Q directed to the asset type selection affordance 231 selecting a list of virtual assets. In various implementations, the user input 299Q is input by a user tapping a finger or stylus on a touch-sensitive display at the location of the asset type selection affordance 231. In various implementations, the user input 299Q is input by a user clicking a mouse button while a cursor is displayed at the location of the asset type selection affordance 231.

Figure 2R:
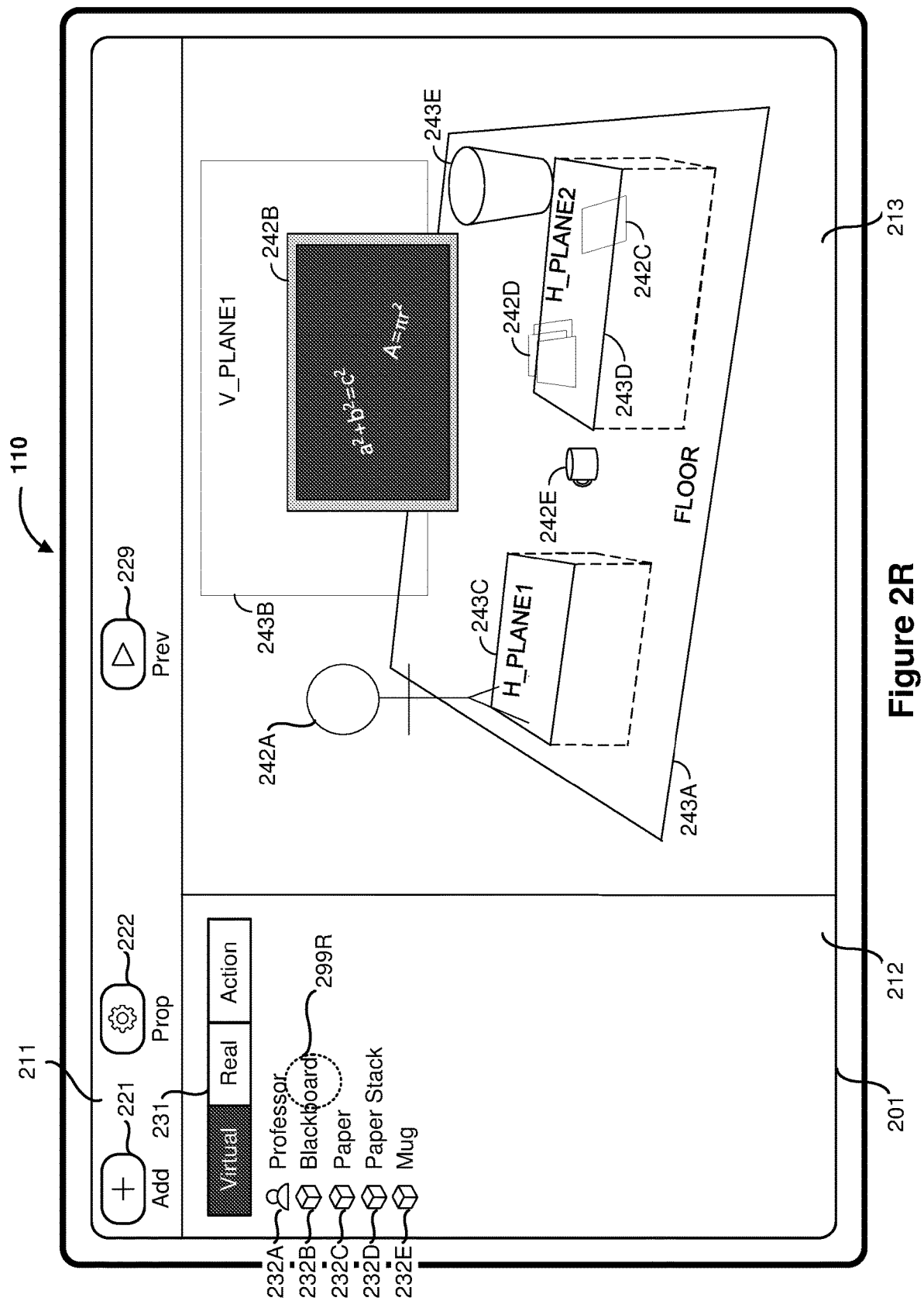

FIG. 2R illustrates the GUI of FIG. 2Q in response to detecting the user input 299D directed to the asset type selection affordance 231. As compared to FIG. 2Q, the assets region 212 displays a list of virtual assets associated with the scene rather than a list of physical assets associated with the scene. In FIG. 2R, the assets region displays the text representation of the virtual professor objective-effectuator object 232A, the text representation of the virtual blackboard object 232B, the text representation of the virtual paper object 232C, the text representation of the virtual paper stack object 232D, and the text representation of the virtual mug object 232E.

FIG. 2R illustrates a user input 299R directed to the text representation of the virtual blackboard object 232B. In various implementations, the user input 299R is input by a user tapping a finger or stylus on a touch-sensitive display at the location of the text representation of the virtual blackboard object 232B. In various implementations, the user input 299R is input by a user clicking a mouse button while a cursor is displayed at the location of the text representation of the virtual blackboard object 232B.

Figure 2S:
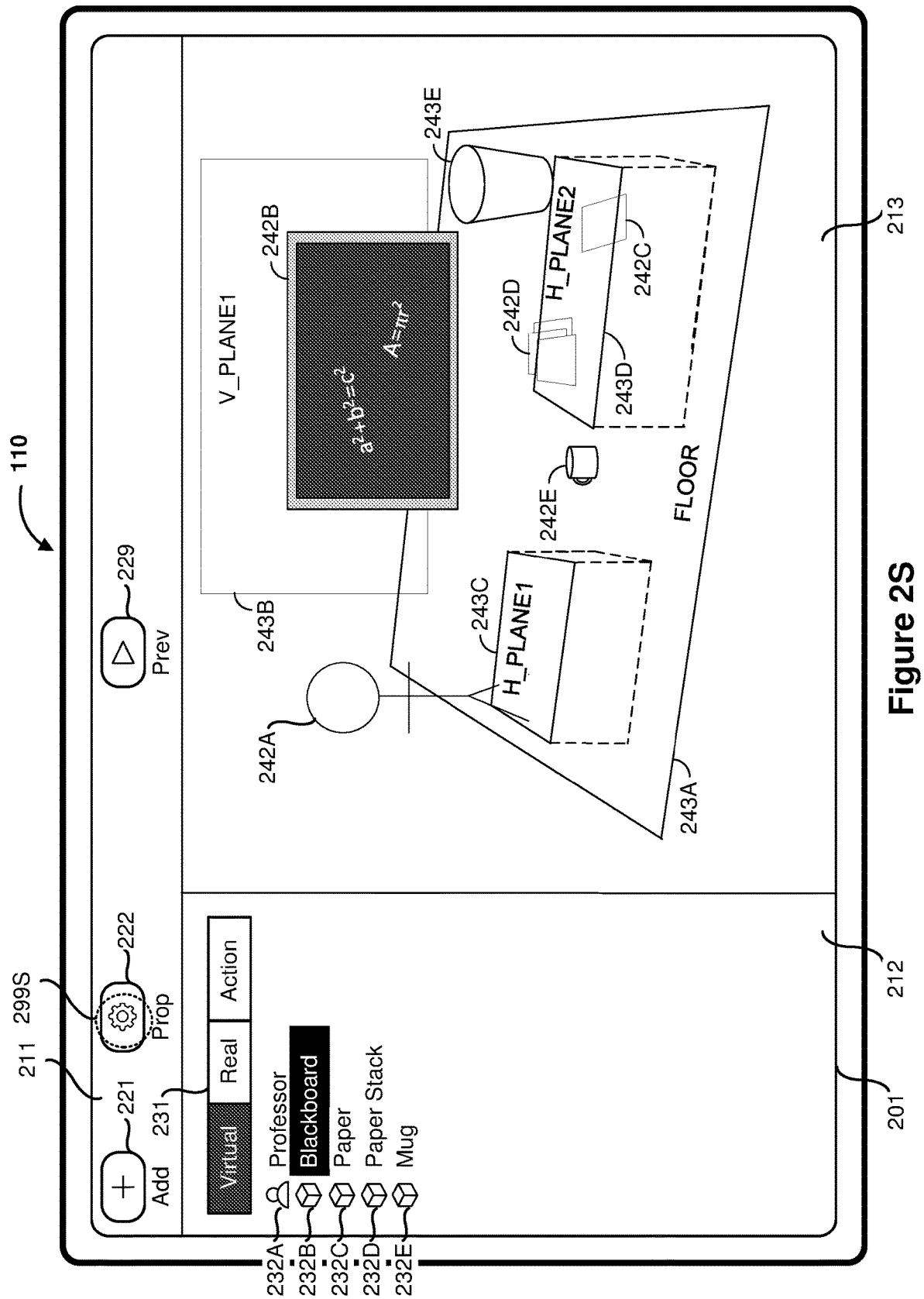

FIG. 2S illustrates the GUI 201 of FIG. 2R in response to detecting the user input 299R directed to the text representation of the virtual blackboard object 232B. In response to detecting the user input 299R directed to the text representation of the virtual blackboard object 232B, the text representation of the virtual blackboard object 232B is displayed differently to indicate that the virtual blackboard object is selected. In various implementations, the graphical representation of the virtual blackboard object 242B is also (or alternatively) displayed differently to indicate that the virtual blackboard object is selected. For example, in various implementations, the graphical representation of the virtual blackboard object 242B is highlighted or displayed with a surrounding glow. In various implementations, user input directed to the graphical representation of the virtual blackboard object 242B selects the virtual blackboard object.

FIG. 2S illustrates a user input 299S directed to the properties affordance 222. In various implementations, the user input 299S is input by a user tapping a finger or stylus on a touch-sensitive display at the location of the properties affordance 222. In various implementations, the user input 299S is input by a user clicking a mouse button while a cursor is displayed at the location of the properties affordance 222.

Figure 2T:
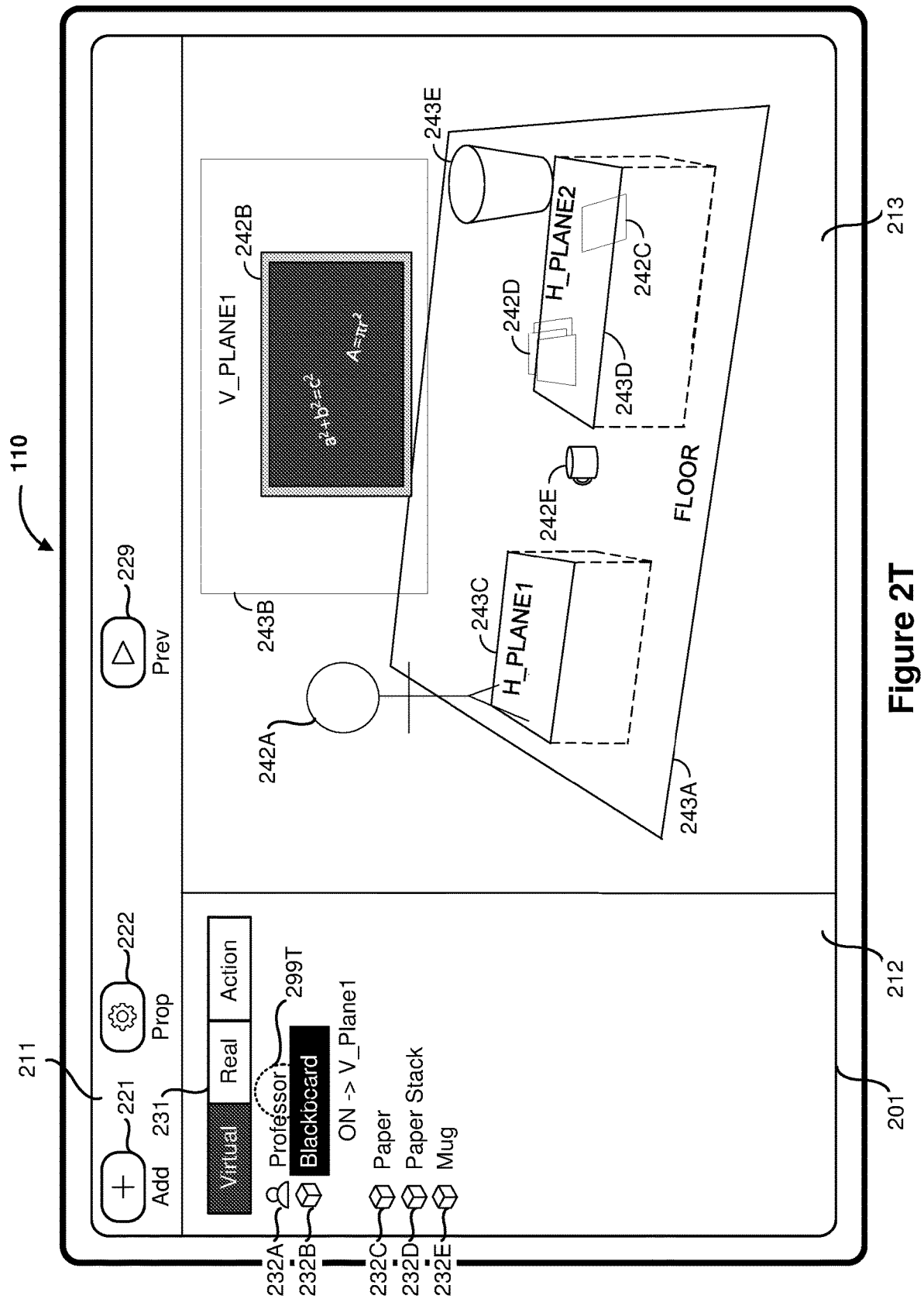

FIG. 2T illustrates the GUI 201 of FIG. 2S in response to detecting the user input 299S directed to the properties affordance 222 and additional user input to select a first property for the virtual blackboard object. In particular, the additional user input selecting the first property includes user input associating the virtual blackboard object with a property that it is "ON" the physical vertical plane. In response to detecting the user input 299S directed to the properties affordance 222 and the additional user input selecting the first property for the virtual blackboard object, the virtual blackboard object is associated with the first property. Accordingly, the text representation of the virtual blackboard object 232B is displayed in the assets region 212 with a text representation of the first property and the graphical representation of the virtual blackboard object 242B is displayed in the view region 213 having the first property, e.g., it is on the graphical representation of the physical vertical plane 243B.

FIG. 2T illustrates a user input 299T directed to the text representation of the virtual professor objective-effectuator object 232A. In various implementations, the user input 299T is input by a user tapping a finger or stylus on a touch-sensitive display at the location of the text representation of the virtual professor objective-effectuator object 232A. In various implementations, the user input 299T is input by a user clicking a mouse button while a cursor is displayed at the location of the text representation of the virtual professor objective-effectuator object 232A.

Figure 2U:
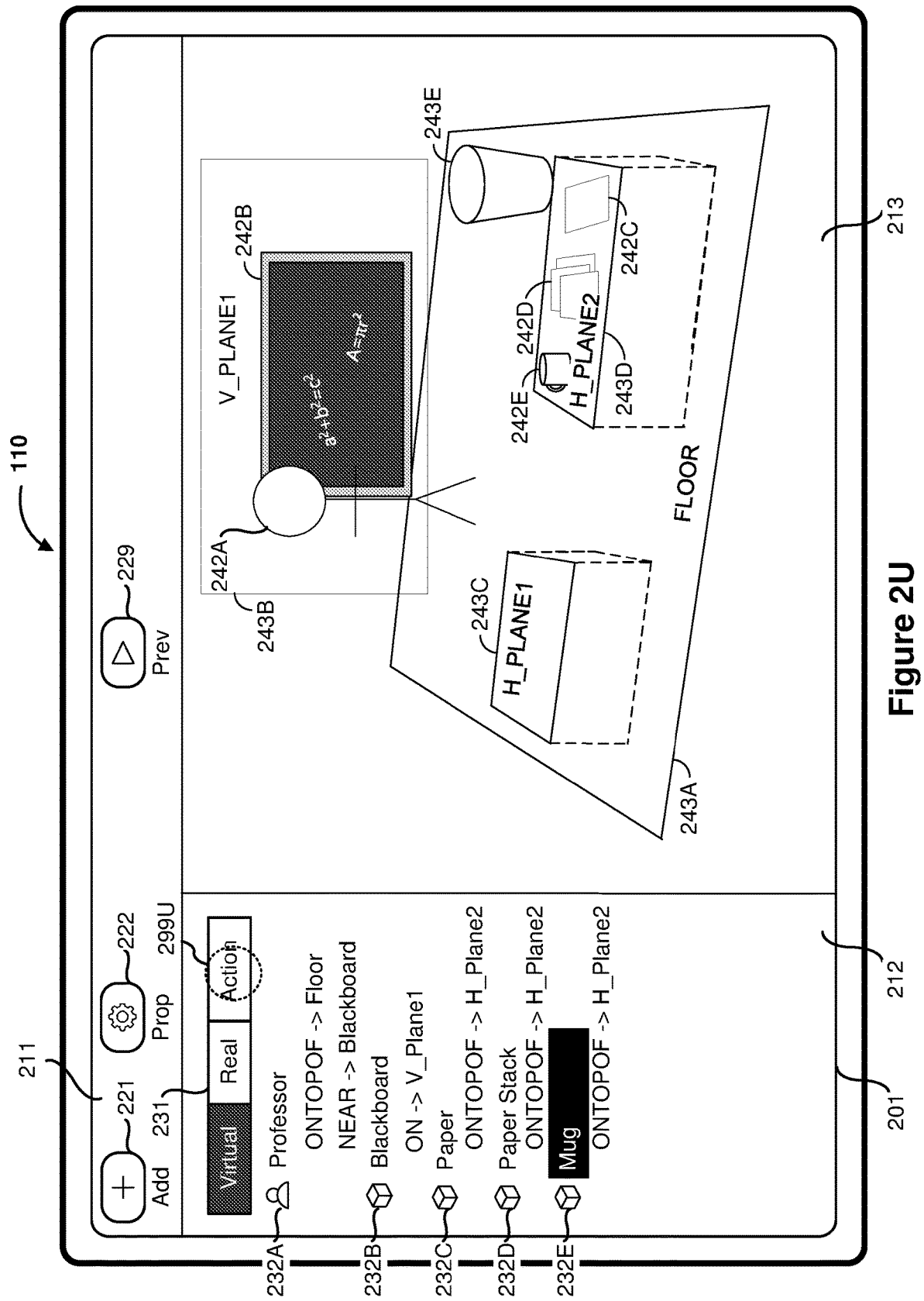

FIG. 2U illustrates the GUI 201 of FIG. 2T in response to detecting the user input 299T directed to the text representation of the virtual professor objective-effectuator object 232A and additional user input to associate properties with the various virtual objects.

The additional user input includes user input to associate the virtual professor objective-effectuator object with a first property that the virtual professor objective-effectuator object is "ONTOPOF" the physical floor and a second property that the virtual professor objective-effectuator object is "NEAR" the virtual blackboard object. Accordingly, the text representation of the virtual professor objective-effectuator object 232A is displayed in the assets region 212 with a text representation of the first property and second property. Further, the graphical representation of the virtual professor objective-effectuator object 242A is displayed in the view region 213 having the first property and second property, e.g., it is on top of the graphical representation of the physical floor 243A and near the graphical representation of the virtual blackboard object 242B.

The additional user input includes user input to associate each of the virtual paper object, the virtual paper stack object, and the virtual mug object with a first property that the virtual object is "ONTOPOF" the second physical horizontal plane. Accordingly, the text representation of the virtual paper object 232C, the text representation of the virtual paper stack object 232D, and the text representation of the virtual mug object 232E are each displayed in the assets region 212 with a text representation of the first property. Further, the graphical representation of the virtual paper object 242C, the graphical representation of the virtual paper stack object 242D, and the graphical representation of the virtual mug object 242E are each displayed in the view region 213 having the first property, e.g., each graphical representation is on top of the graphical representation of the second physical horizontal plane 243D.

FIG. 2U illustrates a user input 299U directed to the asset type selection affordance 231 selecting listing of action assets. In various implementations, the user input 299U is input by a user tapping a finger or stylus on a touch-sensitive display at the location of the asset type selection affordance 231. In various implementations, the user input 299U is input by a user clicking a mouse button while a cursor is displayed at the location of the asset type selection affordance 231.

Figure 2V:
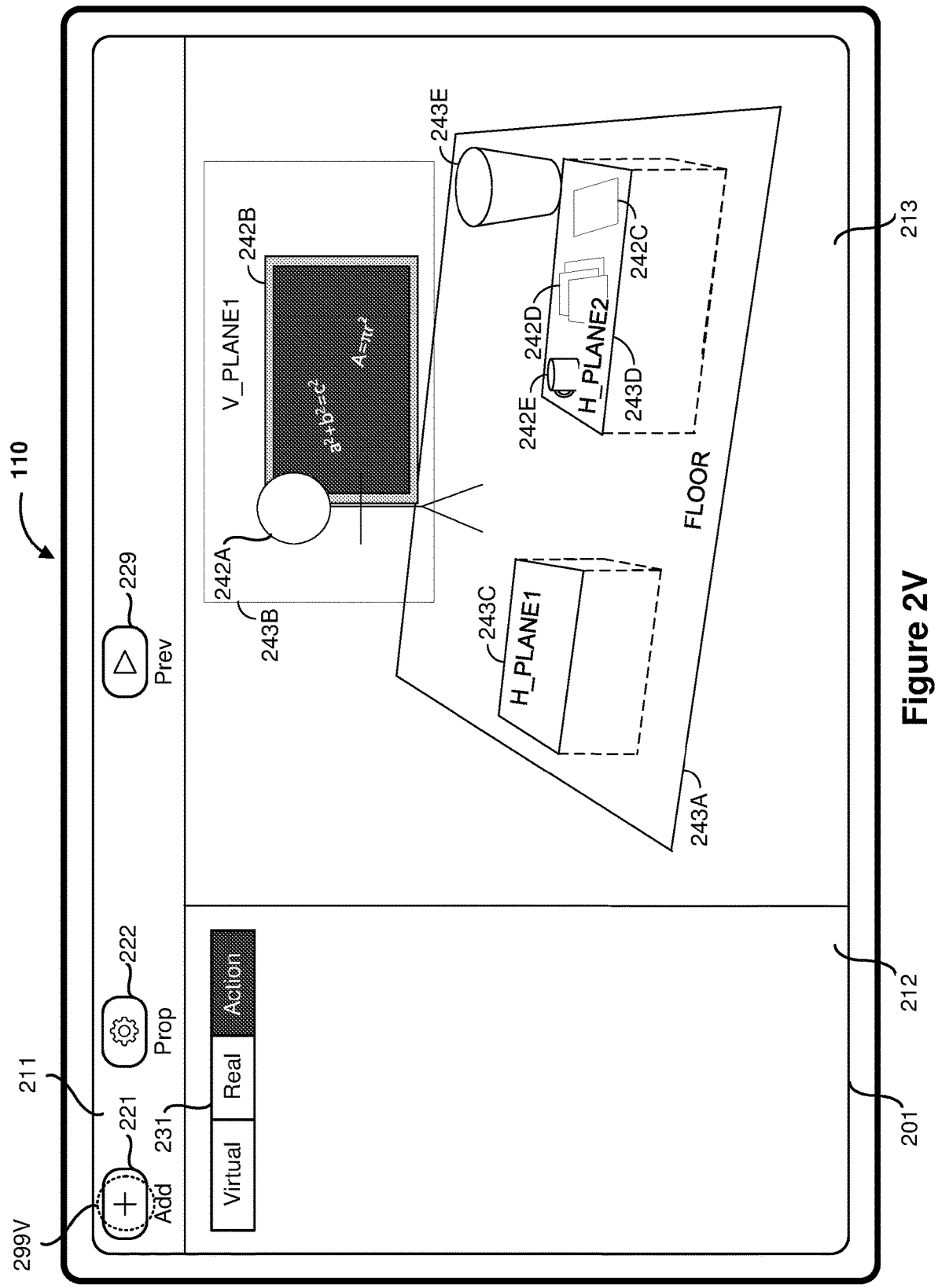

FIG. 2V illustrates the GUI of FIG. 2U in response to detecting the user input 299U directed to the asset type selection affordance 231. As compared to FIG. 2U, the assets region 212 displays a list of action assets associated with the scene rather than a list of physical assets associated with the scene. In FIG. 2V, no action assets have yet been associated with the scene and the assets region 212 is blank.

FIG. 2V illustrates a user input 299V directed to the asset addition affordance 221. In various implementations, the user input 299V is input by a user tapping a finger or stylus on a touch-sensitive display at the location of the asset addition affordance 221. In various implementations, the user input 299V is input by a user clicking a mouse button while a cursor is displayed at the location of the asset addition affordance 221.

Figure 2W:
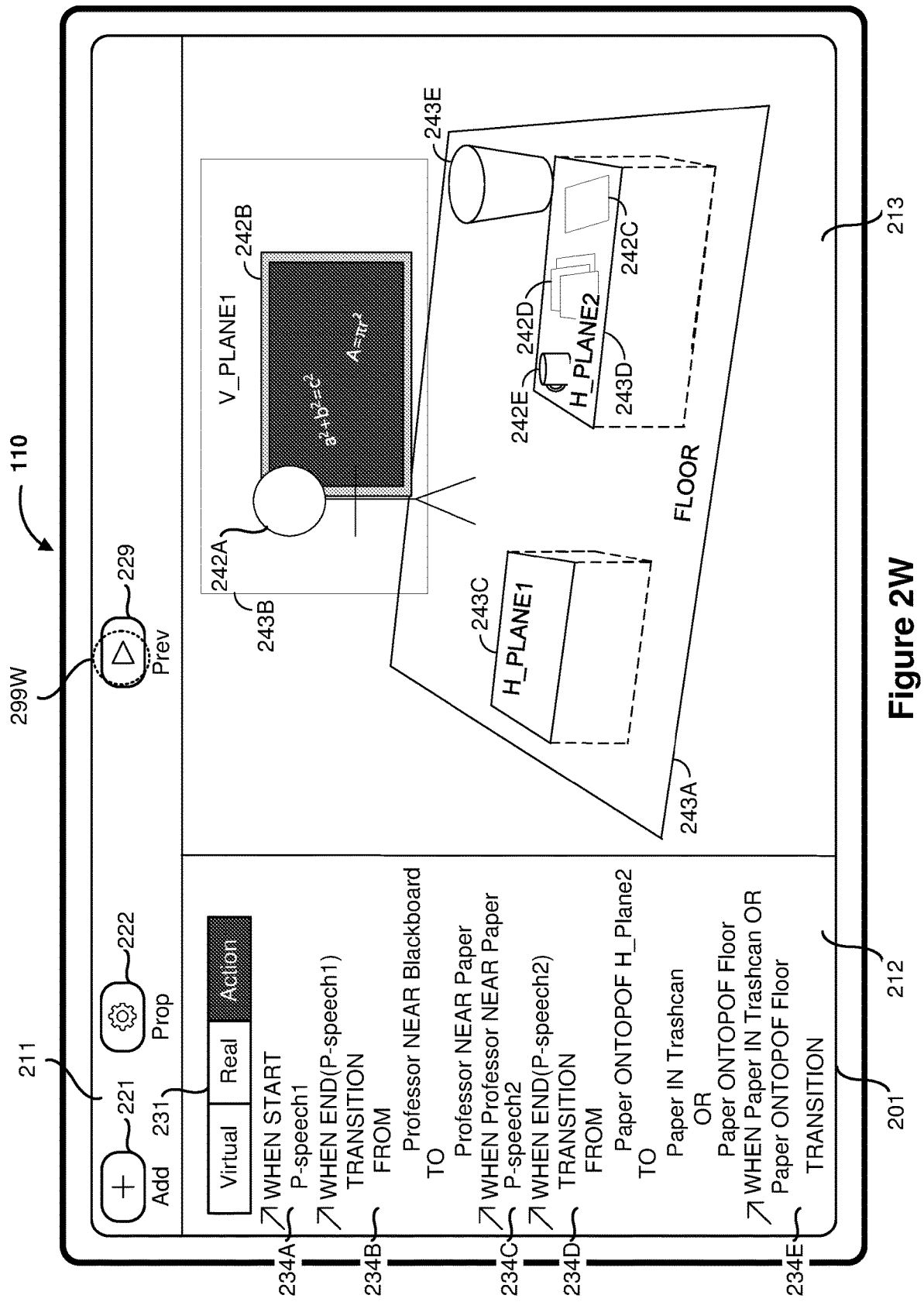

FIG. 2W illustrates the GUI 201 of FIG. 2V in response to detecting the user input 299V directed to the asset addition affordance 221 and additional user input to add numerous action assets to the scene. In response to detecting the user input 299V directed to the asset addition affordance 221 and the additional user input to add numerous action assets to the scene, the scene is associated with numerous action assets, some of which are displayed by text representations in the assets region 212.

The action assets include a first action asset illustrated by the text representation of the first action asset 234A. The first action asset describes an action that begins when the scene starts and includes the virtual professor objective-effectuator object giving a first speech, which may include both audio and animation of the virtual professor objective-effectuator object.

The action assets include a second action asset illustrated by the text representation of the second action asset 234B. The second action asset describes an action that begins when the virtual professor objective-effectuator object concludes the first speech and includes the virtual professor objective-effectuator object moving from near the virtual blackboard object to near the virtual paper object.

The action assets include a third action asset illustrated by the text representation of the third action asset 234C. The third action asset describes an action that begins when the virtual professor objective-effectuator object is near the virtual paper object and includes the virtual professor objective-effectuator object giving a second speech.

The action assets include a fourth action asset illustrated by the text representation of the fourth action asset 234D. The fourth action asset describes an action that begins when the virtual professor objective-effectuator object concludes the second speech and includes moving the virtual paper object from on top of the second physical horizontal plane to inside the physical trashcan or on top of the physical floor. This may be accomplished by the virtual professor objective-effectuator picking up the virtual paper object and throwing it into the physical trashcan or onto the physical floor.

The action assets include a fifth action asset illustrated by the text representation of the fifth action asset 234E. The fifth action asset describes an action that begins when the virtual paper object is inside the physical trashcan or on top of the physical floor and includes the virtual professor objective-effectuator sitting on the first physical horizontal plane, which is professor-sittable.

FIG. 2W illustrates a user input 299W directed to the preview affordance 229. In various implementations, the user input 299W is input by a user tapping a finger or stylus on a touch-sensitive display at the location of the preview affordance 229. In various implementations, the user input 299W is input by a user clicking a mouse button while a cursor is displayed at the location of the preview affordance 229.

Figure 3A:
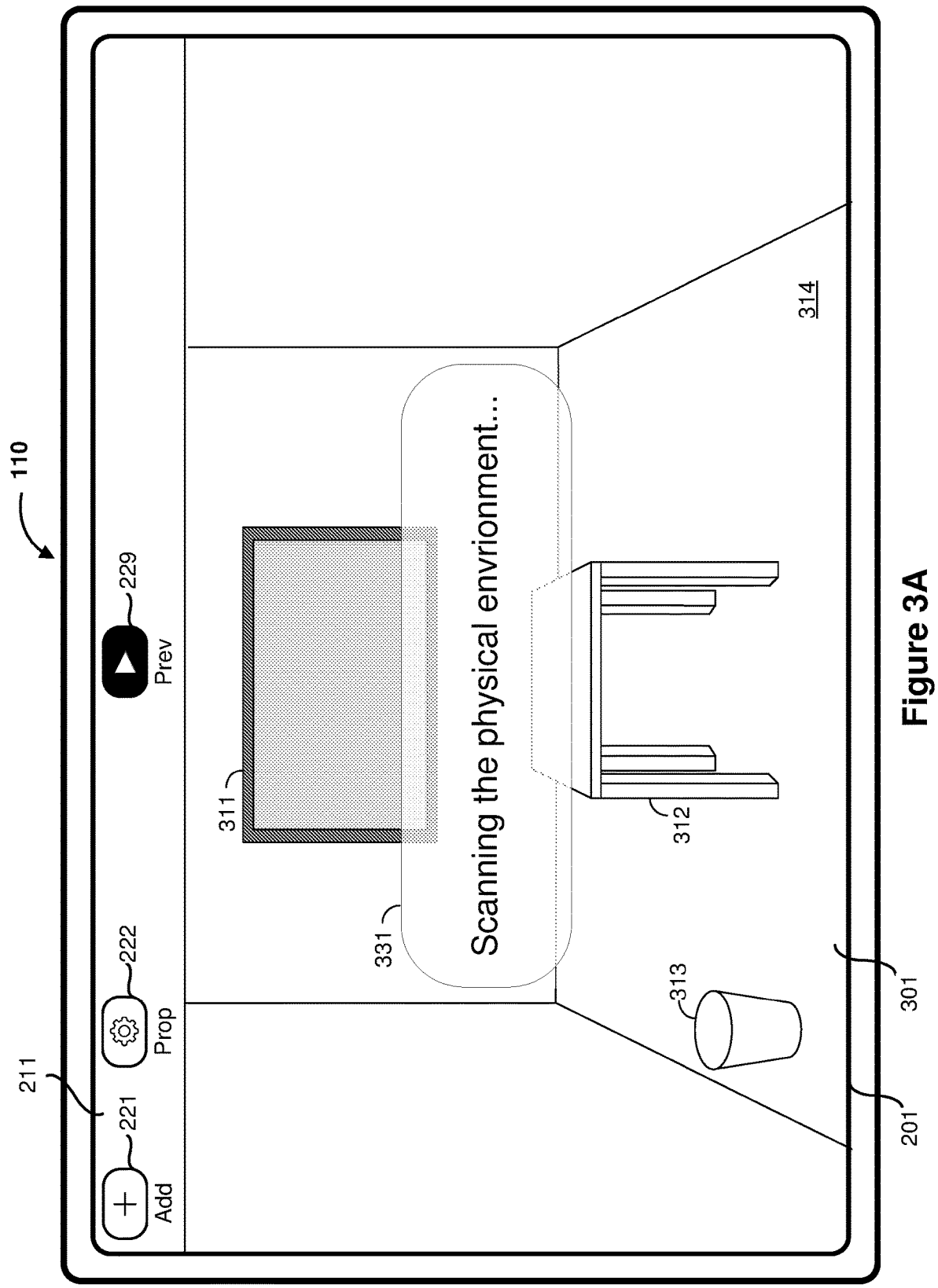
FIGS. 3A-3I illustrate the electronic device of FIG. 1 presenting the scene in a first XR environment based on a first physical environment.

FIG. 3A illustrates the GUI 201 of FIG. 2W in response to detecting the user input 299W directed to the preview affordance 229 in a first physical environment. In response to detecting the user input 299W directed to the preview affordance 229, the assets region 212 and the view region 213 are replaced with a preview region 301 providing a preview of the scene.

The first physical environment includes a television, a table, a wastebasket, and a wood floor. Accordingly, the preview region includes a representation of the first physical environment including a representation of the television 311, a representation of the table 312, a representation of the wastebasket 313, and a representation of the wood floor 314.

In providing the preview of the scene, the electronic device 110 scans the first physical environment to determine whether the first physical environment includes objects that correspond to the physical assets of the scene having the associated properties of the physical assets. While doing so, the electronic device 110 displays a scanning notification 331.

In the first physical environment, the electronic device 110 determines that the wood floor corresponds to the physical floor of the scene, that the television is blackboard-displayable and corresponds to the physical vertical plane, that the top of the table has the appropriate size and location properties and corresponds to the second physical horizontal plane, and that the wastebasket corresponds to the physical trashcan.

For each of the physical assets of the scene, the electronic device 110 determines whether the physical asset is required to execute the scene or optional to enhance the scene. In various implementations, a physical asset is required if a virtual asset is necessarily displayed in association with the physical asset. For example, the physical floor is required because the virtual professor objective-effectuator object is displayed on top of a physical object corresponding to the physical floor. Similarly, the physical vertical plane is required because the virtual blackboard object is displayed on a physical object corresponding to the physical vertical plane. The first physical horizontal plane is required because the virtual professor objective-effectuator object is displayed sitting on a physical object corresponding to the first physical horizontal plane after the fifth action is performed. The second physical horizontal plane is required because the virtual paper object, the virtual paper stack object, and the virtual mug object are displayed on top of a physical object corresponding to the second physical horizontal plane. In contrast, the physical trashcan is optional because while the virtual paper object can be displayed inside a physical object corresponding to the physical trashcan after the fourth action is performed, the virtual paper object can instead, if no physical object corresponding to the physical trashcan is present in the physical environment, be displayed on top of a physical object corresponding to the physical floor after the fourth action is performed.

Accordingly, the electronic device 110 determines that no object in the first physical environment corresponds to the first physical horizontal plane and the first physical horizontal plane is required.

Figure 3B:
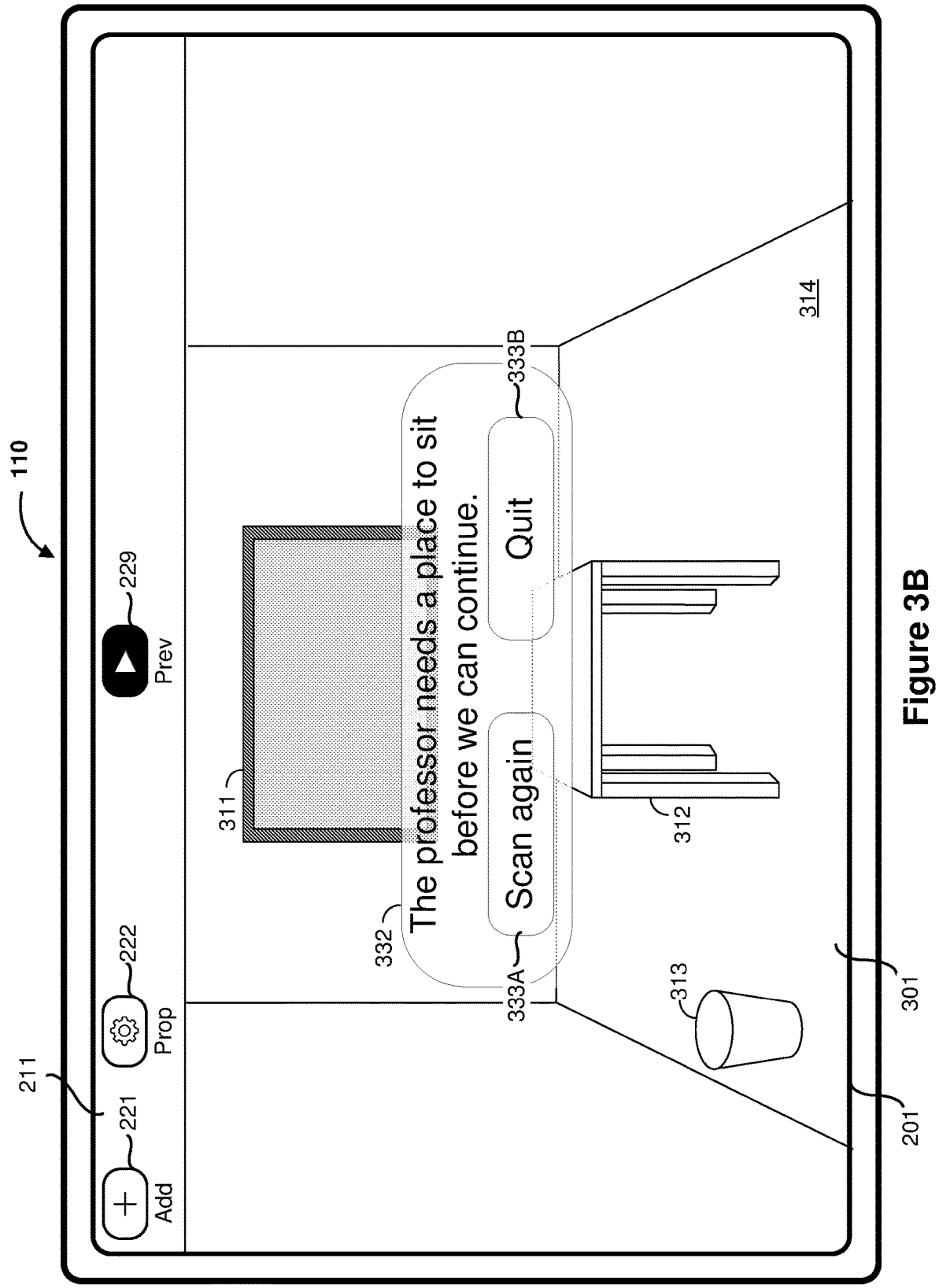

FIG. 3B illustrates the GUI 201 of FIG. 3A in response to determining that no object in the first physical environment corresponds to the first physical horizontal plane and the first physical horizontal plane is required. In response to determining that no object in the first physical environment corresponds to the first physical horizontal plane and the first physical horizontal plane is required, the preview region 301 includes a missing-required-object notification 332 indicating that the first physical horizontal plane is required to execute the scene. In various implementations, the missing-required-object notification 332 provides information to the user regarding properties of the missing object. For example, in FIG. 3B, the missing-required-object notification 332 indicates that a professor-sittable object is required to execute the scene.

The missing-required-object notification 332 includes a rescan affordance 333A which, when selected, causes the electronic device 110 to scan the first physical environment to determine whether the first physical environment includes objects that correspond to the physical assets of the scene having the associated properties of the physical assets. The missing-required-object notification 332 includes a quit affordance 333B which, when selected, causes the electronic device 110 to quit the preview of the scene.

Figure 3C:
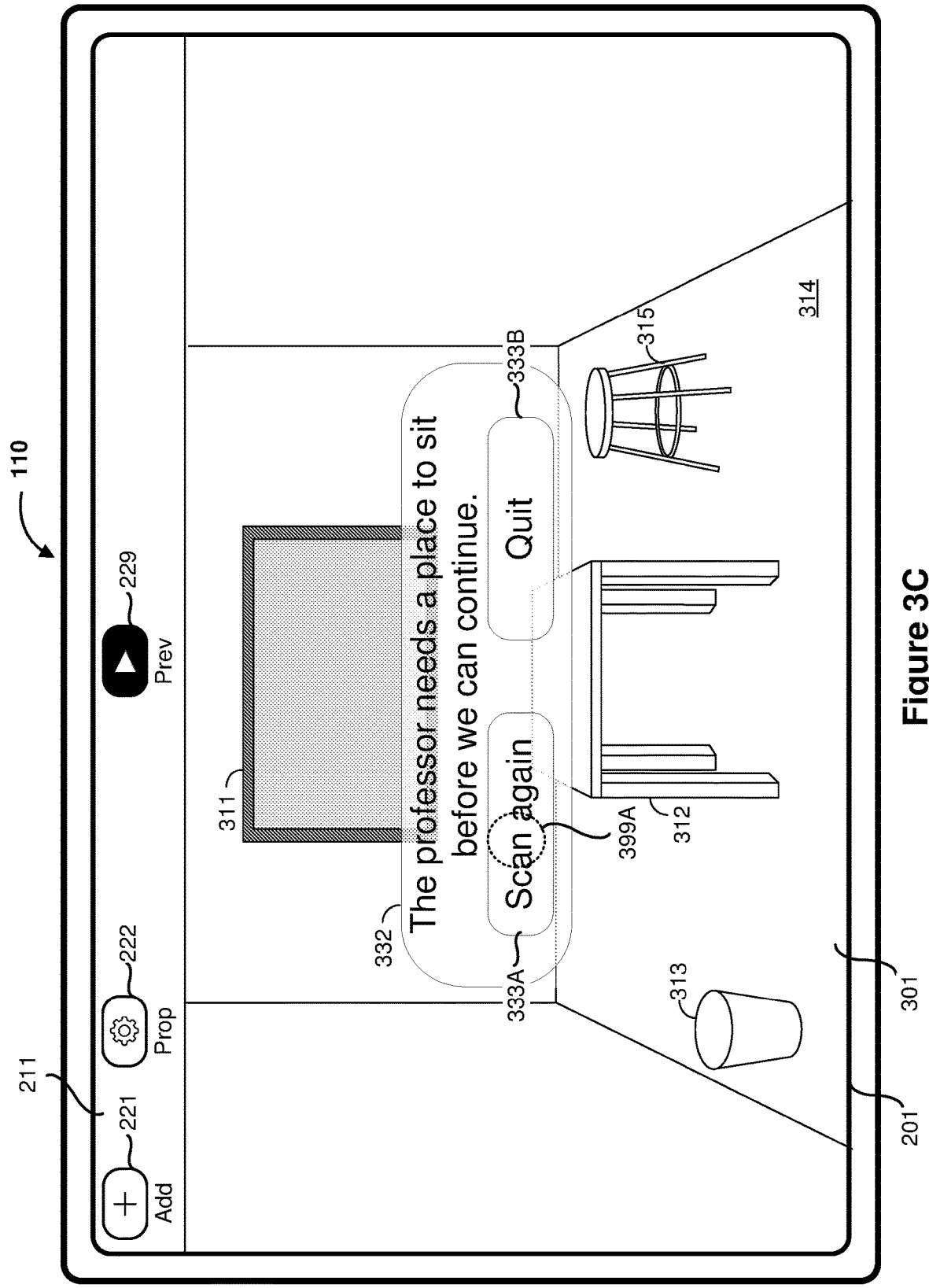

FIG. 3C illustrates the GUI 201 of FIG. 3B after a user has added a stool to the first physical environment. Accordingly, the preview region 301 including the representation of the first physical environment includes a representation of the stool 315.

FIG. 3C illustrates a user input 399A directed to the rescan affordance 333A. In various implementations, the user input 399A is input by a user tapping a finger or stylus on a touch-sensitive display at the location of the rescan affordance 333A. In various implementations, the user input 399A is input by a user clicking a mouse button while a cursor is displayed at the location of the rescan affordance 333A.

Figure 3D:
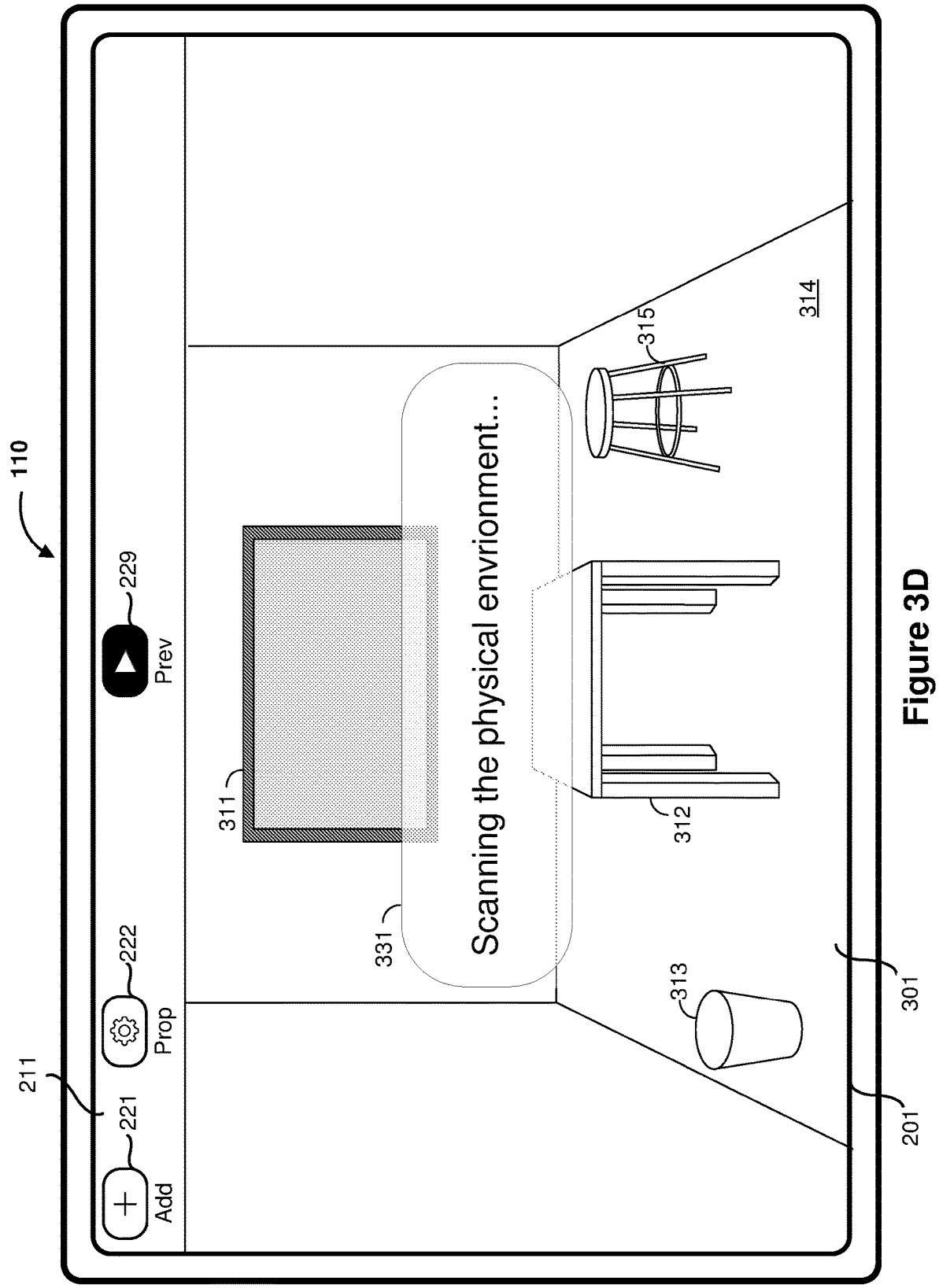

FIG. 3D illustrates the GUI 201 of FIG. 3C in response to detecting the user input 399A directed to the rescan affordance 333A. In response to detecting the user input 399A directed to the rescan affordance 333A, the preview region 301 includes the scanning notification 331 and the electronic device 110 scans the first physical environment to determine whether the first physical environment includes objects that correspond to the physical assets of the scene having the associated properties of the physical assets. In scanning the first physical environment, the electronic device 110 determines that the top of the stool may be professor-sittable and, therefore, may correspond to the required first physical horizontal plane.

Figure 3E:
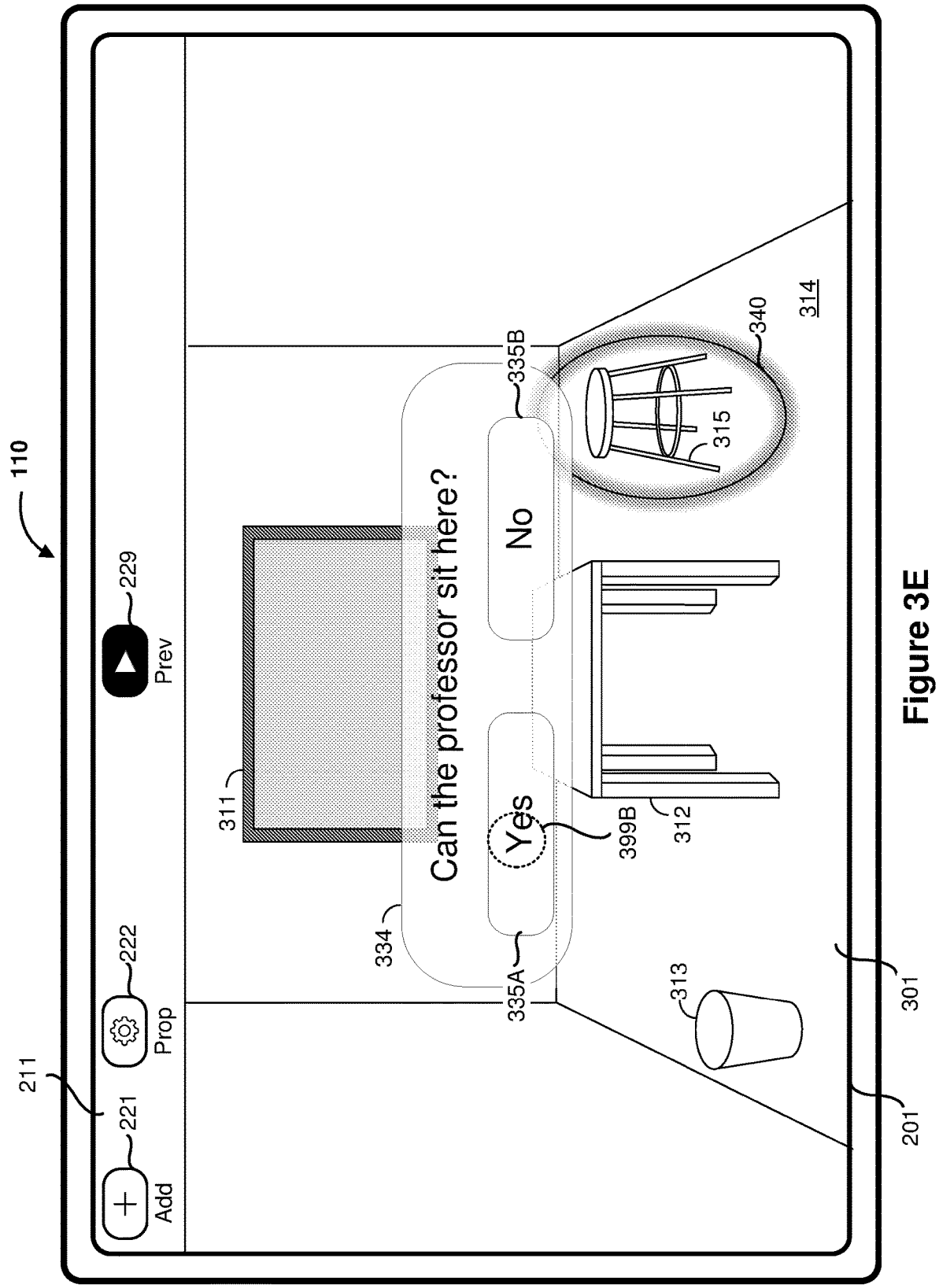

FIG. 3E illustrates the GUI 201 of FIG. 3D in response to determining that the top of the stool may be professor-sittable. In response to determining that the top of the stool may be professor-sittable, the preview region 301 includes a highlight 340 surrounding the representation of the stool 315 and a confirmation notification 334 requesting confirmation from the user that the top of the stool is professor-sittable.

The confirmation notification 334 includes a yes affordance 335A which, when selected, causes the electronic device 110 to associate the top of the stool with the professor-sittable property and map the top of the stool to the first physical horizontal plane. The confirmation notification 334 includes a no affordance 335B which, when selected, causes the electronic device 110 to not associate the top of the stool with the professor-sittable property, fail to find an object corresponding to the first physical horizontal plane, and display the missing-required-object notification 332.

FIG. 3E illustrates a user input 399B directed to the yes affordance 335A. In various implementations, the user input 399B is input by a user tapping a finger or stylus on a touch-sensitive display at the location of the yes affordance 335A. In various implementations, the user input 399B is input by a user clicking a mouse button while a cursor is displayed at the location of the yes affordance 335A.

Figure 3F:
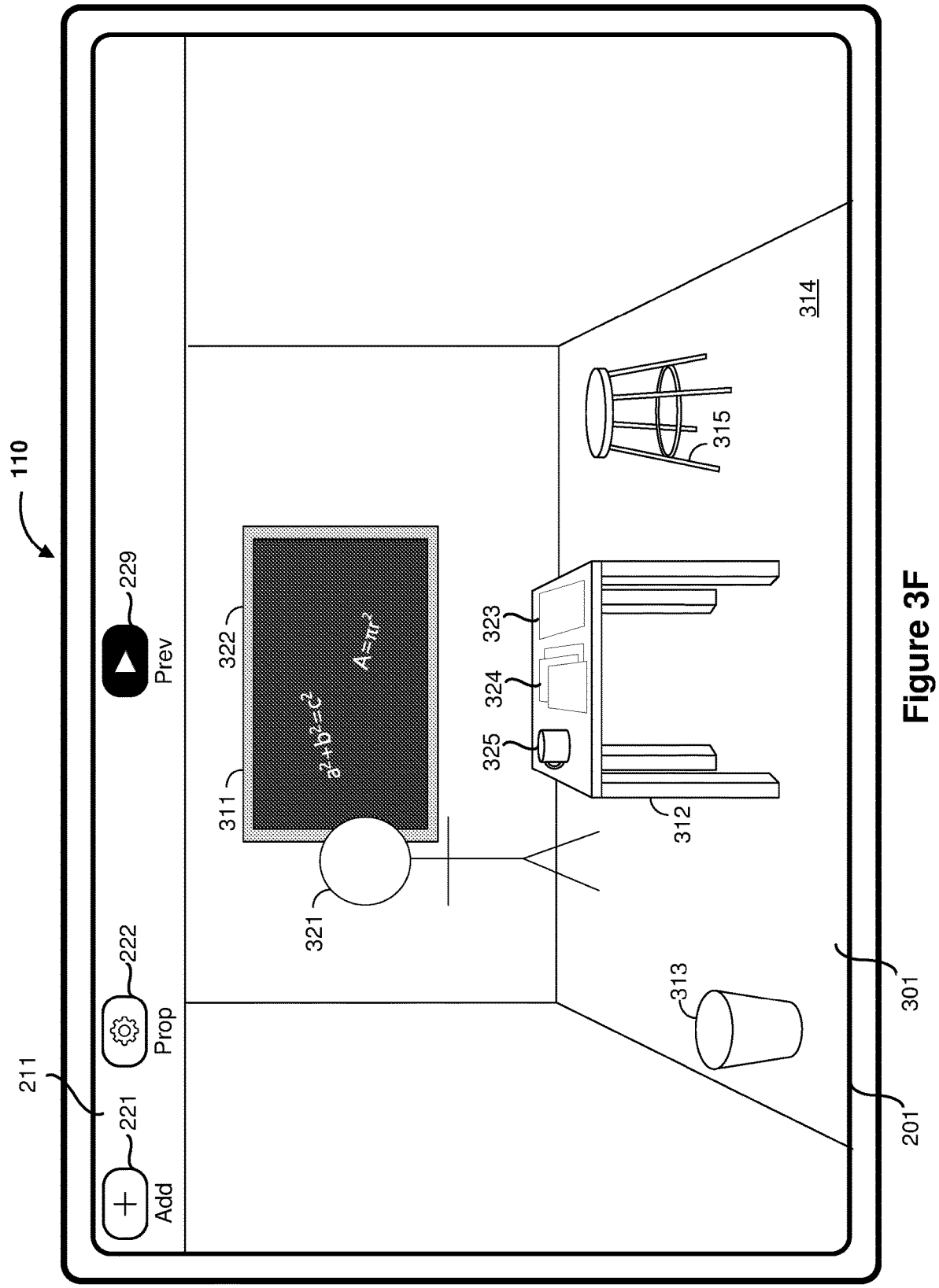

FIG. 3F illustrates the GUI 201 of FIG. 3E in response to detecting the user input 399B directed to the yes affordance 335A. In response to detecting the user input 399B directed to the yes affordance 335A, the electronic device 110 associates the top of the stool with the professor-sittable property, determines that the top of the stool corresponds to the first physical horizontal plane, determines that the first physical environment includes objects that correspond to each required physical asset of the scene, and executes the scene.

In executing the scene, the preview region 301 includes a representation of the virtual blackboard object 322 displayed over the representation of the television 311, a representation of the virtual professor objective-effectuator object 321 displayed on the representation of the wood floor 314 near the representation of the virtual blackboard object 322, a representation of the virtual paper object 323 on top of the representation of the table 312, a representation of the virtual paper stack object 324 on top of the representation of the table 312, and a representation of the virtual mug object 325 on top of the representation of the table 312.

Further, the preview region 301 includes a representation of the first action asset in which the virtual professor objective-effectuator object gives the first speech.

Figure 3G:
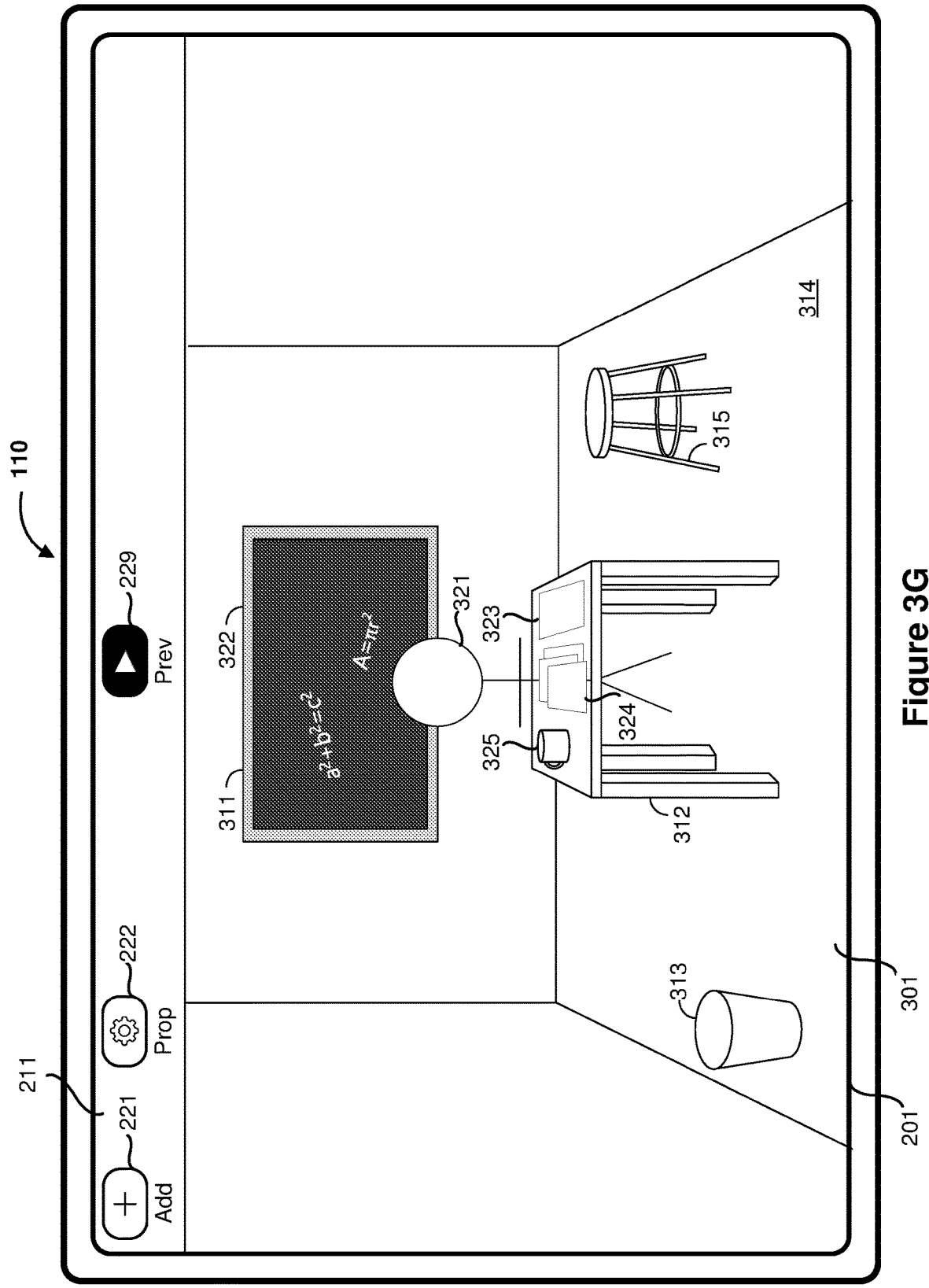

FIG. 3G illustrates the GUI 201 of FIG. 3F in response to the virtual professor objective-effectuator object concluding the first speech. In FIG. 3G, the preview region 301 includes a representation of the second action asset in which the virtual professor object-effectuator object moves from near the virtual blackboard object to near the virtual paper object and a representation of the third action asset in which the virtual professor objective-effectuator object gives the second speech. Accordingly, the representation of the virtual professor objective-effectuator object 321 is displayed near the representation of the virtual paper object 323 rather than near the representation of the virtual blackboard object 322.

Figure 3H:
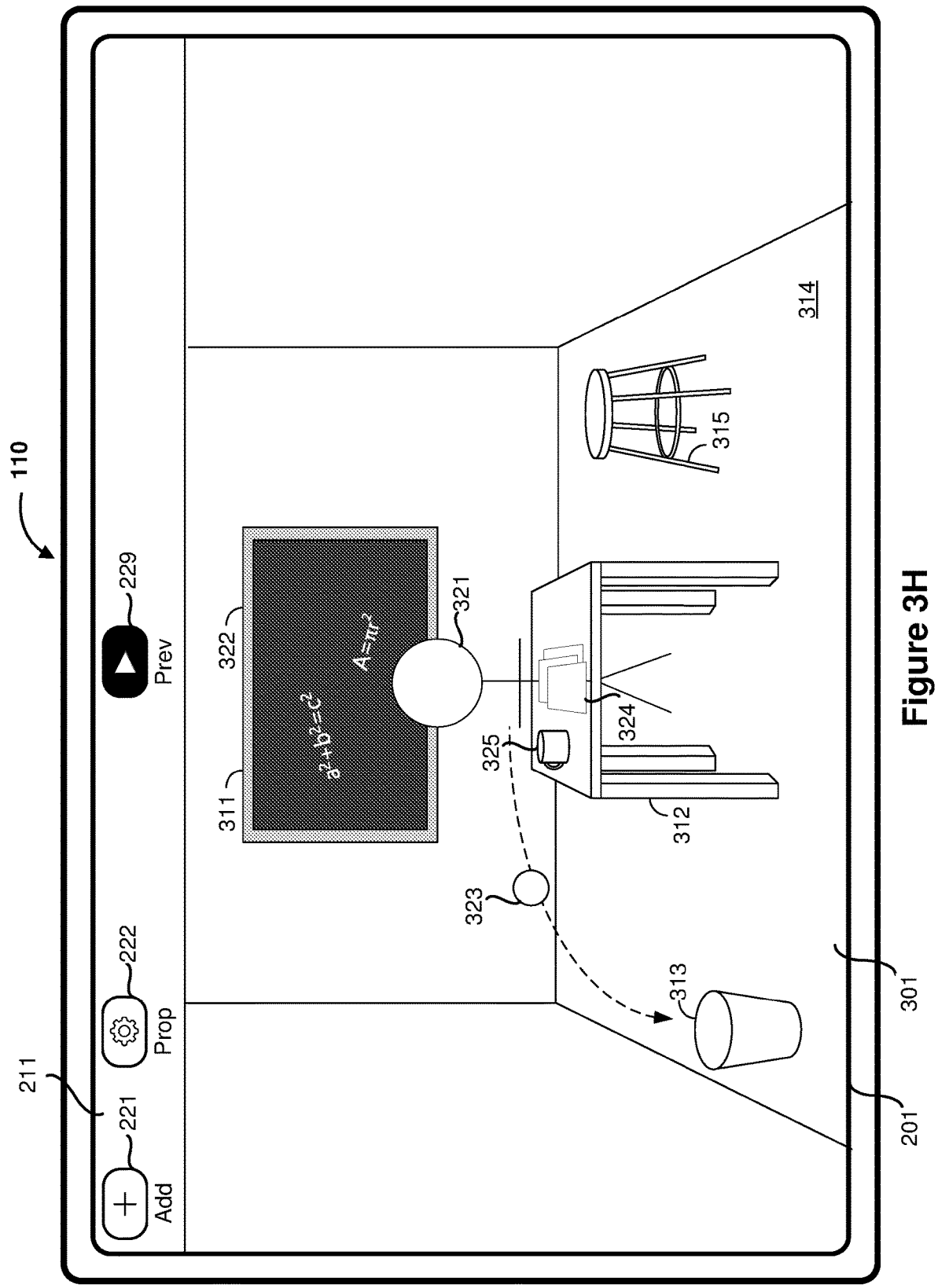

FIG. 3H illustrates the GUI 201 of FIG. 3G in response to the virtual professor objective-effectuator object concluding the second speech. In FIG. 3H, the preview region 301 includes a representation of the fourth action asset in which the virtual paper object moves from on top of the second physical horizontal plane to inside the physical trashcan, if the physical environment includes an object corresponding to the physical trashcan, or, if not, on to the physical floor. Accordingly, the representation of the virtual professor objective-effectuator object 321 is displayed throwing the representation of the virtual paper object 323 into the representation of the wastebasket 313.

Figure 3I:
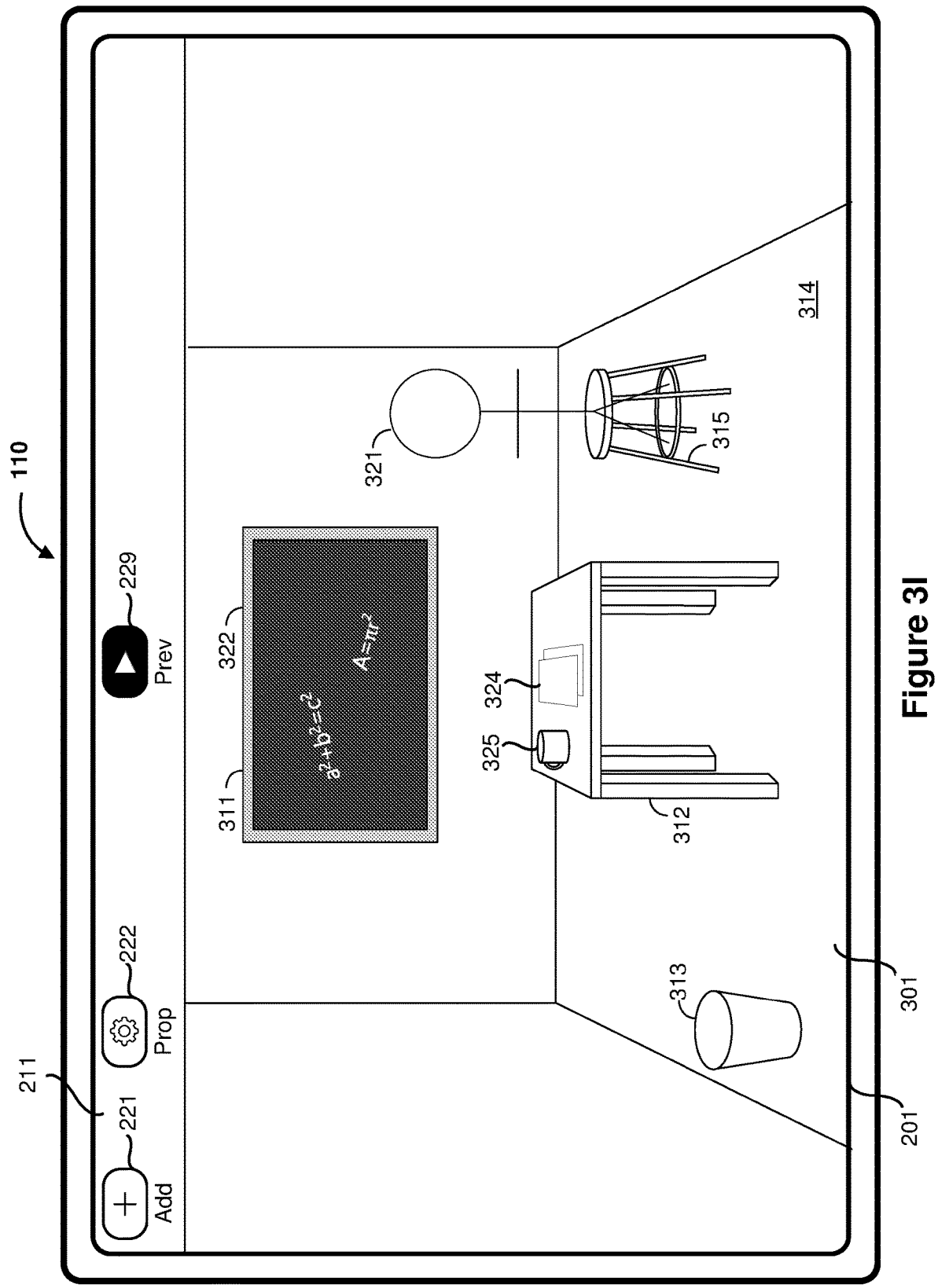

FIG. 3I illustrates the GUI of FIG. 3H in response to the virtual paper object being inside the physical trashcan. In FIG. 3I, the preview region 301 includes a representation of the fifth action asset in which the virtual professor objective-effectuator object sits on the first physical horizontal plane. Accordingly, the representation of the virtual professor objective-effectuator object 321 is displayed sitting on the representation of the stool 315.

Figure 4A:
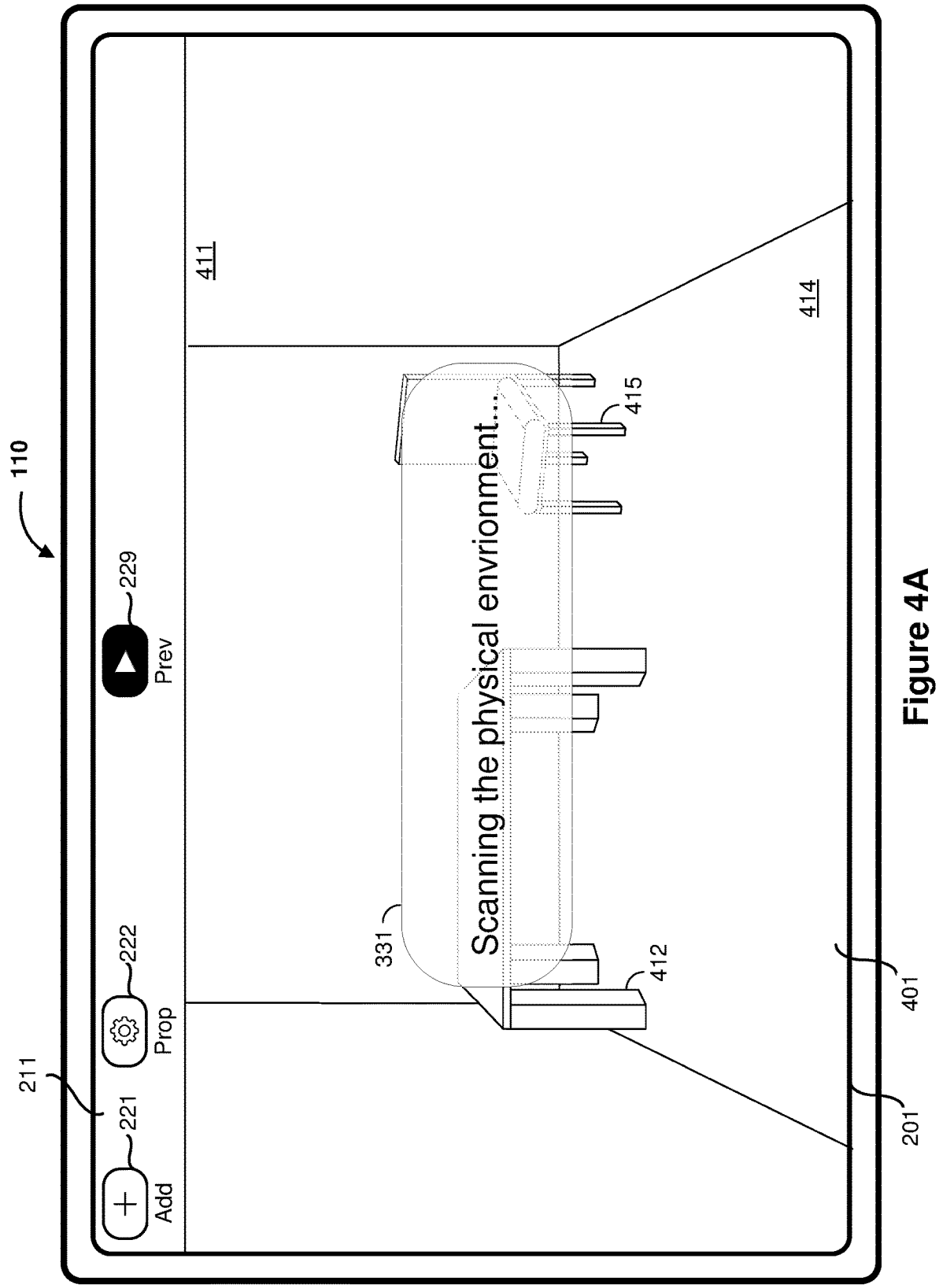
FIGS. 4A-4F illustrate the electronic device of FIG. 1 presenting the scene in a second XR environment based on a second physical environment.

FIG. 4A illustrates the GUI 201 of FIG. 2W in response to detecting the user input 299W directed to the preview affordance 229 in a second physical environment. In response to detecting the user input 299W directed to the preview affordance 229, the assets region 212 and the view region 213 are replaced with a preview region 401 providing a preview of the scene.

The second physical environment includes a wall, a desk, a tile floor, and a chair. Accordingly, the preview region 401 includes a representation of the second physical environment including a representation of the wall 411, a representation of the desk 412, a representation of the tile floor 414, and a representation of the chair 415.

In providing the preview of the scene, the electronic device 110 scans the second physical environment to determine whether the second physical environment includes objects that correspond to the physical assets of the scene having the associated properties of the physical assets. While doing so, the electronic device 110 displays the scanning notification 331.

In the second physical environment, the electronic device 110 determines that the tile floor corresponds to the physical floor of the scene, that the wall is blackboard-displayable and corresponds to the physical vertical plane, that the top of the desk has the appropriate size and location properties and corresponds to the second physical horizontal plane, and that the seat of the chair is professor-sittable and corresponds to the first physical horizontal plane.

As noted above, for each of the physical assets of the scene, the electronic device 110 determines whether the physical asset is required to execute the scene or optional to enhance the scene. In various implementations, a physical asset is required if a virtual asset is necessarily displayed in association with the physical asset. For example, the physical floor is required because the virtual professor objective-effectuator object is displayed on top of the physical floor. Similarly, the physical vertical plane is required because the virtual blackboard object is displayed on the physical vertical plane. The first physical horizontal plane is required because the virtual professor objective-effectuator object is displayed sitting on the first physical horizontal plane after the fifth action is performed. The second physical horizontal plane is required because the virtual paper object, the virtual paper stack object, and the virtual mug object are displayed on top of the second physical horizontal plane. In contrast, the physical trashcan is optional because while the virtual paper object can be displayed inside a physical object corresponding to the physical trashcan after the fourth action is performed, the virtual paper object can instead, if no physical object corresponding to the physical trashcan is present in the physical environment, be displayed on top of a physical object corresponding to the physical floor after the fourth action is performed.

Accordingly, the electronic device 110 determines that no object in the second physical environment corresponds to the physical trashcan and that the physical trashcan is optional.

Figure 4B:
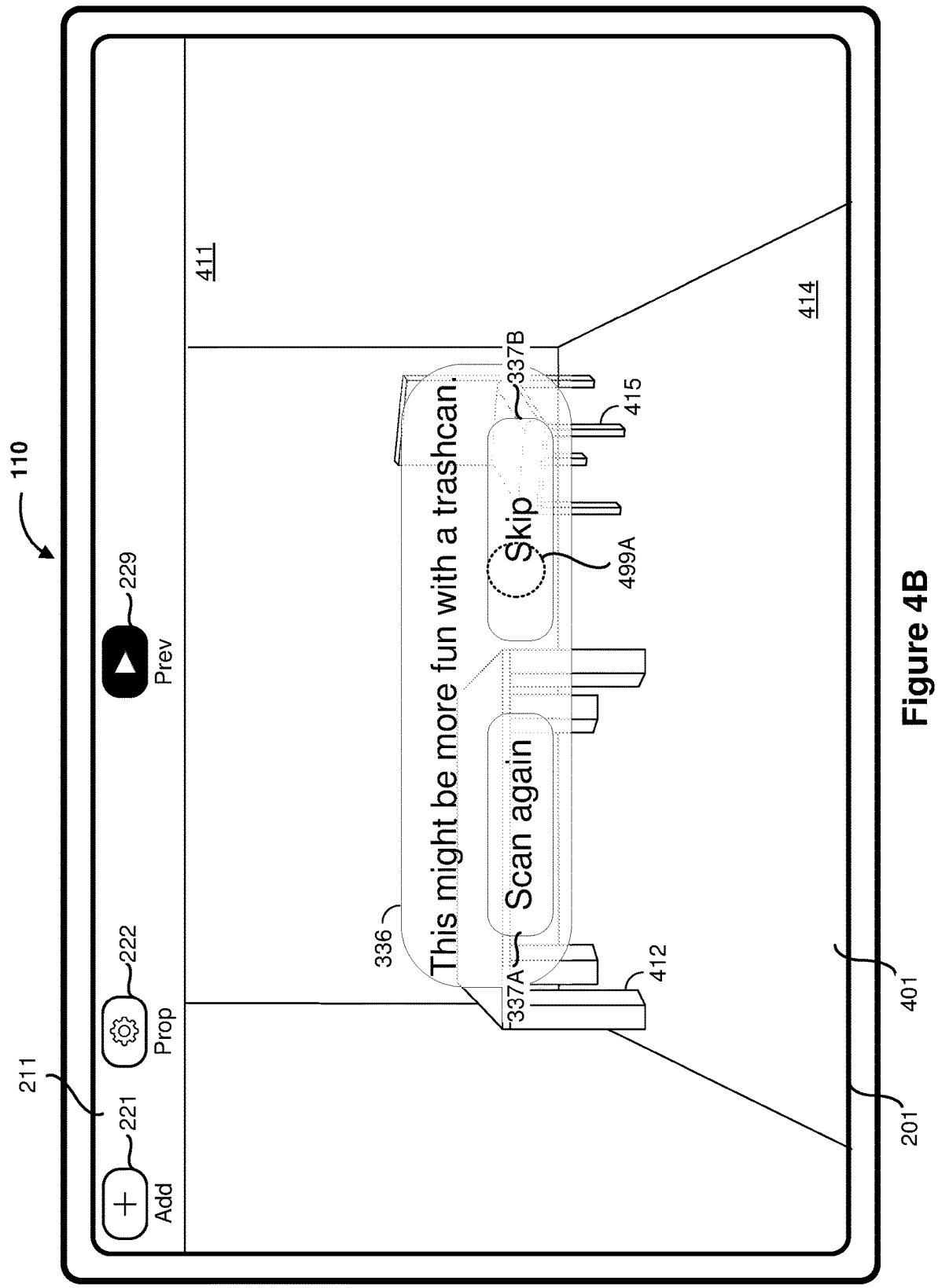

FIG. 4B illustrates the GUI 201 of FIG. 4A in response to determining that no object in the second physical environment corresponds to the physical trashcan and that the physical trashcan is optional. In response to determining that no object in the second physical environment corresponds to the physical trashcan and that the physical trashcan is optional, the preview region 401 includes a missing-optional-object notification 336 indicating that the physical trashcan is not required to execute the scene, but optional to enhance the scene. In various implementations, the missing-optional-object notification 336 provides information to the user regarding properties of the missing object. For example, in FIG. 3B, the missing-optional-object notification 336 indicates that a trashcan would enhance the scene.

The missing-optional-object notification 336 includes a rescan affordance 337A which, when selected, causes the electronic device 110 to scan the second physical environment to determine whether the second physical environment includes objects that correspond to the physical assets of the scene having the associated properties of the physical assets. The missing-optional-object notification 336 includes a skip affordance 337B which, when selected, causes the electronic device 110 to execute the scene.

FIG. 4B illustrates a user input 499A directed to the skip affordance 337B. In various implementations, the user input 499A is input by a user tapping a finger or stylus on a touch-sensitive display at the location of the skip affordance 337B. In various implementations, the user input 499A is input by a user clicking a mouse button while a cursor is displayed at the location of the skip affordance 337B.

Figure 4C:
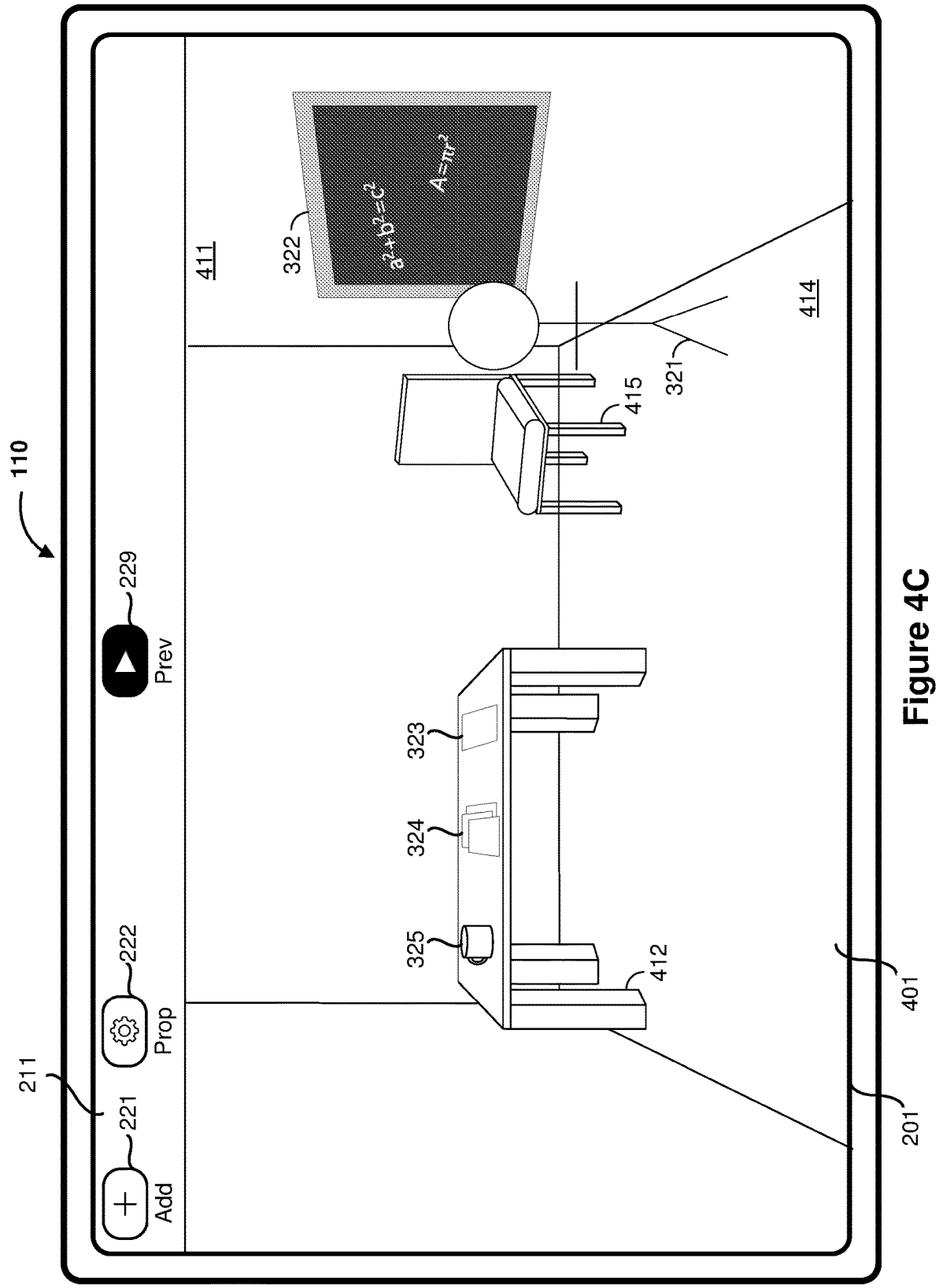

FIG. 4C illustrates the GUI 201 of FIG. 4B in response to detecting the user input 499A directed to the skip affordance 337B. In response to detecting the user input 499A directed to the skip affordance 337B, the electronic device 110 executes the scene.

In executing the scene, the preview region 401 includes the representation of the virtual blackboard object 322 displayed over the representation of the wall 411, the representation of the virtual professor objective-effectuator object 321 displayed on the representation of the tile floor 414 near the representation of the virtual blackboard object 322, a representation of the virtual paper object 323 on top of the representation of the desk 412, a representation of the virtual paper stack object 324 on top of the representation of the desk 412, and a representation of the virtual mug object 325 on top of the representation of the desk 412.

Further, the preview region 401 includes a representation of the first action asset in which the virtual professor objective-effectuator object gives the first speech.

Figure 4D:
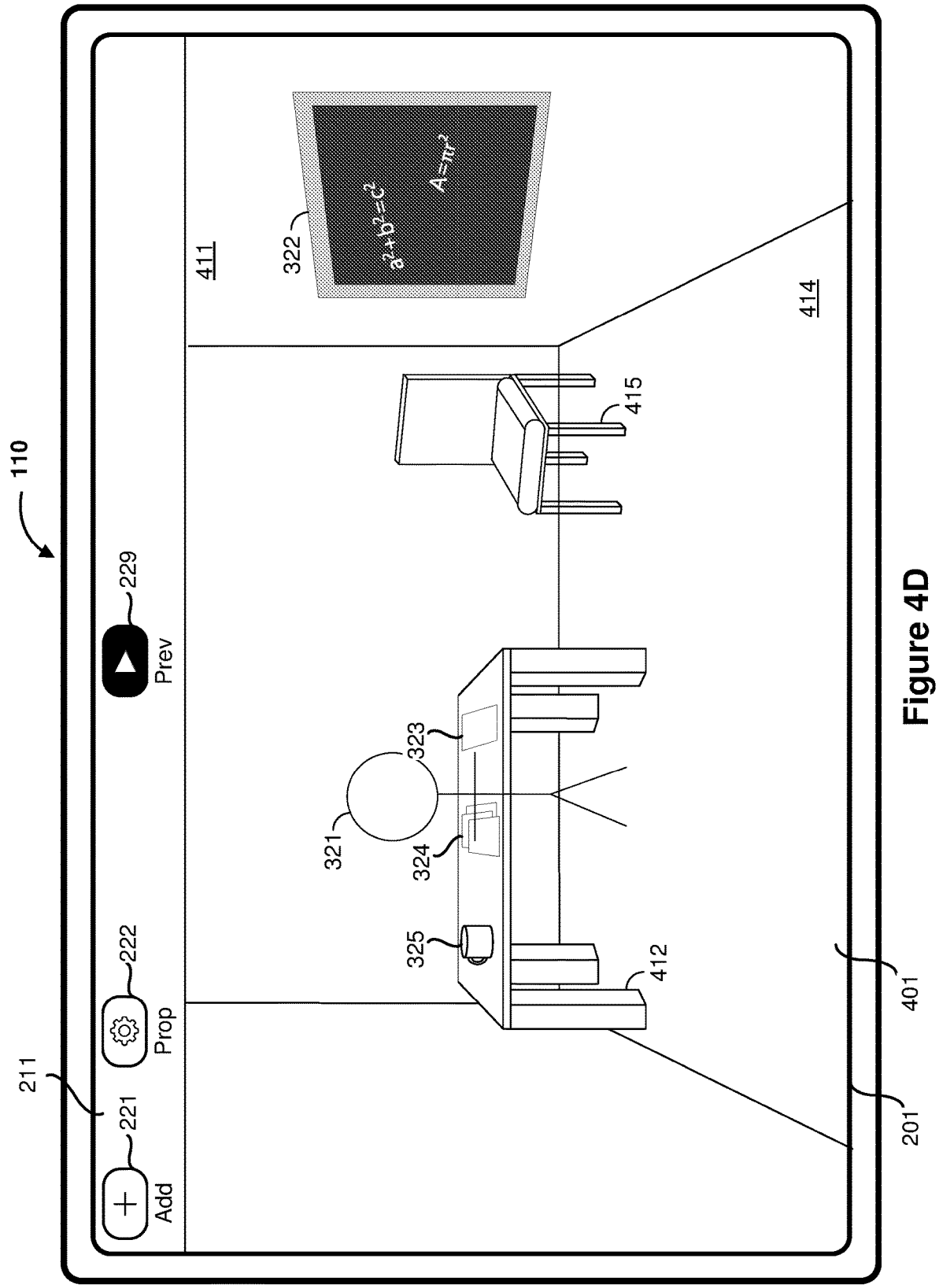

FIG. 4D illustrates the GUI 201 of FIG. 4C in response to the virtual professor objective-effectuator object concluding the first speech. In FIG. 4D, the preview region 401 includes a representation of the second action asset in which the virtual professor object-effectuator object moves from near the virtual blackboard object to near the virtual paper object and a representation of the third action asset in which the virtual professor objective-effectuator object gives the second speech. Accordingly, the representation of the virtual professor objective-effectuator object 321 is displayed near the representation of the virtual paper object 323 rather than near the representation of the virtual blackboard object 322.

Figure 4E:
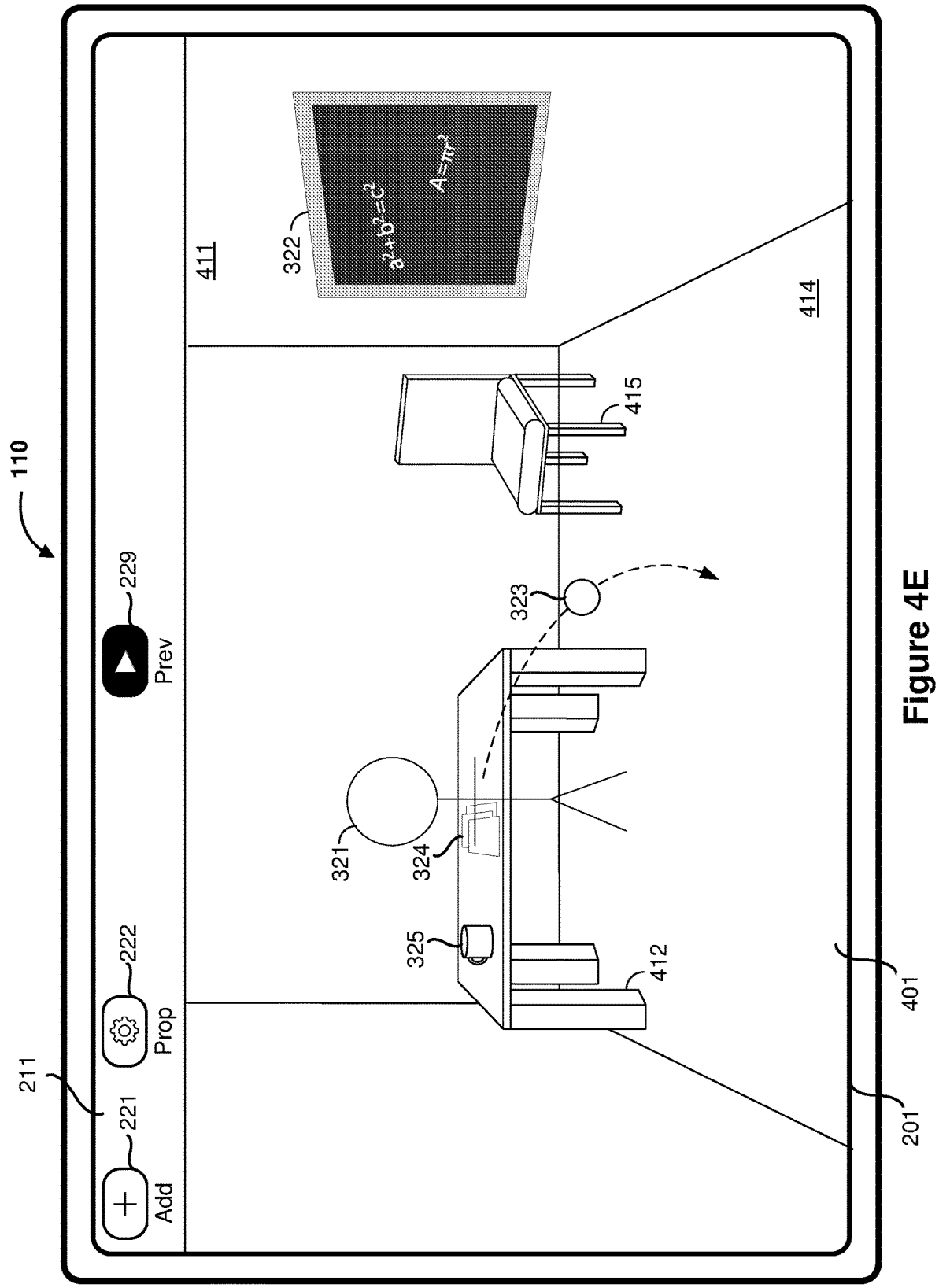

FIG. 4E illustrates the GUI 201 of FIG. 4D in response to the virtual professor objective-effectuator object concluding the second speech. In FIG. 4E, the preview region 401 includes a representation of the fourth action asset in which the virtual paper object moves from on top of the second physical horizontal plane to inside the physical trashcan, if the physical environment includes an object corresponding to the physical trashcan, or, if not, on to the physical floor. Accordingly, the representation of the virtual professor objective-effectuator object 321 is displayed throwing the representation of the virtual paper object 323 onto the representation of the tile floor 414.

Figure 4F:
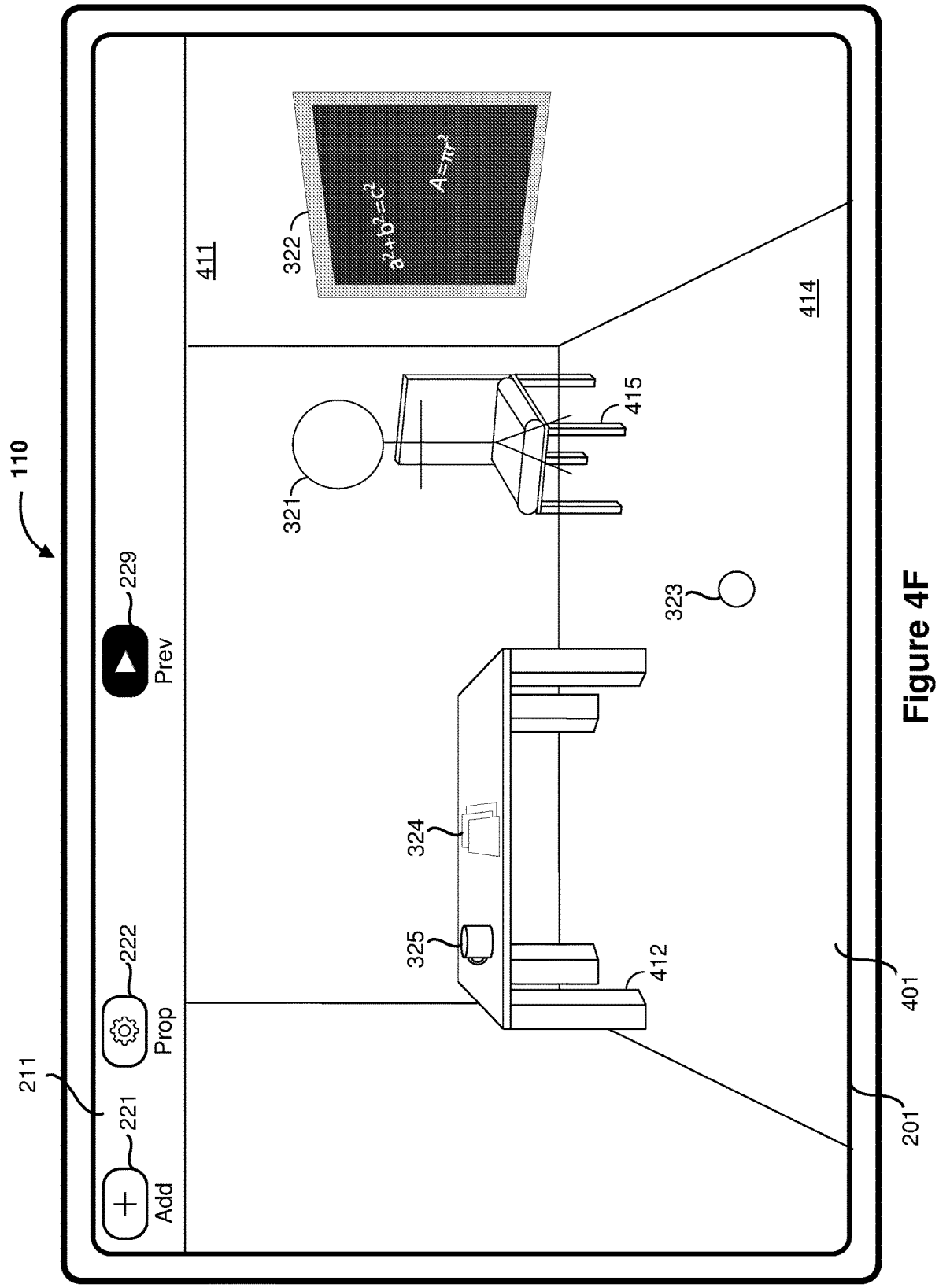

FIG. 4F illustrates the GUI of FIG. 4E in response to the virtual paper object being on top of the physical floor. In FIG. 4F, the preview region 401 includes a representation of the fifth action asset in which the virtual professor objective-effectuator object sits on the first physical horizontal plane. Accordingly, the representation of the virtual professor objective-effectuator object 321 is displayed sitting on the representation of the chair 415.

FIG. 5 is a flowchart representation of a method 500 of displaying content in accordance with some implementations. In various implementations, the method 500 is performed by a device with a display, one or more processors, and non-transitory memory. In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device scanning a first physical environment to detect a first physical object in the first physical environment and a second physical object in the first physical environment, wherein the first physical object meets at least one first object criterion and the second physical object meets at least one second object criterion. For example, in FIG. 3A, the electronic device 110 scans the first physical environment and detects the front of the television as a first physical object meeting the object criteria of the physical vertical plane and detects the top of the table as a second physical object meeting the object criteria of the second physical horizontal plane. In this example, the at least one first object criterion includes that the front of the television is a vertical plane and is blackboard-displayable and the at least one second object criterion includes that the top of the table is a horizontal plane, is at least a half-meter from the floor, has a width of a least one meter and a length of a least a half-meter.

In various implementations, detecting a physical object in a physical environment, such as detecting the first physical object in the first physical environment or detecting the second physical object in the first physical environment, includes capturing an image of the physical environment and detecting a representation of the physical object in the image of the physical environment. In various implementations, capturing an image of the physical environment is performed by a camera or other image sensor. In various implementations, detecting a physical object in the physical environment includes generating a three-dimensional model of the physical environment, such as a point cloud, and detecting a representation of the physical object in the three-dimensional model of the physical environment. In various implementations, generating the three-dimensional model of the physical environment includes obtaining depth information using a depth sensor.

In various implementations, the at least one first object criterion includes a criterion regarding a size or shape of the first physical object. For example, in FIG. 2Q, the second physical horizontal plane is associated with a property of having a width greater than one meter. In various implementations, the at least one first object criterion includes a criterion regarding an object type of the first physical object. For example, in FIG. 2Q, the trashcan is associated with a property of having an object type of "TRASHCAN".

In various implementations, the at least one first object criterion includes a criterion regarding a usability of the first physical object. For example, in FIG. 2Q, the first physical horizontal plane is associated with a property of being professor-sittable. In various implementations, the criterion regarding the usability of the first physical object is defined with respect to a virtual object of the content. For example, the property of being professor-sittable is defined with respect to the virtual professor objective-effectuator object. In various implementations, the criterion regarding the usability of the first physical object is defined with respect to a fifth physical object. For example, in various implementations, the physical vertical plane may be associated with a property of being marker-writable, such that a corresponding object can not only have a blackboard displayed thereon, but also be written upon with a physical piece of chalk or physical dry-erase marker. In various implementations, the fifth physical object is a user of the device. For example, in various implementations, the first physical horizontal plane may be associated with a property of being user-sittable, such that a corresponding object can not only be sat upon by the virtual professor objective-effectuator object, but by the user as well.

The method 500 continues, in block 520, with the device displaying, in association with the first physical environment, a virtual object moving along a first path from the first physical object to the second physical object. For example, in FIG. 3G, the representation of the virtual professor objective-effectuator object 321 moves along a first path from the representation of the television 311 (where the representation of the virtual blackboard object 322 is displayed) to the representation of the table 312 (where the representation of the virtual paper object 323 is displayed).

In various implementations, the display is an opaque display and the virtual object is displayed in association with the first physical environment as a composite image of the virtual object and the physical environment. Thus, in various implementations, displaying, in association with the first physical environment, the virtual object includes displaying a composite image of the virtual object and the first physical environment. In various implementations, the display is a transparent display and the virtual object is displayed in association with the physical environment as a projection over a view of the first physical environment. Thus, in various implementations, displaying, in association with the first physical environment, the virtual object includes projecting the virtual object over a view of the first physical environment.

In various implementations, displaying, in association with the physical environment, the virtual object includes displaying the virtual object over a representation or view of the first physical object or the second physical object. For example, in FIG. 3F, the electronic device 110 displays the representation of the virtual professor objective-effectuator object 321 (at least partially) over the representation of the television 311. In various implementations, displaying, in association with the first physical environment, the virtual object includes displaying the virtual object proximate to a representation or view of the first physical object or the second physical object. For example, in FIG. 3G, the electronic device 110 displays the representation of the virtual professor objective-effectuator object 321 proximate to the representation of the table 312 such that it appears the virtual professor objective-effectuator object is near the table.

In various implementations, displaying, in association with the first physical environment, the virtual object includes displaying the virtual object interacting with a representation or view of the first physical object or the second physical object. For example, in FIG. 3I, the electronic device 110 displays the representation of the virtual professor objective-effectuator object 321 sitting on the representation of the stool 315.

The method continues, in block 530, with the device scanning a second physical environment to detect a third physical object in the second physical environment and a fourth physical object in the second physical environment, wherein the third physical object meets the at least one first object criterion and the fourth physical object meets the at least one second object criterion. For example, in FIG. 4A, the electronic device 110 scans the second physical environment and detects the wall as a third physical object meeting the object criteria of the physical vertical plane and detects the top of the desk as a fourth physical object meeting the object criteria of the second physical horizontal plane. As noted above, in this example, the at least one first object criterion includes that the wall is a vertical plane and is blackboard-displayable and the at least one second object criterion includes that the top of the desk is a horizontal plane, is at least a half-meter from the floor, has a width of a least one meter and a length of a least a half-meter.

The method 500 continues, in block 540, with the device displaying, in association with the second physical environment, the virtual object moving along a second path from the third physical object to the fourth physical object, wherein the second path is different than the first path. For example, in FIG. 4D, the representation of the virtual professor objective-effectuator object 321 moves along a second path from the representation of the wall 411 (where the representation of the virtual blackboard object 322 is displayed) to the representation of the desk 412 (where the representation of the virtual paper object 323 is displayed).

As noted above, the second path is different than the first path. For example, in FIG. 3G, the representation of the virtual professor objective-effectuator object 321 moves a short distance from the representation of the television 311 (where the representation of the virtual blackboard object 322 is displayed) to the representation of the table 312 (where the representation of the virtual paper object 323 is displayed. In contrast, in FIG. 4D, the representation of the virtual professor objective-effectuator object 321 moves a longer distance from the representation of the wall 411 (where the representation of the virtual blackboard object 322 is displayed) to the representation of the desk 412 (where the representation of the virtual paper object 323 is displayed). Thus, in various implementations, a length of the second path is different than a length of the first path. The first path and the second path may differ in other various measurements. For example, in various implementations, a variance of the second path (as measured from a straight line) is different than a variance of the first path.

In various implementations, the first path traverses a plurality of first path locations in a three-dimensional coordinate system and the second path traverses a plurality of second path locations in the three-dimensional coordinate system. For example, in FIG. 3G, the representation of the virtual professor objective-effectuator object 321 is displayed just in front of the user, whereas, in FIG. 4D, the representation of the virtual professor objective-effectuator object 321 is displayed further away and to the left. In various implementations, the three-dimensional coordinate system is defined with respect to the user, the camera perspective, or another common feature across physical environments, e.g., the far-upper-right corner of a room. In various implementations, the three-dimensional coordinate system is defined as an absolute (or global) coordinate system, e.g., using GPS.

In various implementations, the method includes determining at least one of the first path or the second path. In various implementations, the device utilizes various path-finding algorithms to determine at least one of the first path or the second path. In various implementations, at least one of the first path or the second path is determined to avoid another object, which may be a virtual object or a physical object in the physical environment. In various implementations, a virtual objective-effectuator determines at least one of the first path or the second path, e.g., based on capabilities of the virtual objective-effectuator. For example, a virtual dog objective-effectuator object may use stairs to move from the floor to a bed, whereas a virtual fly objective-effectuator object may fly from the floor to the bed.

Figure 6:
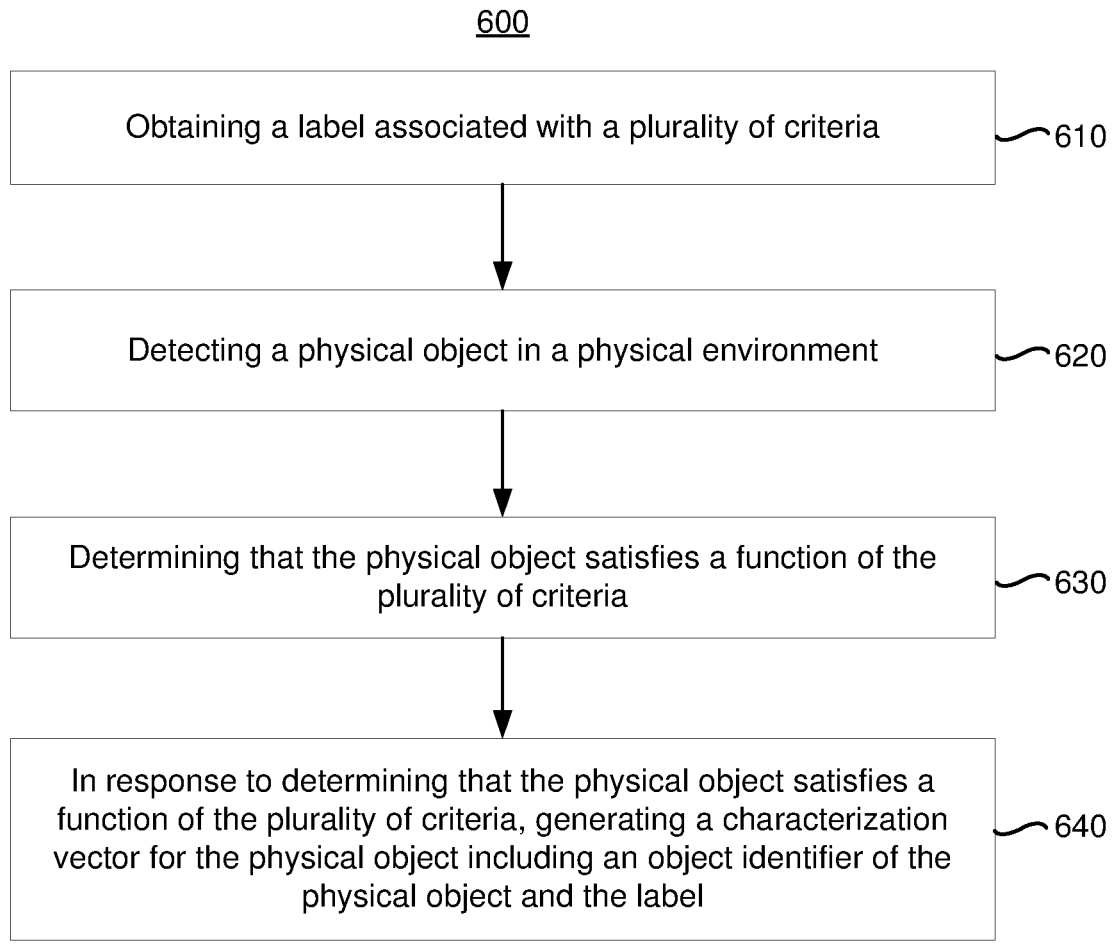
FIG. 6 is a flowchart representation of a method of associating a label with an object in accordance with some implementations.

FIG. 6 is a flowchart representation of a method 600 of associating a label with an object in accordance with some implementations. In various implementations, the method 600 is performed by a device with one or more processors and non-transitory memory. In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining a label associated with a plurality of criteria. For example, in FIG. 2Q, the electronic device 110 has obtained the labels of "blackboard-displayable" and "professor-sittable", each associated with a plurality of criteria.

The method 600 continues, in block 620, with the device detecting a physical object in a physical environment. For example, in FIG. 3A, the electronic device 110 detects the television, the table, the wastebasket, and the wood floor in the first physical environment. As another example, in FIG. 4A, the electronic device 110 detects the wall, the desk, the tile floor, and the chair in the second physical environment.

In various implementations, the label indicates that the physical object is capable of supporting a function. Thus, in various implementations, the label is referred to as a "capability label" and the criteria referred to as "capability criteria". For example, the label "blackboard-displayable" indicates that the physical object is capable of having the virtual blackboard object displayed on the physical object. As another example, the label "professor-sittable" indicates that the physical object is capable of having the virtual professor objective-effectuator sit on the physical object.

In various implementations, the label indicates that the physical object is capable of being used by a virtual object to perform a function. For example, the label "blackboard-displayable" indicates that the physical object is capable of being used by the virtual blackboard object to be displayed.

As another example, the label "professor-sittable" indicates that the physical object is capable of being used by the virtual professor objective-effectuator object to sit down. Thus, in contrast to identifying a physical object as having a particular object type (e.g., a "WALL") and then assigning functions to the physical object (e.g., content can be displayed on the physical object identified as a "WALL"), the label is associated with the capabilities of a physical object (e.g., "blackboard-displayable") and the label is assigned only when the physical object meets a function of a plurality of criteria indicative of those capabilities.

In various implementations, the method 600 further includes displaying the virtual object performing the function. For example, in FIG. 3I, the electronic device 110 displays the representation of the virtual blackboard object 322 displayed upon the representation of the television 311 determined to be blackboard-displayable and displays the representation of the virtual professor objective-effectuator object 321 sitting on the representation of the stool 315 determined to be professor-sittable.

In various implementations, the label indicates that the physical object is capable of being used by a physical object to perform a function. Thus, in various implementations, the label is referred to as a "usability label" and the criteria referred to as "usability criteria". For example, in various implementations, the physical vertical plane may be associated with a property of being marker-writable, such that a corresponding object can not only have a blackboard displayed thereon, but also be written upon with a physical piece of chalk or physical dry-erase marker. As another example, in various implementations, the first physical horizontal plane may be associated with a property of being user-sittable, such that a corresponding object can not only be sat upon by the virtual professor objective-effectuator object, but by the user as well. Thus, the label "marker-writable" indicates that the physical object is capable of being used by the physical marker to be written upon. As another example, the label "user-sittable" indicates that the physical object is capable of being used by the user to sit down.

In various implementations, the plurality of criteria includes a criterion regarding a size or shape of the physical object. For example, in various implementations, the label "blackboard-displayable" is associated with criteria that the height and width of the physical object are within particular ranges. As another example, in various implementations, the label "professor-sittable" is associated with criteria that the height, length, and width of the physical object are within particular ranges.

In various implementations, the plurality of criteria includes a criterion regarding a color of the physical object. For example, in various implementations, the label "blackboard-displayable" is associated with a criterion that the physical object be a uniform color.

In various implementations, the plurality of criteria includes a criterion regarding an object type of the physical object. For example, in various implementations, the label "blackboard-displayable" is associated with a criterion that the physical object be a vertical plane and/or a criterion that the physical object has an object type of "WALL". As another example, in various implementations, the label "professor-displayable" is associated with a criterion that the physical object be a horizontal plane and/or a criterion that the physical object has one of a particular set of object type (e.g., "CHAIR", "STOOL", "SOFA", etc.).

In various implementations, the plurality of criteria includes a criterion regarding a user designation of the physical object. For example, in various implementations, the label "blackboard-displayable" is associated with a criterion that a user designates the physical object as blackboard-displayable. As another example, in various implementations, the label "professor-displayable" is associated with a criterion that a user designates the physical object as professor-displayable as is done in FIG. 3E.

The method 600 continues, in block 630, with the device determining that the physical object satisfies a function of the plurality of criteria. For example, in various implementations, a physical object is associated with the label "blackboard-displayable" if it meets a first criterion that it is of a uniform color and either a second criterion that it is has an object type of "WALL" or a third criterion that its height value and width value are greater than particular thresholds. As another example, a physical object is associated with the label "professor-sittable" if it meets a first criterion that it has an object type of "CHAIR" or it meets both a second criterion that its height value, length value, and width value are within particular ranges and a third criterion that a user designates the horizontal plane as professor-sittable after detection of the physical object having the height value, length value, and width value within the particular ranges.

In various implementations, the physical object satisfies the function of the plurality of criteria when the physical object satisfies one or more of the plurality of criteria. In various implementations, the physical object satisfies the function of the plurality of criteria when the physical object satisfies all of the plurality of criteria. For example, in various implementations, a physical object is associated with the label "blackboard-displayable" if it meets both a first criterion that it is has an object type of "WALL" and a second criterion that it is of a uniform color.

In various implementations, the physical object satisfies the function of the plurality of criteria when the physical object satisfies at least a threshold number of the plurality of criteria. For example, in various implementations, a physical object is associated with the label "professor-sittable" if it meets at least one of the following: a first criterion that it has an object type of "CHAIR", a second criterion that it has an object type of "STOOL", or a third criterion that a user designates it as professor-sittable. In various implementations, a physical object is associated with a label if it meets at least two criteria out of three or more criteria.

In various implementations, the physical object satisfies the function of the plurality of criteria when the physical object satisfies a first subset of the plurality of criteria or a second subset of the plurality of criteria. In various implementations, the first subset of the plurality of criteria and the second subset of the plurality of criteria include no common criterion. For example, in various implementations, a physical object is associated with the label "professor-sittable" if it meets a first subset of criteria including a first criterion that it has an object type of "CHAIR" or it meets a second subset of criteria including a second criterion that its height value, length value, and width value are within particular ranges and a third criterion that a user designates the horizontal plane as professor-sittable after detection of the physical object having the height value, length value, and width value within the particular ranges. In various implementations, the first subset of the plurality of criteria and the second subset of the plurality of criteria includes one or more common criteria. For example, in various implementations, a physical object is associated with the label "blackboard-displayable" if it meets a first subset of criteria including a first criterion that it is of a uniform color and a second criterion that it is has an object type of "WALL" or it meets a second subset of criteria including the first criterion that it is of a uniform color and a third criterion that its height value and width value are greater than particular thresholds.

The method 600 continues, in block 640, with the device, in response to determining that the physical object satisfies the function of the plurality of criteria, generating a characterization vector for the physical object including an object identifier of the physical object and the label. In various implementations, object identifier is an assigned number, letter, or other unique label. In various implementations, generating the characterization vector for the physical object including the object identifier of the physical object and label includes adding the label to an existing characterization vector which, in various implementations, includes the object identifier.

In various implementations, having a physical object associated with a label can be used to determine whether or not to execute a scene requiring a physical object associated with the label. For example, in FIG. 3B, the electronic device 110 does not execute the scene because no physical object is associated with the label "professor-sittable". In contrast, in FIG. 3F, the electronic device 110 executes the scene because the stool is associated with the label "professor-sittable". Thus, in various implementations, the method 600 further includes executing a scene requiring a physical object associated with the label.

Figure 7:
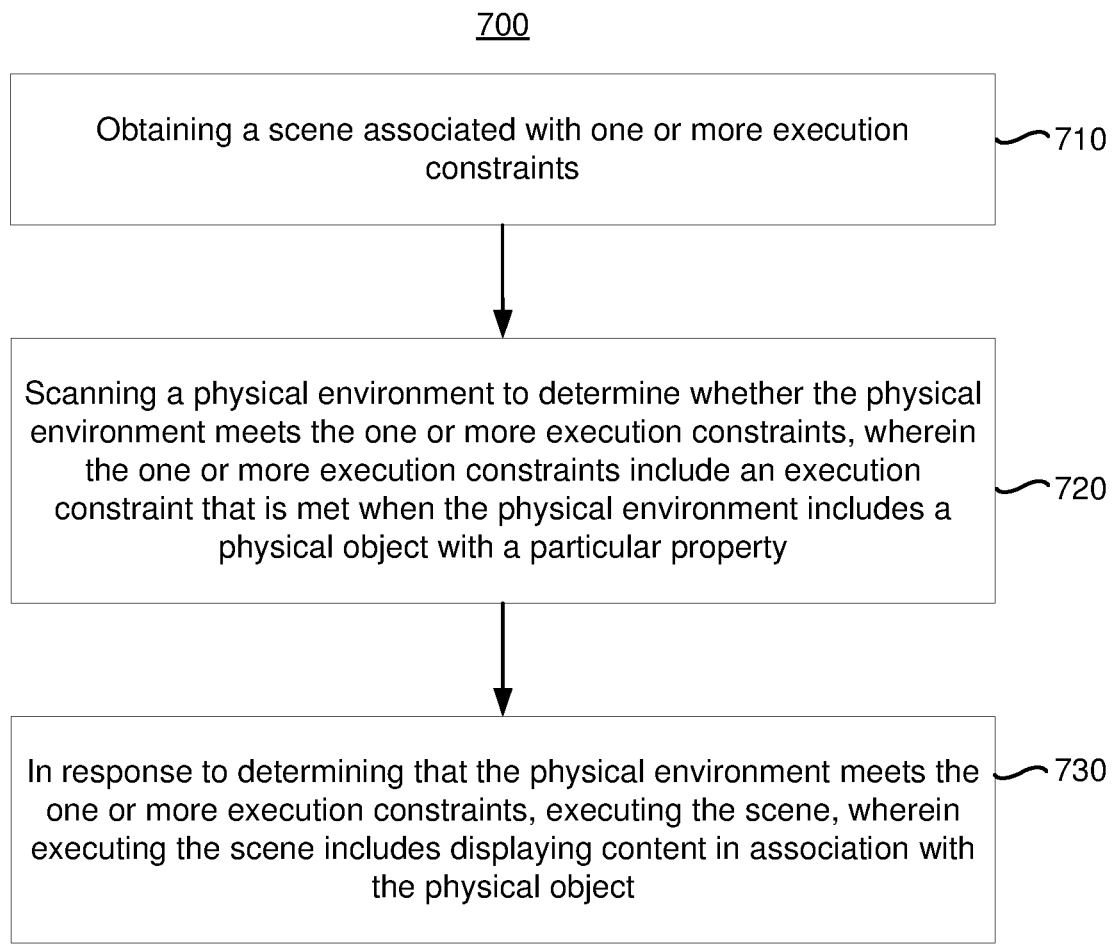
FIG. 7 is a flowchart representation of a method of executing a scene in accordance with some implementations.

FIG. 7 is a flowchart representation of a method 700 of executing a scene in accordance with some implementations. In various implementations, the method 700 is performed by a device with a display, one or more processors, and non-transitory memory. In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device obtaining a scene associated with one or more execution constraints. For example, in FIG. 3A, the electronic device 110 has obtained the scene requiring a physical environment that includes a physical floor, a physical vertical plane, a first physical horizontal plane, and a second physical horizontal plane, each having particular properties.

The method 700 continues, in block 720, with the device scanning a physical environment to determine whether the physical environment meets the one or more execution constraints. For example, in FIG. 3A, the electronic device 110 scans the first physical environment to determine whether the first physical environment meets the execution constraints of the scene.

In various implementations, scanning the physical environment to determine whether the physical environment meets the one or more execution constraints includes detecting a physical object in the physical environment. In various implementations, detecting a physical object in a physical environment includes capturing an image of the physical environment and detecting a representation of the physical object in the image of the physical environment. In various implementations, capturing an image of the physical environment is performed by a camera or other image sensor. In various implementations, detecting a physical object in the physical environment includes generating a three-dimensional model of the physical environment, such as a point cloud, and detecting a representation of the physical object in the three-dimensional model of the physical environment. In various implementations, generating the three-dimensional model of the physical environment includes obtaining depth information using a depth sensor.

In various implementations, scanning the physical environment to determine whether the physical environment meets the one or more execution constraints includes analyzing data from various sensors, such as a thermometer, ambient light sensor, GPS sensor, or clock.

In various implementations, the one or more execution constraints include an execution constraint that is met when the physical environment includes a physical object with a particular property.

In various implementations, the particular property regards a size or shape of the physical object. For example, in FIG. 3A, the scene requires a physical environment that includes a second physical horizontal plane having a width greater than a meter. In various implementations, the particular property regards a color of the physical object. For example, in FIG. 3A, the scene requires a physical environment that includes a physical vertical plane that is blackboard-displayable, which, in various implementations, requires the physical vertical plane to be of a uniform color.

In various implementations, the particular property regards an object type of the physical object. For example, in FIG. 3A, the scene requires a physical environment that includes a physical object that is a horizontal plane. As another example, in FIG. 3A, the scene requires a physical environment that includes a physical floor. As another example, in FIG. 3A, the scene requires a physical environment that includes a physical vertical plane that is blackboard-displayable, which, in various implementations, requires the physical vertical plane to have an object type of "WALL".

In various implementations, the particular property regards a capability of supporting a function. For example, in FIG. 3A, the scene requires a first physical horizontal plane that is professor-sittable and is capable of supporting the function of the virtual professor objective-effectuator object sitting on the physical object. In various implementations, the particular property regards a capability of the physical object being used by a virtual object to perform a function. For example, in FIG. 3A, the scene requires a first physical horizontal plane that is professor-sittable and is capable of being used by the virtual professor objective-effectuator object to sit.

In various implementations, the particular property regards a capability of the physical object being used by a physical object to perform a function. For example, in various implementations, the physical vertical plane may be associated with a property of being marker-writable, such that a corresponding object can not only have a blackboard displayed thereon, but also be written upon with a physical piece of chalk or physical dry-erase marker. In various implementations, the third physical object is a user of the device. For example, in various implementations, the first physical horizontal plane may be associated with a property of being user-sittable, such that a corresponding object can not only be sat upon by the virtual professor objective-effectuator object, but by the user as well.

In various implementations, the one or more execution constraints include an execution constraint that is met when the physical environment has a particular environmental characteristic. In various implementations, the particular environmental characteristic includes a temperature, humidity, pressure, ambient lighting condition, time, or location.

The method 700 continues, in block 730, with the device, in response to determining that the physical environment meets the one or more execution constraints, executing the scene, wherein executing the scene includes displaying content in association with the physical object.

In various implementations, the display is an opaque display and the content is displayed in association with the physical object as a composite image of the content and the physical object. Thus, in various implementations, displaying the content in association with the physical object includes displaying a composite image of the content and the physical object. In various implementations, the display is a transparent display and the content is displayed in association with the physical object as a projection over a view of the physical object. Thus, in various implementations, displaying the content in association with the physical object includes projecting the content over a view of the physical object.

In various implementations, displaying the content in association with the physical object includes displaying a virtual object over a representation or view of the physical object. For example, in FIG. 3F, the electronic device 110 displays the representation of the virtual blackboard object 322 over the representation of the television 311. In various implementations, displaying the content in association with the physical object includes displaying a virtual object proximate to a representation or view of the physical object. For example, in FIG. 3F, the electronic device 110 displays the representation of the virtual mug object 325 proximate to the representation of the table 312 such that it appears the virtual mug object 325 is on top of the table.

In various implementations, displaying the content in association with the physical object includes displaying a virtual object interacting with a representation or view of the physical object. For example, in FIG. 3I, the electronic device 110 displays the representation of the virtual professor objective-effectuator object 321 sitting on the representation of the stool 315.

In various implementations, the device, in response to determining that the physical environment does not meet the one or more execution constraints, displaying an indication of an unmet execution constraint of the one or more execution constraints. In various implementations, displaying an indication of an unmet execution constraint of the one or more execution constraints includes displaying an indication of the unmet execution constraint without executing the scene. For example, in FIG. 3B, in response to determining that the first physical environment without the stool does not meet the one or more execution constraints, without executing the scene, the electronic device 110 displays the missing-required-object notification 336 indicating that the execution constraint of including a professor-sittable physical object is not met.

In various implementations, the method 700 further includes, in response to determining that the physical environment does not meet the one or more execution constraints, displaying a rescan affordance, detecting a user input selecting the rescan affordance, and in response to detecting the user input, rescanning the physical environment to determine whether the physical environment meets the one or more execution constraints. For example, in FIG. 3B, the electronic device 110 displays the rescan affordance 333A; in FIG. 3C, detects the user input 399A selecting the rescan affordance 333A; and, in FIG. 3D, rescans the first physical environment.

In various implementations, the scene is further associated with one or more execution guides. In various implementations, the method 700 includes scanning the physical environment to determine whether the physical environment meets the one or more execution guides and, in response to determining that the physical environment does not meet the one or more execution guides, displaying an indication of an unmet execution guide of the one or more execution guides.

For example, in FIG. 4A, the scene is associated with an execution guide that the physical environment includes a physical object having the object type of "TRASHCAN". In FIG. 4A, the electronic device 110 scans the second physical environment to determine that the second physical environment does not include a physical object having the object type of "TRASHCAN" and, therefore, does not meet the execution guide. In FIG. 4B, in response to determining that the second physical environment does not meet the execution guide, the electronic device 110 displays the missing-optional-object notification 336.

In various implementations, the method 700 further includes, in response to determining that the physical environment does not meet the one or more execution guides, displaying a rescan affordance, detecting a user input selecting the rescan affordance, and in response to detecting the user input, rescanning the physical environment to determine whether the physical environment meets the one or more execution guides. For example, in FIG. 4B, the electronic device 110 displays the rescan affordance 337A.

In various implementations, the method 700 further includes, in response to determining that the physical environment does not meet the one or more execution guides, displaying a skip affordance, detecting a user input selecting the skip affordance, and in response to detecting the user input, executing the scene. For example, in FIG. 4B, the electronic device 110 displays the skip affordance 337B; in FIG. 4B, detects the user input 399A selecting the rescan affordance 333A; and, in FIG. 4C, executes the scene.

In various implementations, rather than determining whether to execute a scene, the device determines which, if any, of a plurality of scenes can be executed. Thus, in block 710, obtaining a scene associated with one or more execution constraints includes obtaining a plurality of scenes associated with respective sets of one or more execution constraints. Further, in block 720, scanning the physical environment to determine whether the physical environment meets the one or more execution constraints includes scanning the physical environment to determine which, if any, of the respective sets of one of or more execution constraints the physical environment meets.

In various implementations, the device displays an indication, e.g., a list, of which scenes of the plurality of scenes may be executed in association with the physical environment, e.g., which of the plurality of scenes are associated with respective sets of one or more execution constraints that are met by the physical environment. In various implementations, the device further displays an indication of which scenes of the plurality of scenes may not be executed in association with the physical environment, e.g., which of the plurality of scenes are associated with unmet execution constraints. In various implementations, the device further displays, e.g., in response to a selection of a scene that may not be executed, an indication of why the scene may not be executed, e.g., an indication of the unmet execution constraint (or constraints) preventing the scene from being executed.

Figure 8:
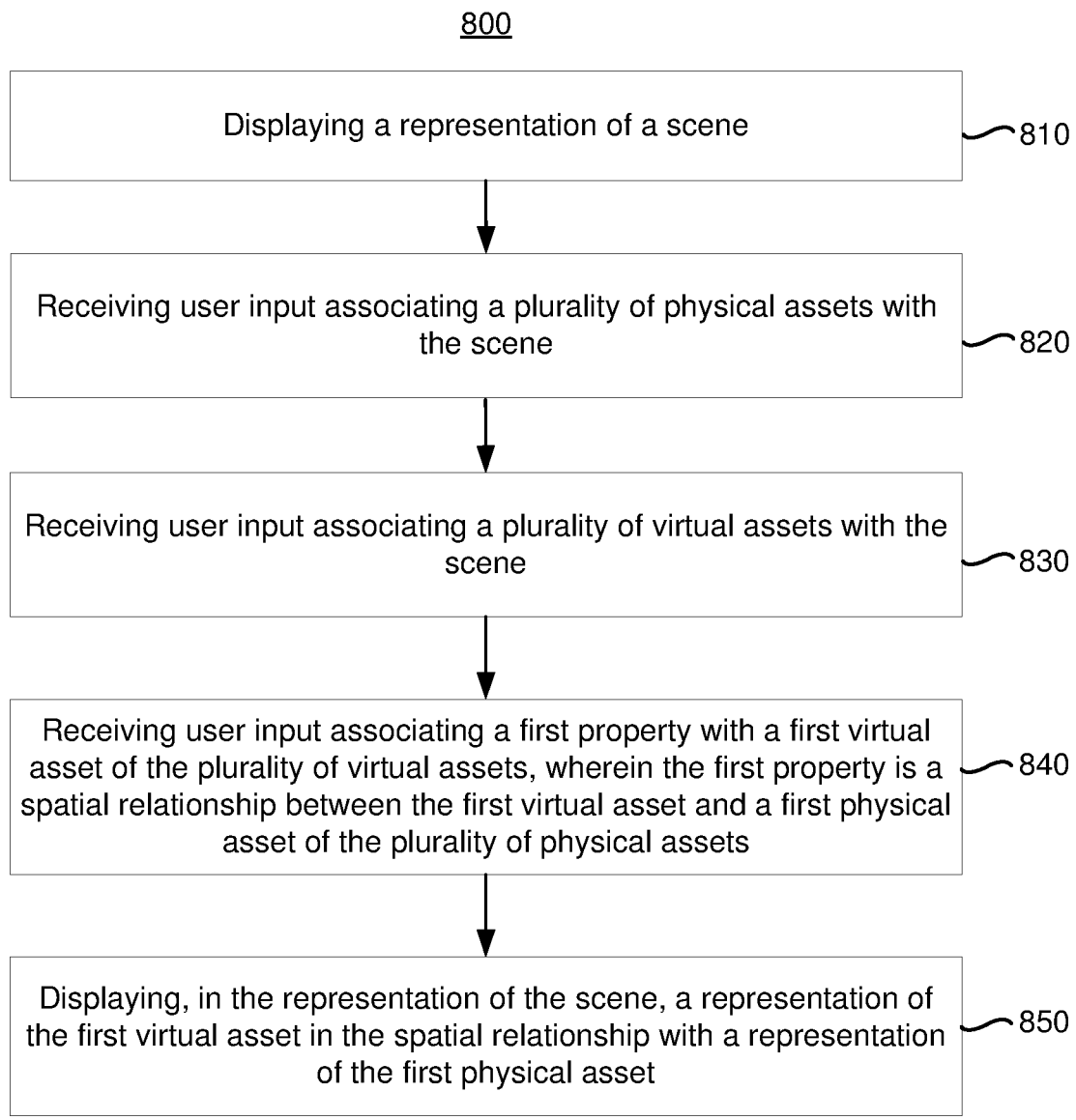
FIG. 8 is a flowchart representation of a method of composing a scene in accordance with some implementations.

FIG. 8 is a flowchart representation of a method 800 of composing a scene in accordance with some implementations. In various implementations, the method 800 is performed by a device with a display, one or more processors, and non-transitory memory. In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device displaying a representation of a scene. For example, in FIGS. 2A-2W, the device displays a representation of a scene in the view region 213.

The method 800 continues, in block 820, with the device receiving user input associating a plurality of physical assets with the scene. For example, in FIGS. 2E-2J, the electronic device 110 receives user input 299E and others interacting with the asset addition affordance 221 and other user interface elements to associate the physical floor, the physical vertical plane, the first physical horizontal plane, the second physical horizontal plane, and the physical trashcan with the scene.

In various implementations, the method 800 includes the device displaying, in the representation of the scene, a respective plurality of representations of the plurality of physical assets. For example, in FIG. 2J, the electronic device 110 displays, in the view region 213, the representation of the physical floor 243A, the representation of the physical vertical plane 243B, the representation of the first physical horizontal plane 243C, the representation of the second physical horizontal plane 243D, and the representation of the physical trashcan 243E.

The method 800 continues, in block 830, with the device receiving user input associating a plurality of virtual assets with the scene. For example, in FIGS. 2A-2D, the electronic device 110 receives user input 299A and others interacting with the asset addition affordance 221 and other user interface elements to associate the virtual professor objective-effectuator object, the virtual blackboard object, the virtual paper object, the virtual paper stack object, and the virtual mug object with the scene.

In various implementations, the method 800 includes the device displaying, in the representation of the scene, a respective plurality of representations of the plurality of virtual assets. For example, in FIG. 2D, the electronic device 110 displays, in the view region 213, a graphical representation of the virtual professor objective-effectuator object 242A, a graphical representation of the virtual blackboard object 242B, a graphical representation of the virtual paper object 242C, a graphical representation of the virtual paper stack object 242D, and a graphical representation of the virtual mug object 242E.

In various implementations, the plurality of virtual assets includes one or more invisible marker objects of which representations are displayed in the representation of the scene, but are not displayed when the scene is executed. For example, with reference to FIGS. 2A-2W, in various implementations, the scene is associated with a virtual asset of a first virtual invisible marker object having a property of being on top of the physical floor and a virtual asset of a second virtual invisible marker object having a first property of being on top of the floor and a second property of being far from the first virtual invisible marker object. Further, the scene is associated with an action asset of the virtual professor objective-effectuator object repeatedly moving between being on top of the first virtual invisible marker object to being on top of the second virtual invisible marker object. Thus, in executing the scene, the representation of the virtual professor objective-effectuator object 321 appears to pace back and forth across the room.

The method 800 continues, in block 840, with the device receiving user input associating a first property with a first virtual asset of the plurality of the virtual assets, wherein the first property is a spatial relationship between the first virtual asset and a first physical asset of the plurality of physical assets. For example, in FIG. 2S, the electronic device 110 detects the user input 299S interacting with the properties affordance 222 and other user inputs interacting with other user interface elements to associate a first property with the virtual blackboard object, the first property being a spatial relationship between the virtual blackboard object and the physical vertical plane that the virtual blackboard object is on the physical vertical plane.

The method 800 continues, in block 850, with the device displaying, in the representation of the scene, a representation of the first virtual asset in the spatial relationship with a representation of the first physical asset. For example, in FIG. 2T, the electronic device 110 displays the graphical representation of the virtual blackboard object 242B in the spatial relationship of being on the graphical representation of the physical vertical plane 243B.

In various implementations, the method 800 includes receiving user input associating a second property with a second physical asset of the plurality of physical assets. For example, in FIGS. 2K-2M, the electronic device 110 detects the user input 299K and others interacting with the properties affordance 222 and other user interface elements to associate properties with the second physical horizontal plane. In various implementations, the method 800 further includes displaying, in the representation of the scene, a representation of the second physical asset as having (or exhibiting) the second property. For example, in FIG. 2M, the electronic device 110 displays the representation of the second physical horizontal plane as having a height of a least a half-meter, a length of at least one meter, and a width of a half-meter.

In various implementations, the method 800 further includes receiving user input associating a second property with a second physical asset of the plurality of physical assets, wherein the user input includes selection of a property associated with a second virtual asset of the plurality of virtual assets. For example, in FIG. 2N, the electronic device 110 detects the user input 299N interacting with the properties affordance 222 and other user inputs interacting with other user interface elements to associate the professor-sittable property with the first physical horizontal plane by selecting the professor-sittable property associated with the virtual professor objective-effectuator object.

In various implementations, the property associated with the second virtual asset is a capability of the second physical asset being used by the second virtual asset to perform a function. For example, the professor-sittable property is a capability of the first physical horizontal plane to be used by the virtual professor objective-effectuator object to sit upon.

In various implementations, the method 800 further includes receiving user input associating a plurality of action assets with the scene. For example, in FIG. 2V, the electronic device 110 detects the user input 299V and others interacting with the asset addition affordance and other user inputs interacting with other user interface elements to associate the first action asset, the second action asset, the third action asset, the fourth action asset, and the fifth action asset with the scene.

In various implementations, the action assets describe actions that are performed in response to particular triggers. In various implementations, the triggers include starting execution of the scene. For example, in FIG. 2W, the first action asset (represented by the text representation of the first action asset 234A) is triggered by starting execution of the scene. In various implementations, the triggers include objects in a particular spatial relationship. For example, in FIG. 2W, the third action asset (represented by the text representation of the third action asset 234C) is triggered when the virtual professor objective-effectuator object is near the virtual paper object. In various implementations, the triggers include the user being a particular position or spatial relationship with respect to a virtual object or another physical object.

In various implementations, the actions include a change in spatial relationships between objects. For example, in FIG. 2W, the second action asset (represented by the text representation of the second action asset 234B) indicates a change between the virtual professor objective-effectuator object being near the virtual blackboard object to being near the virtual paper object. In various implementations, the actions include concluding the scene and executing a different scene.

In various implementations, the method 800 further includes determining, for each of the plurality of physical assets, whether the physical asset is required or optional to execute the scene. In various implementations, it is determined that a physical asset is required if a virtual asset is necessarily displayed in association with a physical object corresponding to the physical asset. For example, in FIG. 3A, the physical floor is required because the virtual professor objective-effectuator object is displayed on top of a physical object corresponding to the physical floor. Similarly, the physical vertical plane is required because the virtual blackboard object is displayed on a physical object corresponding to the physical vertical plane. The first physical horizontal plane is required because the virtual professor objective-effectuator object is displayed sitting on a physical object corresponding to the first physical horizontal plane after the fifth action is performed. The second physical horizontal plane is required because the virtual paper object, the virtual paper stack object, and the virtual mug object are displayed on top of a physical object corresponding to the second physical horizontal plane. In contrast, the physical trashcan is optional because while the virtual paper object can be displayed inside a physical object corresponding to the physical trashcan after the fourth action is performed, the virtual paper object can instead, if no physical object corresponding to the physical trashcan is present in the physical environment, be displayed on top of a physical object corresponding to the physical floor after the fourth action is performed.

In various implementations, the device determines whether each of the plurality of physical assets is required or optional to execute the scene before attempting to execute the scene and saves this information in association with the scene. Such pre-processing can reduce delay in executing the scene.

In various implementations, the device determines whether each of the plurality of physical assets is required or optional based on the initial properties of the virtual assets (e.g., the second physical horizontal plane is required because the virtual physical mug is displayed on top of a physical object corresponding to the second physical horizontal plane) and properties of the virtual assets as changed by the action assets (e.g., the first physical horizontal plane is required because the virtual professor objective-effectuator object is displayed sitting on a physical object corresponding to the first physical horizontal plane after the fifth action is performed). Thus, in various implementations, determining, for each of the plurality of physical assets, whether the physical asset is required or optional to execute the scene is based on initial properties of the virtual assets and properties of the virtual assets as changed by action assets.

In various implementations, the device determines whether each of the physical assets is required or optional additionally based on heuristics stored by the device. Thus, in various implementations, determining, for each of the plurality of physical assets, whether the physical asset is required or optional to execute the scene is based on heuristics. These heuristics allow the device to creatively meet execution constraints. For example, with respect to the scene of FIG. 2A-2W, in various implementations, the first physical horizontal plane is required because the virtual professor objective-effectuator object is displayed sitting on a physical object corresponding to the first physical horizontal plane after the fifth action is performed. Thus, the scene is associated with an execution constraint that the physical environment includes a professor-sittable physical object. In various implementations, the device includes a heuristic that if the physical environment does not include a professor-sittable physical object, the device generates (and, while executing the scene, displays a representation of) a virtual chair object which is interpreted, while attempting to execute the scene and while executing the scene, as a professor-sittable physical object. Thus, in various implementations, the heuristics include a heuristic to generate a virtual object interpreted as a physical object.

In various implementations, the device includes a heuristic that changes the fifth action asset from including the virtual professor objective-effectuator object sitting on the first physical horizontal plane, which is professor-sittable, to include the virtual professor objective-effectuator object sitting on either (1) the first physical horizontal plane, which is professor-sittable, or (2) sitting on the physical floor. Thus, in various implementations, the heuristics include a heuristic to modify an action asset to include an alternative action. This renders the first physical horizontal plane optional rather than required to execute the scene.

As noted above, in various implementations, the device determines whether each of the plurality of physical assets is required or optional based on the initial properties of the virtual assets and properties of the virtual assets as changed by the action assets. In various implementations, action assets are designated, e.g., by a user, as essential or non-essential and the device determines whether each of the plurality of physical assets is required or optional based on the initial properties of the virtual assets and properties of the virtual asses as changed by the action assets which are designated essential. Thus, in various implementations, determining, for each of the plurality of physical assets, whether the physical asset is required or optional to execute the scene is based on initial properties of the virtual assets and properties of the virtual assets as changed by action assets which are designated essential.

For example, with reference to FIGS. 2A-2W, in various implementations, the scene includes a sixth action asset including the virtual professor objective-effectuator object kicking the physical trashcan in frustration. If the device were to determine whether each of the plurality of physical assets is required or optional based on the initial properties of the virtual assets and properties of the virtual assets as changed by the action assets, this would render the physical trashcan required to execute the scene. However, if the device were to determine whether each of the plurality of physical assets is required or optional based on the initial properties of the virtual assets and properties of the virtual assets as changed by the action assets designated non-essential (and the sixth action asset was designated non-essential), the physical trashcan remains optional to execute the scene. Thus, in various implementations, in executing the scene, the device can selectively render action assets based on the physical environment and the physical objects present therein.

In various implementations, the method 800 further includes receiving a user input to provide a preview of the scene and, in response to receiving the user input to provide a preview of scene, executing the scene by displaying representations of the virtual assets in association with a physical environment. For example, in FIG. 2W, the electronic device 110 received the user input 299W interacting with the preview affordance 229 and, in FIGS. 3F-3I and FIGS. 4C-4F, executes the scene by displaying representations of the virtual assets in association with the physical environment.

In various implementations, executing the scene includes scanning the physical environment to determine whether the physical environment includes a physical object corresponding to each physical asset determined to be required. For example, in FIG. 3A, the electronic device 110 scans the first physical environment and, in FIG. 4A, the electronic device 110 scans the second physical environment. In various implementations, executing the scene further includes, in response to determining that the physical environment includes a physical object corresponding to each physical asset determined to be required, displaying the representations of the virtual assets in association with the physical objects. For example, in FIG. 3F, the electronic device 110 displays representations of the virtual assets in association with representations of the physical objects of the first physical environment and, in FIG. 4C, the electronic device 110 displays representations of the virtual assets in association with representations of the physical objects of the second physical environment.

Figure 9:
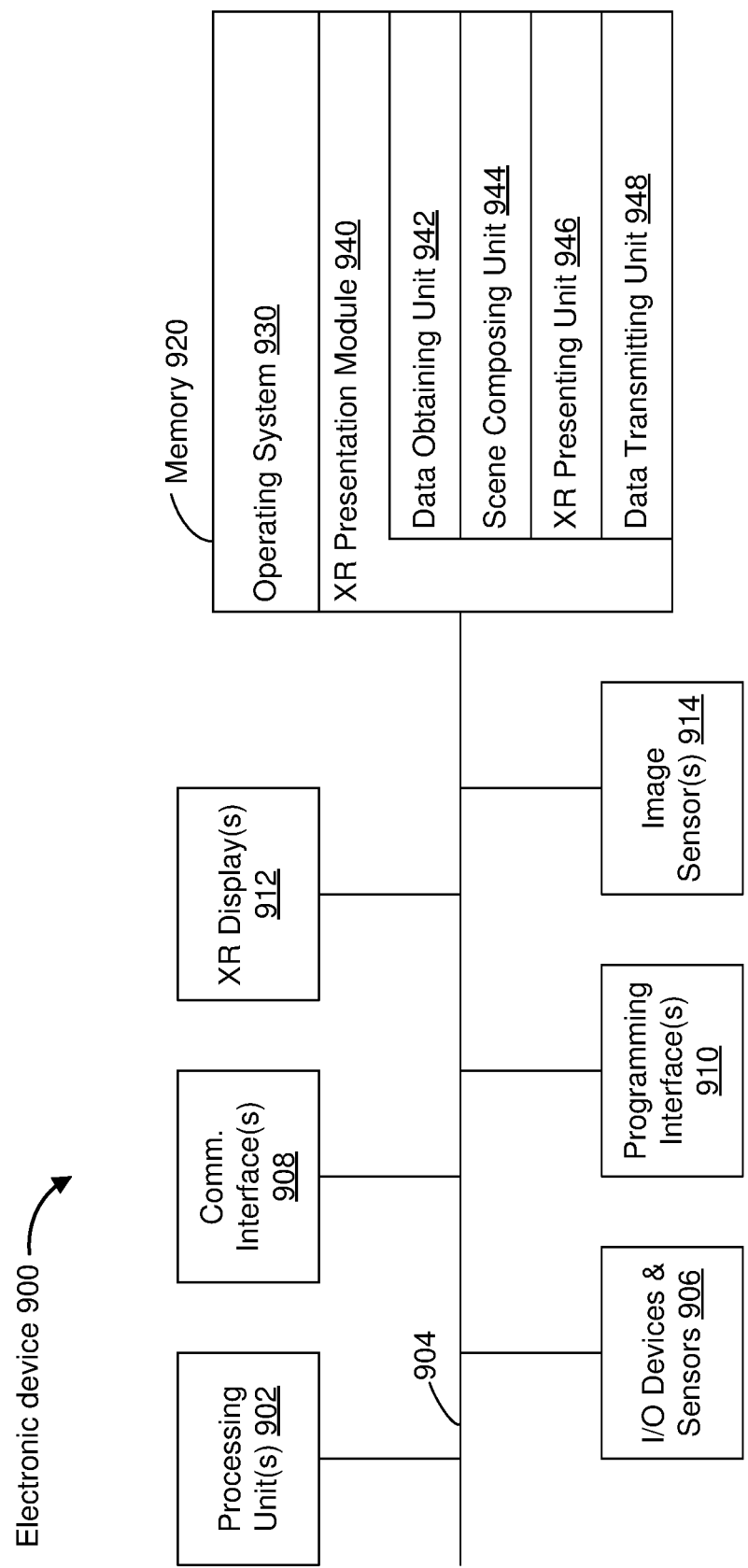
FIG. 9 is a block diagram of an electronic device in accordance with some implementations.

FIG. 9 is a block diagram of an electronic device 900 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 910, one or more XR displays 912, one or more optional interior- and/or exterior-facing image sensors 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 912 are configured to present XR content to the user. In some implementations, the one or more XR displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 912 correspond to diffractive, reflective, polarized, holographic, etc. waveguide displays. For example, the electronic device 900 includes a single XR display. In another example, the electronic device 900 includes an XR display for each eye of the user. In some implementations, the one or more XR displays 912 are capable of presenting AR, MR, and/or VR content.

In various implementations, the one or more XR displays 912 are video passthrough displays which display at least a portion of a physical environment as an image captured by a scene camera. In various implementations, the one or more XR displays 912 are optical see-through displays which are at least partially transparent and pass light emitted by or reflected off the physical environment.

In some implementations, the one or more image sensors 914 are configured to obtain image data that corresponds to at least a portion of the face of the user that includes the eyes of the user (and may be referred to as an eye-tracking camera). In some implementations, the one or more image sensors 914 are configured to be forward-facing so as to obtain image data that corresponds to the scene as would be viewed by the user if the electronic device 900 was not present (and may be referred to as a scene camera). The one or more optional image sensors 914 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and an XR presentation module 940.

The operating system 930 includes procedures for handling various basic system services and for performing hardware dependent tasks. In some implementations, the XR presentation module 940 is configured to present XR content to the user via the one or more XR displays 912. To that end, in various implementations, the XR presentation module 940 includes a data obtaining unit 942, a scene composing unit 944, an XR presenting unit 946, and a data transmitting unit 948.

In some implementations, the data obtaining unit 942 is configured to obtain data (e.g., presentation data, interaction data, sensor data, location data, etc.). The data may be obtained from the one or more processing units 902 or another electronic device. To that end, in various implementations, the data obtaining unit 942 includes instructions and/or logic therefor, and heuristics and metadata therefor.

In some implementations, the scene composing unit 944 is configured to provide an interface for composing a scene for execution in association with a physical environment. To that end, in various implementations, the scene composing unit 944 includes instructions and/or logic therefor, and heuristics and metadata therefor.

In some implementations, the XR presenting unit 946 is configured to present XR content via the one or more XR displays 912. For example, in various implementations, the XR presenting unit 946 is configured to execute a scene in association with a physical environment. To that end, in various implementations, the XR presenting unit 946 includes instructions and/or logic therefor, and heuristics and metadata therefor.

In some implementations, the data transmitting unit 948 is configured to transmit data (e.g., presentation data, location data, etc.) to the one or more processing units 902, the memory 920, or another electronic device. To that end, in various implementations, the data transmitting unit 948 includes instructions and/or logic therefor, and heuristics and metadata therefor.

Although the data obtaining unit 942, the scene composing unit 944, the XR presenting unit 946, and the data transmitting unit 948 are shown as residing on a single electronic device 900, it should be understood that in other implementations, any combination of the data obtaining unit 942, the scene composing unit 944, the XR presenting unit 946, and the data transmitting unit 948 may be located in separate computing devices.

Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
scanning a first physical environment to detect a first physical object in the first physical environment and a second physical object in the first physical environment, wherein the first physical object meets at least one first object criterion and the second physical object meets at least one second object criterion;
displaying, in association with the first physical environment, a virtual object moving along a first path from the first physical object to the second physical object;
scanning a second physical environment to detect a third physical object in the second physical environment and a fourth physical object in the second physical environment; and
in response to determining that the second physical environment includes the third physical object that meets the at least one first object criterion and the fourth physical object that meets the at least one second object criterion, displaying, in association with the second physical environment, the virtual object moving along a second path from the third physical object to the fourth physical object, wherein the second path is different than the first path.

2. The method of claim 1, wherein the at least one first object criterion includes a criterion regarding a size or shape of the first physical object.

3. The method of claim 1, wherein the at least one first object criterion includes a criterion regarding an object type of the first physical object.

4. The method of claim 1, wherein the at least one first object criterion includes a criterion regarding a usability of the first physical object.

5. The method of claim 4, wherein the criterion regarding the usability of the first physical object is defined with respect to the virtual object.

6. The method of claim 4, wherein the criterion regarding the usability of the first physical object is defined with respect to a fifth physical object.

7. The method of claim 1, wherein displaying, in association with the first physical environment, the virtual object includes displaying a composite image of the virtual object and the first physical environment.

8. The method of claim 1, wherein displaying, in association with the first physical environment, the virtual object includes projecting the virtual object over a view of the first physical environment.

9. The method of claim 1, wherein displaying, in association with the first physical environment, the virtual object includes displaying the virtual object over a representation or view of the first physical object or the second physical object.

10. The method of claim 1, wherein displaying, in association with the first physical environment, the virtual object includes displaying the virtual object proximate to a representation or view of the first physical object or the second physical object.

11. The method of claim 1, wherein displaying, in association with the first physical environment, the virtual object includes displaying the virtual object interacting with a representation or view of the first physical object or the second physical object.

12. The method of claim 1, wherein a variance of the second path is different than a variance of the first path.

13. The method of claim 1, wherein at least one of the first path or the second path is determined to avoid another object.

14. The method of claim 1, further comprising:
in response to determining that the second physical environment does not include the third physical object that meets the at least one first object criterion:
forgo displaying the virtual object in association with the second physical environment; and
displaying a notification that the second physical environment is missing a physical object that meets the at least one first object criterion.

15. The method of claim 1, further comprising:
in response to determining that the second physical environment does not include the third physical object that meets the at least one first object criterion or the fourth physical object that meets the at least one second object criterion:
displaying a rescan affordance to rescan the second physical environment;
detecting a user input selecting the rescan affordance; and
in response to detecting the user input selecting the rescan affordance, rescanning the second physical environment to determine whether the second physical environment includes the third physical object that meets the at least one first object criterion and the fourth physical object that meets the at least one second object criterion.

16. A device comprising:
a display;
non-transitory memory; and
one or more processors to:
scan a first physical environment to detect a first physical object in the first physical environment and a second physical object in the first physical environment, wherein the first physical object meets at least one first object criterion and the second physical object meets at least one second object criterion;
display, in association with the first physical environment, a virtual object moving along a first path from the first physical object to the second physical object;
scan a second physical environment to detect a third physical object in the second physical environment and a fourth physical object in the second physical environment; and
in response to determining that the second physical environment includes the third physical object that meets the at least one first object criterion and the fourth physical object that meets the at least one second object criterion, display, in association with the second physical environment, the virtual object moving along a second path from the third physical object to the fourth physical object, wherein the second path is different than the first path.

17. The device of claim 16, wherein the at least one first object criterion includes a criterion regarding a size or shape of the first physical object.

18. The device of claim 16, wherein the at least one first object criterion includes a criterion regarding an object type of the first physical object.

19. The device of claim 16, wherein the at least one first object criterion includes a criterion regarding a usability of the first physical object.

20. A non-transitory memory storing one or more programs, which, when executed by one or more processors of a device including a display, cause the device to:
scan a first physical environment to detect a first physical object in the first physical environment and a second physical object in the first physical environment, wherein the first physical object meets at least one first object criterion and the second physical object meets at least one second object criterion;
display, in association with the first physical environment, a virtual object moving along a first path from the first physical object to the second physical object;
scan a second physical environment to detect a third physical object in the second physical environment and a fourth physical object in the second physical environment; and
in response to determining that the second physical environment includes the third physical object that meets the at least one first object criterion and the fourth physical object that meets the at least one second object criterion, display, in association with the second physical environment, the virtual object moving along a second path from the third physical object to the fourth physical object, wherein the second path is different than the first path.

* * * * *